United States Patent [19]
Hoshino et al.

[11] Patent Number: 6,088,680
[45] Date of Patent: *Jul. 11, 2000

[54] AUTOMATIC TOLL ADJUSTING SYSTEM, AND STORAGE MEDIUM WITH A RADIO COMMUNICATION FUNCTION, FREQUENCY CONVERTING APPARATUS, WRITING APPARATUS, SETTLING APPARATUS, DEPOSITING APPARATUS AND INQUIRING APPARATUS THEREFOR

[75] Inventors: Masao Hoshino; Tsuneo Kinoshita; Shigenari Seita, all of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/489,719

[22] Filed: Jun. 13, 1995

[30] Foreign Application Priority Data

Jun. 21, 1994 [JP] Japan .................................. 6-139104

[51] Int. Cl.[7] ............................. H04K 1/02; G06F 17/60; G06K 7/01; G08G 1/00

[52] U.S. Cl. ................................. 705/13; 380/9; 235/384; 340/928; 455/54.1; 705/13

[58] Field of Search ................................. 380/9; 395/213; 235/384; 340/928; 364/436; 455/54.1

[56] References Cited

U.S. PATENT DOCUMENTS

| | | | |
|---|---|---|---|
| 4,908,500 | 3/1990 | Baumberger | 235/384 |
| 4,937,581 | 6/1990 | Baldwin et al. | 342/44 |
| 4,947,353 | 8/1990 | Quinlan, Jr. | 364/562 |
| 4,958,064 | 9/1990 | Kirkpatrick | 235/384 |
| 4,963,723 | 10/1990 | Masada | 235/384 |
| 5,086,389 | 2/1992 | Hassett et al. | 235/384 |
| 5,144,553 | 9/1992 | Hassett et al. | 235/384 |
| 5,196,846 | 3/1993 | Brockelsby et al. | 340/933 |
| 5,204,675 | 4/1993 | Sekine | 340/933 |
| 5,266,785 | 11/1993 | Sugihara et al. | 235/384 |
| 5,289,183 | 2/1994 | Hassett et al. | 340/905 |
| 5,310,999 | 5/1994 | Claus et al. | 235/384 |
| 5,422,473 | 6/1995 | Kamata | 235/384 |
| 5,424,727 | 6/1995 | Shieh | 340/928 |
| 5,440,109 | 8/1995 | Hering et al. | 235/384 |
| 5,444,742 | 8/1995 | Grabow et al. | 375/267 |
| 5,451,758 | 9/1995 | Jesadanont | 235/384 |
| 5,475,377 | 12/1995 | Lee | 340/825.34 |
| 5,485,520 | 1/1996 | Chaum et al. | 380/24 |
| 5,490,079 | 2/1996 | Sharpe et al. | 364/467 |
| 5,508,917 | 4/1996 | Siegle et al. | 364/424.02 |
| 5,537,672 | 7/1996 | Grabow et al. | 455/132 |
| 5,554,984 | 9/1996 | Shigenaga | 340/937 |
| 5,565,874 | 10/1996 | Rode | 342/457 |
| 5,574,973 | 11/1996 | Borth et al. | 455/33.1 |
| 5,602,919 | 2/1997 | Hurta et al. | 380/24 |

FOREIGN PATENT DOCUMENTS

| | | |
|---|---|---|
| 0 401 192 A1 | 12/1990 | European Pat. Off. . |
| 0 508 405 A1 | 10/1992 | European Pat. Off. . |
| 0 577 328 A2 | 1/1994 | European Pat. Off. . |
| 0 585718 A1 | 3/1994 | European Pat. Off. . |
| 62-42292 | 2/1987 | Japan . |
| 63-42293 | 2/1988 | Japan . |
| 4-88495 | 3/1992 | Japan . |
| 5-35933 | 2/1993 | Japan . |

*Primary Examiner*—Pinchus M. Laufer
*Assistant Examiner*—Hrayr A. Sayadian
*Attorney, Agent, or Firm*—Arent, Fox, Kintner, Plotkin & Kahn

[57] ABSTRACT

An automatic toll adjusting system enables a user to voluntarily select a toll payment system with use of a storage medium carried by each user and storing adjustment information necessary for toll adjusting therein. Information is exchanged with the storage medium in radio communication at a first predetermined frequency at a toll adjusting gate employing a first toll payment system to automatically adjust a toll in the first toll payment system. At a toll adjusting gate employing a second toll payment system, information is exchanged with the storage medium in radio communication at a second predetermined frequency to automatically adjust a toll in the second toll payment system. This system is applicable to a system for automatically adjusting a fee or charge such as a toll for a toll road.

78 Claims, 33 Drawing Sheets

FIG. 34

NAME : MICHIO FUJI
ADDRESS : XXXX, DAIMARU, INAGI-SHI, TOKYO
TELEPHONE : XXXX-XX-XXXX

<PRE-PAYMENT>
· BALANCE : 10,350 YEN
· HISTORY :

| PLACE OF USE | DATE/TIME OF USE | VEHICLE TYPE | SUM | BALANCE | TYPE |
|---|---|---|---|---|---|
| EBINA SA | 94. 2. 18 15:15 | — | 7,000 | 7,500 | DEPOSIT |
| YOKOHAMA TOLLHOUSE | 94. 2. 21 13:23 | SMALL | — | 7,500 | ENTRANCE |
| KAWASAKI TOLLHOUSE | 94. 2. 21 13:39 | SMALL | 350 | 7,150 | EXIT |
| HAKOZAKI TOLLHOUSE | 94. 3. 21 13:39 | | 600 | 6,550 | ENTRANCE/EXIT |
| HASUDA SA | 94. 3. 31 8:40 | — | 8,000 | 14,550 | DEPOSIT |
| ... | ... | | | ... | |

<POST-PAYMENT>
· HISTORY :

| PLACE OF USE | DATE/TIME OF USE | VEHICLE TYPE | SUM | TYPE |
|---|---|---|---|---|
| YOKOHAMA TOLLHOUSE | 94. 2. 21 13:23 | SMALL | — | ENTRANCE |
| KAWASAKI TOLLHOUSE | 94. 2. 21 13:39 | SMALL | 350 | EXIT |
| HAKOZAKI TOLLHOUSE | 94. 3. 21 13:39 | | 600 | ENTRACE/EXIT |
| ... | ... | | | ... |

FIG. 35

NAME : MICHIO FUJI
ADDRESS : XXXX DAIMARU, INAGI-SHI, TOKYO
TELEPHONE : XXXX-XX-XXXX
<PRE-PAYMENT>
 BALANCE: 10,350 YEN
 HISTORY:

| PLACE OF USE | DATE/TIME OF USE | VEHICLE TYPE | SUM | BALANCE |
|---|---|---|---|---|
| KAWASAKI TOLLHOUSE | '94. 2. 21 13:39 | SMALL | 350 | 7,150 |
| HAKOZAKI TOLLHOUSE | '94. 3. 21 13:39 | SMALL | 600 | 6,000 |
| --- | --- | --- | --- | --- |

<POST-PAYMENT>
 HISTORY:

| PLACE OF USE | DATE/TIME OF USE | VEHICLE TYPE | SUM | BALANCE |
|---|---|---|---|---|
| KAWASAKI TOLLHOUSE | '94. 2. 21 13:39 | SMALL | 350 | EXIT |
| HAKOZAKI TOLLHOUSE | '94. 3. 21 13:39 | SMALL | 600 | ENTRANCE/EXIT |
| --- | --- | --- | --- | --- |

FIG. 36

| PLACE OF USE | DATE/TIME OF USE | VEHICLE TYPE | SUM | BALANCE |
|---|---|---|---|---|
| EBINA SA | 94. 2.18  15:15 | — | 7.000 | 7.500 |
| HASUDA SA | 94. 3.31   8:40 | — | 8.000 | 14.550 |
| ... | ... | ... | ... | ... |

NAME      : MICHIO FUJI
ADDRESS   : XXXX, DAIMARU, INAGI-SHI, TOKYO
TELEPHONE : XXXX-XX-XXXX
<DEPOSIT>
· BALANCE: 10,350 YEN
· HISTORY:

AUTOMATIC TOLL ADJUSTING SYSTEM, AND STORAGE MEDIUM WITH A RADIO COMMUNICATION FUNCTION, FREQUENCY CONVERTING APPARATUS, WRITING APPARATUS, SETTLING APPARATUS, DEPOSITING APPARATUS AND INQUIRING APPARATUS THEREFOR

BACKGROUND OF THE INVENTION

1) Field of the Invention

The present invention relates to a system for automatically adjusting a fee such as a toll for a toll road, for example, Shuto Kosoku Highway, Tomei Kosoku Highway or the like. In particular, this invention relates to an automatic toll adjusting system employing a storage medium having a radio communicating function, which system enables automatic toll adjustment resulting in no ticket being issued or no stopping of a vehicle.

2) Description of the Related Art

Media used to pay tolls for present toll roads are, in general, a coupon ticket, a prepaid card (a mode of toll pre-payment by a magnetic card) and the like other than cash.

On a toll road where a toll irrespective of trip distance is collected, for instance, the user stops his or her vehicle at a tollhouse (a tollhouse on a toll road of this type is referred to hereinafter as an entrance/exit toll house or an entrance/exit toll adjusting gate), and pays a fixed toll to an attendant of the entrance/exit tollhouse.

On a toll road where a toll according to a trip distance is collected, the user stops his or her vehicle at an entrance tollhouse (a tollhouse on a toll road of this type is referred to hereinafter as an entrance tollhouse or an entrance toll adjusting gate), and receives a ticket on which entrance tollhouse information and vehicle type information are magnetically recorded. At an exit tollhouse (an exit tollhouse on a toll road of this type is referred to as an exit tollhouse or an exit toll adjusting gate), the user stops the vehicle, hands the ticket to an attendant of this exit tollhouse and pays a toll calculated on the basis of the various information recorded on the ticket.

In general, the user can pay the toll with a coupon ticket, cash, or a prepaid card. In the case of a prepaid card, the user hands the prepaid card to the attendant. The toll is subtracted from a balance on the prepaid card. The user then receives the prepaid card back from the attendant.

As an adjusting system for tolls, an unmanned entrance/exit tollhouse, or an entrance and exit toll houses both of which are unmanned, or a system in which toll adjustment necessitating no stopping of a passing vehicle at a tollhouse are not yet generalized. If such a system becomes possible, it will be helpful to solve traffic jams at the tollhouse, save labor, etc.

Littering of tickets in the tollhouse, traffic jams, and exhaust gas on toll roads are serious public concerns. Therefore, there is an expectation to solve such problems by realizing ticketless toll adjustment or toll adjustment without needing to stop a vehicle.

There are various proposals where radio communication techniques are used for toll adjustment.

For instance, in a radio card system disclosed in a specification of Japanese Patent Kokai Publication No. 5-35933, a radio card is inserted in a vehicle mounted apparatus to receive toll information and service information from a tollhouse, the received various information is output from a display or a speaker of an on-vehicle apparatus, and in addition the toll is recorded on a radio card in a toll collecting process.

In a toll collecting apparatus disclosed in a specification of Japanese Patent Kokai Publication No. 62-42292, toll information (vehicle type, etc.) stored in an on-vehicle device is transmitted by radio communication to a ground device located at a tollhouse, a toll is determined by the ground device, and the toll collection information is displayed on the on-vehicle device.

In a terminal for collecting a toll for a toll road disclosed in a specification of Japanese Patent Kokai Publication No. 63-44293, an ID card is inserted in an on-vehicle device, a password is input, and the password is confirmed. After that, the on-vehicle device transmits settlement information (ID, vehicle type, etc.) to the terminal at a tollhouse by radio communication, then a toll is determined at the terminal.

A toll collecting system disclosed in a specification of Japanese Patent Kokai Publication No. 5-197856, discloses a radio card with a display, a keyboard and a terminal which communicate with each other by radio communication to collect a toll in a toll pre-payment system employing a password.

In a highway toll calculating system disclosed in a specification of Japanese Patent Kokai Publication No. 61-9783, an on-vehicle device transmits identification information (ID) and vehicle type information to a terminal by radio communication to an entrance tollhouse and an exit tollhouse. The terminal calculates a toll based on the received information, and performs a post-payment process to withdraw the calculated toll from a bank account. In a toll automatic adjusting system for a toll road disclosed in a specification of Japanese Patent Kokai Publication No. 5-151414, an on-vehicle device transmits a registered number to a terminal by radio communication, and the terminal performs a post-payment process to withdraw a toll calculated on the basis of the registered number from a bank account through a toll processing apparatus.

In addition to the above examples, there are also proposed a toll collecting system for toll roads where a license number of a vehicle is automatically recognized to collect a toll from a bank account corresponding to the license number of the vehicle (refer to specifications of Japanese Patent Kokai Publication no. 4-107699, and Japanese Patent Kokai Publication no. 5-54218), and an unmanned toll collecting system for toll roads in which a license number is read out, a toll is calculated from a vehicle type known from the license number, and the toll is claimed from a registrant of the license number (refer to Japanese Patent Kokai Publication no. 63-8890).

However, the above techniques employ either a pre-payment system or a post-payment (credit) system as a toll payment system. To allow voluntary selection of either a toll pre-payment system or a toll post-payment system to the users of toll road, it is necessary to provide an apparatus or a medium for each of the above systems.

According to the above technique, a password is set and stored in advance and a security function is applied to check the password when a toll is collected. If personal information such as an identification number, a number of a bank account, etc. is exchanged by radio communication, there is a risk that the information will be intercepted. It is also necessary to cope with tampering of the data for balance information used for toll pre-payment, an account number for toll post-payment and vehicle information, or fraudulent, invalid or improper use of the information or data. Further, to avoid fraudulent, invalid or improper use or data tampering on a toll post-payment process necessitating no stopping of a vehicle, there is a demand for a strong security.

SUMMARY OF THE INVENTION

In light of the above problems, an object of this invention is to provide an automatic toll adjusting system, in addition to a storage medium with a radio communication function, a frequency converting apparatus, a writing apparatus, a settling apparatus, a depositing apparatus, and an inquiring apparatus all used for the automatic toll adjusting system, which system and apparatus can realize ticketless toll adjustment or toll adjustment requiring no stopping of a vehicle, allow the user to voluntarily select a toll pre-payment or a toll post-payment to improve service for the user of a toll road, and strengthen security to cope with wrongful, fraudulent, invalid or improper use or data falsification.

According to this invention, an automatic toll adjusting system for automatically adjusting a toll and using of a storage medium for storing adjustment information necessary for toll adjustment carried by each user comprises a toll adjusting gate employing a first toll payment system for exchanging information with the storage medium by radio communication at a first predetermined frequency to automatically adjust a toll in a first toll payment system, and a toll adjusting gate employing a second toll payment system for exchanging information with the storage medium by radio communication at a second predetermined frequency to automatically adjust a toll in the second toll payment system.

According to this invention, a storage medium having a radio communication function for an automatic toll adjusting system carried by each user, comprises a storing means for storing adjustment information necessary for toll adjustment therein, a receiving means for receiving information from outside by radio communication at a first predetermined frequency, a processing means for performing a read process to read information stored in the storing means and a write process to write information into the storing means on the basis of the information received by the receiving means, and a transmitting means for transmitting responsive information including the information from the storing means to the outside by radio communication at the first predetermined frequency, at a toll adjusting gate employing a first toll payment system, information being exchanged directly between the receiving means and the transmitting means, and a writing apparatus or a settling apparatus for automatic toll adjustment at the toll adjusting gate by radio communication at the first predetermined frequency. At a toll adjusting gate employing a second toll payment system, the storage medium having the radio communication function is inserted in a frequency converting apparatus converting information and the first predetermined frequency is converted into a second predetermined frequency for toll post-payment. Besides converting information at the second predetermined frequency into the first predetermined frequency, the storage medium having the radio communication function indirectly exchanges information via the frequency converting apparatus through the receiving means and the transmitting means with the writing apparatus or the settling apparatus for automatic toll adjustment at the toll gate by radio communication at the second predetermined frequency.

According to this invention, a frequency converting apparatus is used for an automatic toll adjusting system into which a storage medium is inserted. The storage medium has a radio communication function for storing adjustment information necessary for toll adjustment carried by each user and for exchanging information with the outside by radio communication at a first predetermined frequency. The frequency converting apparatus comprises a first communicating means for exchanging information with the storage medium having the radio communication function by radio communication at the first predetermined frequency when the storage medium having the radio communication function is inserted in the frequency converting apparatus, and a second communicating means for exchanging information with the outside by radio communication at a second predetermined frequency. When the storage medium having the radio communication function is inserted in the frequency converting apparatus, the first communicating means transmits information received from the outside through the second communicating means to the storage medium by radio communication at the first predetermined frequency. In addition, the second communicating means transmits information received from the storage medium through the first communicating means to the outside by radio communication at the second predetermined frequency. At a toll adjusting gate, when the storage medium is inserted in the frequency converting apparatus, information is exchanged between a writing apparatus or a settling apparatus for automatic toll adjustment at the toll adjusting gate and the storage medium having the radio communication function via the first communicating means and the second communicating means.

According to this invention, a writing apparatus for an automatic toll adjusting system writes necessary use information for toll adjustment as adjustment information into a storage medium having a radio communication function carried by each user. The storage medium having the radio communication function stores the adjustment information necessary for toll adjustment therein and exchanges information with the outside by radio communication at a first predetermined frequency. The writing apparatus comprises a communicating means for exchanging information with the storage medium having the radio communication function by radio communication at the first predetermined frequency at an entrance toll adjusting gate employing a first toll payment system, and for exchanging information with the storage medium having the radio communication function by radio communication at a second predetermined frequency at an entrance toll adjusting gate employing a second toll payment system, and a demand issuing means for issuing a write demand to write use information about the entrance toll adjusting gate to the storage medium through the communicating means. When a user carrying the storage medium passes through the entrance toll adjusting gate, the demand issues means issues a write demand to write the use information including unique information about the entrance toll adjusting gate to the storage medium through the communicating means.

According to this invention, a settling apparatus used for an automatic toll adjusting system acquires adjustment information from a storage medium having a radio communication function to automatically adjust a toll charged to a holder of the storage medium on the basis of the adjustment information. The storage medium is carried by each user for storing the adjustment information necessary for toll adjustment therein and exchanges information with the outside by radio communication at a first predetermined frequency. The settling apparatus comprises a communicating means for exchanging information with the storage medium by radio communication at the first predetermined frequency at a toll adjusting gate employing a first toll payment system, and for exchanging information with the storage medium by radio communication at a second predetermined frequency at a toll adjusting gate employing a second toll payment system, a demand issuing means for issuing a read demand to read the adjustment information or a write demand to write adjustment result information to the storage medium through the communicating means, and a toll adjusting means for automatically adjusting a toll charged to a holder of the storage medium on the basis of the adjustment information received from the storage medium through the communicating means in response to the read demand from the demand issuing means. When the user carrying the storage medium passes through the toll adjusting gate, the demand issuing means issues a read demand to read the adjustment information to the storage medium through the communicating means. When the settling apparatus receives the adjustment information from the storage medium by radio communication through the communicating means in response to the read demand, the toll adjusting means automatically adjusting a toll charged to the holder of the storage medium on the basis of the received adjustment information. The demand issuing means issues a write demand to write adjustment result information including a charged toll adjusted by the toll adjusting means and payment distinction indicating whether a toll payment system is a first toll payment system or a second toll payment system to the storage medium through the communicating means.

According to this invention, a depositing apparatus used for an automatic toll adjusting system performs a depositing process for toll pre-payment on a storage medium having a radio communication function. The storage medium having the radio communication function is carried by each user for storing adjustment information necessary for toll adjustment therein and for exchanging information with the outside by radio communication at a first predetermined frequency. The depositing apparatus comprises a communicating means for directly exchanging information with the storage medium by radio communication at the first predetermined frequency, a depositing means for performing the depositing process on the storage medium, and a demand issuing means for issuing a read demand to read balance information or a write demand to write depositing information and new balance information resulting from the depositing process by the depositing means to the storage medium. When the depositing apparatus performs the depositing process on the storage medium, the demand issuing means issues a read demand to read the balance information from the storage medium through the communicating means. When the depositing apparatus receives the balance information from the storage medium through the communicating means in response to the read demand, the depositing means adds a sum of money deposited this time to the depositing balance information to obtain a new balance. The demand issuing means issues a write demand to write the balance information including the new balance calculated by the depositing means. The depositing information includes the sum of money deposited this time to the storage medium through the communicating means.

According to this invention, an inquiring apparatus used for an automatic toll adjusting system inquires about information stored in a storage medium having a radio communication function. The storage medium is carried by each user for storing adjustment information necessary for toll adjustment therein and for exchanging information with the outside by radio communication at a first predetermined frequency. The inquiring apparatus comprises a communicating means for directly exchanging information with the storage medium having the radio communication function by radio communication at the first predetermined frequency, a demand issuing means for issuing a read demand to read the information stored in the storage medium to the storage medium with the radio communicating function through the communicating means, and an outputting means for outputting information received from the storage medium through communicating means in response to the read demand issued from the demand issuing means.

As above, the automatic toll adjusting system and various apparatus therefor according to this invention allows the user to select a toll payment system by selecting a frequency for radio transmission at the toll adjusting gate, which greatly improves service to the users of the toll road or the like.

In particular, the user selects direct radio communication at the first predetermined frequency with the storage medium having the radio communication function or indirect communication at the second predetermined frequency with the storage medium via the frequency converting apparatus by inserting the storage medium into the frequency converting apparatus so as to voluntarily select a toll payment system at the toll adjusting gate. This manner can largely improve service to the users of the toll road or the like.

BRIEF DESCRIPTION OF THE DRAWINGS

FIG. 34 shows an example of an inquiry for all data by the inquiring apparatus according to the embodiment;

FIG. 35 shows an example of an inquiry for payments by the inquiring apparatus according to the embodiment; and FIG. 36 shows an example of an inquiry for deposit by the inquiring apparatus according to the embodiment.

DESCRIPTION OF THE PREFERRED EMBODIMENT (a) Description of Aspects of the Invention FIG. 1 is a block diagram showing an aspect of this invention (a toll automatic adjusting system). In FIG. 1, reference numeral 1 denotes a storage medium for storing adjustment information which is retained by users and is necessary for toll adjustment. In an automatic toll adjusting system of this invention, information is exchanged between the storage medium 1 and a toll adjusting gate employing a first toll payment system by radio communication at a first predetermined frequency to automatically adjust a toll in the first toll payment system. On the other hand, information is exchanged between a storage medium 2 and a toll adjusting gate employing a second toll payment system in radio communication at a second predetermined frequency to automatically adjust a toll in the second toll payment system.

Figure 1:
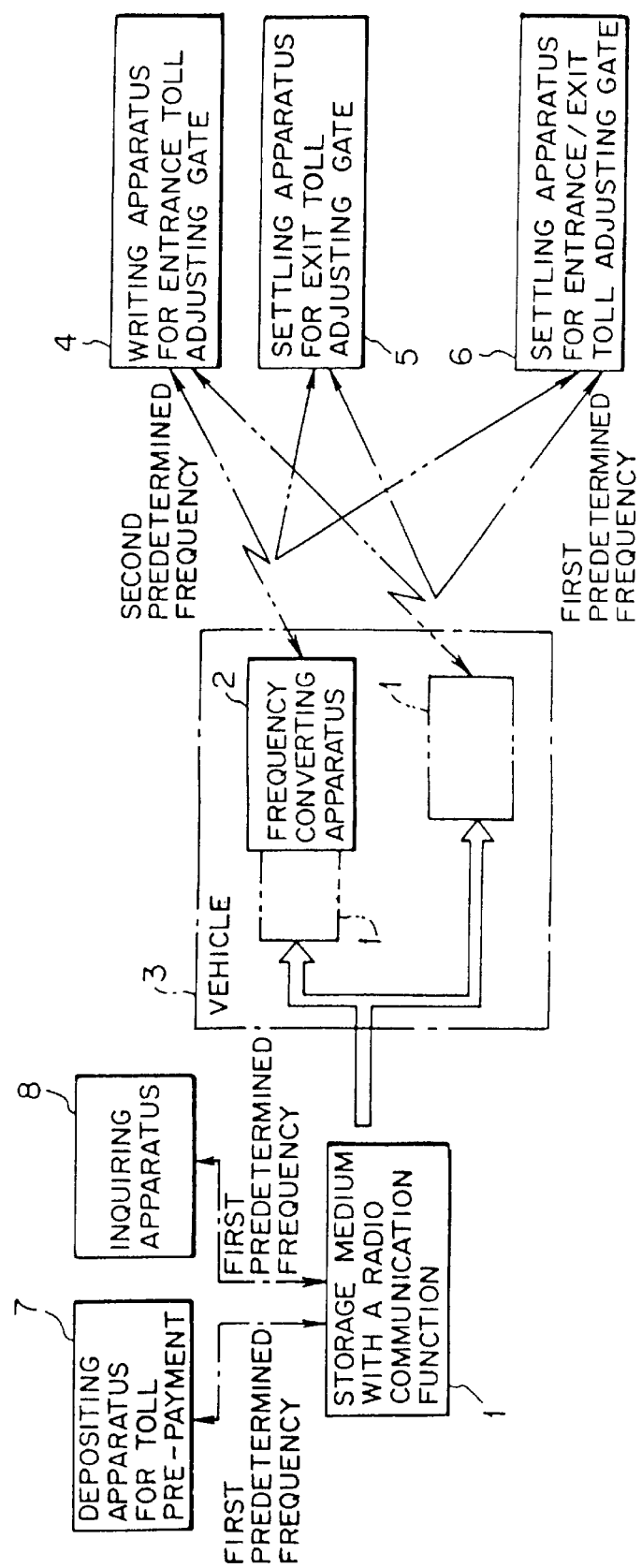
FIGS. 1 through 7 are block diagrams each showing an aspect of this invention.

The storage medium 1 shown in FIG. 1 has a radio communication function to exchange information with the outside by radio communication at the first predetermined frequency.

In FIG. 1, reference numeral 2 denotes a frequency converting apparatus, and 3 denotes a vehicle. The frequency converting apparatus 2 is mounted on the vehicle 3 travelling on a toll road. When the storage medium 1 is inserted therein, the frequency converting apparatus 2 converts information at the first predetermined frequency, supplied from the storage medium 1, into the second predetermined frequency to transmit it to the outside by radio communication. The frequency converting apparatus also converts information at the second predetermined frequency, supplied from the outside, into the first predetermined frequency to transmit it to the storage medium 1 by radio communication.

At the toll adjusting gate employing a first toll payment system, information is directly exchanged with the storage medium 1 by radio communication at the first predetermined frequency to automatically adjust a toll in the first toll payment system. At the toll adjusting gate employing the second toll payment system, the storage medium 1 is inserted in the frequency converting apparatus 2, and information is indirectly exchanged with the storage medium 1 via the frequency converting apparatus 2 by radio communication at the second predetermined frequency to automatically adjust a toll in the second toll payment system.

FIG. 1 shows an example where an object of toll adjustment is a toll according to a trip distance on a toll road. Reference numeral 4 denotes a writing apparatus for an entrance toll adjusting gate installed at an entrance toll adjusting gate on a toll road where a toll according to a trip distance is collected. Reference numeral 5 denotes a settling apparatus for an exit toll adjusting gate installed at the exit toll adjusting gate on a toll road where a toll according to a trip distance is collected. Reference numeral 6 denotes a settling apparatus for an entrance/exit toll adjusting gate installed at the entrance/exit toll adjusting gate which is located at either an entrance or an exit for a toll road where a toll, irrespective of a trip distance, is collected.

The writing apparatus 4 for the entrance toll adjusting gate transmits use information including unique information about the entrance toll adjusting gate to the storage medium 1 of the vehicle 3 passing through the entrance toll adjusting gate directly by radio communication at the first predetermined frequency, or indirectly via the frequency converting apparatus 2 by radio communication at the second predetermined frequency. The writing apparatus 4 writes the use information as adjustment information into the storage medium 1.

The settling apparatus 5 for the exit toll adjusting gate communicates with the storage medium 1 or the frequency converting apparatus 2 by radio communication at the first predetermined frequency or at the second predetermined frequency. The settling apparatus 5 acquires the adjustment information directly from the storage medium 1, or indirectly via the frequency converting apparatus 2 and automatically adjusts a toll for the toll road which is charged to a holder of the storage medium 1 on the basis of the adjustment information.

The settling apparatus 6 for the entrance/exit toll adjusting gate communicates with the storage medium 1 or the frequency converting apparatus 2 by radio communication at the first predetermined frequency or at the second predetermined frequency. The settling apparatus 6 acquires the adjustment information directly from the storage medium 1 or indirectly via the frequency converting apparatus 2 and automatically adjusts a toll for a toll road which is charged to a holder of the storage medium 1 on the basis of the adjustment information.

If the first toll payment system is employed, information is directly exchanged among the writing apparatus 4, the settling apparatuses 5 and 6, and the storage medium 1 by radio communication at the first predetermined frequency to automatically adjust a toll in the first toll payment system by the settling apparatuses 5 and 6. If the second toll payment system is employed, the storage medium 1 is inserted in the frequency converting apparatus 2 and information is indirectly exchanged among the writing apparatus 4, the settling apparatuses 5 and 6, and the storage medium 1 via the frequency converting apparatus 2 by radio communication at the second predetermined frequency to automatically adjust a toll in the second toll payment system by the settling apparatuses 5 and 6.

Upon toll automatic adjustment by the settling apparatus 5 for the exit toll adjusting gate or the settling apparatus 6 for the entrance/exit toll adjusting gate, the settling apparatus 5 or 6 transmits a toll which is to be collected and which was obtained by adjustment in the settling apparatus 5 or 6. Adjustment result information including payment distinction showing whether the payment system is the first payment system or the second system is also transmitted by the settling apparatus 5 and 6 to the storage medium 1, and the information is written into the storage medium 1 as use information.

The information written in the storage medium 1 is enciphered with a predetermined encipherment key to be enciphered data, and the predetermined encipherment key which is in a state of plain-text (in a state where the encipherment key is not enciphered) is set and stored in the storage medium 1. The enciphered data for information that is an object of a read demand or a write demand, described later, includes the enciphered encipherment key obtained by enciphering the plain-text predetermined encipherment key with the predetermined encipherment key. In the storage medium 1, a password, an identification number and a term of validity in terms of the storage medium 1 are set and stored in advance.

If the storage medium 1 receives a read demand to read out information stored in the storage medium 1 from the writing apparatus 4, the settling apparatus 5 or the settling apparatus 6, the storage medium 1 transmits the plain-text predetermined encipherment key and enciphered data for information that is an object of the read demand to the writing apparatus 4, the settling apparatus 5 or the settling apparatus 6. The writing apparatus 4, the settling apparatus 5 or the settling apparatus 6 deciphers the enciphered data for the information that is an object of the read demand on the basis of the plain-text predetermined encipherment key transmitted from the storage medium 1.

When the writing apparatus 4, the settling apparatus 5 or the settling apparatus 6 deciphers the enciphered data for the information that is an object of the read demand on the basis of the plain-text predetermined encipherment key, the predetermined encipherment key which is in a plain-text and which is received along with the enciphered data is compared with a predetermined encipherment key obtained by deciphering the enciphered data to check the information that is an object of the read demand output from the storage medium 1.

When the writing apparatus 4, the settling apparatus 5 or the settling apparatus 6 writes information into the storage medium 1, the writing apparatus 4, the settling apparatus 5 or the settling apparatus 6 may encipher the information that is an object of a write demand on the basis of the plain-text predetermined encipherment key transmitted from the storage medium 1, and transmit it to the storage medium 1 to write it thereinto. In the storage medium 1, the plain-text predetermined encipherment key, which is set and stored in the storage medium 1, is compared with a predetermined encipherment key, which is obtained by deciphering the enciphered data for the information that is an object of the write demand, to check the information that is an object of the write demand transmitted from the writing apparatus 4, the settling apparatus 5 or the settling apparatus 6.

When the storage medium 1 receives a read demand to read information stored in the storage medium 1 from the writing apparatus 4, the settling apparatus 5 or the settling apparatus 6, the storage medium 1 transmits an identification number and a term of validity along with the information that is an object of the read demand to the writing apparatus 4, the settling apparatus 5 or the settling apparatus 6. The writing apparatus 4, the settling apparatus 5 or the settling apparatus 6 may check correctness of the identification number and the term of validity.

The writing apparatus 4 transmits and writes to the storage medium 1, as use information, a passage time (i.e., time of passage) of the vehicle 3 at the entrance toll adjusting gate of the vehicle 3 passing through the entrance toll adjusting gate. When the settling apparatus 5 for the exit toll adjusting gate adjusts a toll, the settling apparatus 5 acquires the passage time (i.e. time of passage) from the storage medium 1, and checks a required travel time period (i.e. the amount of time the vehicle required to travel between the entrance and exit toll adjusting gates) based upon the passage time at the entrance toll gate to an arrival time at the exit toll adjusting gate of the vehicle.

If either one of the first toll payment system or the second toll payment system is a toll pre-payment system, the system has a depositing apparatus 7 for the toll pre-payment system which performs a depositing process to deposit a pre-payment on the storage medium 1. The storage medium 1 retains depositing information output from the depositing apparatus 7 and balance information. The balance information becomes an object of a toll to be collected when the settling apparatus 5 for the exit toll adjusting gate or the settling apparatus 6 for the entrance/exit toll adjusting gate in the toll pre-payment system automatically adjusts the toll. When the storage medium 1 is inserted in the depositing apparatus 7, the depositing apparatus 7 communicates at the first predetermined frequency with the storage medium 1, and adds a sum of money deposited this time (i.e. currently) to a balance included in the balance information to obtain a new balance. The depositing apparatus 7 transmits the balance information, including the new balance and the depositing information including the sum of the money deposited this time, to the storage medium 1 by radio communication at the first predetermined frequency to write them thereinto.

In the depositing process performed by the depositing apparatus 7, the depositing apparatus 7 transmits to the storage medium 1, a password input from the depositing apparatus 7 by radio communication at the first predetermined frequency. The storage medium 1 compares a password, which is set and stored in the storage medium 1, with the password transmitted from the depositing apparatus 7 to check on a payer depositing the money into the storage medium 1.

When the storage medium 1 receives a read demand to read out information stored in the storage medium 1 from the depositing apparatus 7, the storage medium 1 transmits a plain-text predetermined encipherment key and enciphered data for the information that is an object of the read demand by radio communication at the first predetermined frequency. The depositing apparatus 7 deciphers the enciphered data for the information that is an object of the read demand with the plain-text predetermined encipherment key transmitted from the storage medium 1.

When the depositing apparatus 7 deciphers the enciphered data for the information that is an object of the read demand with the predetermined encipherment key, the depositing apparatus 7 may compare the plain-text predetermined encipherment key, which is received along with the enciphered data, with a predetermined encipherment key obtained by deciphering the enciphered data to check the information that is an object of the read demand issued from the storage medium 1.

If information is written in the storage medium 1 from the depositing apparatus 7, the depositing apparatus 7 enciphers the information that is an object of the write demand with the plain-text predetermined encipherment key transmitted from the storage medium 1 and writes the enciphered data onto the storage medium 1. On this occasion, the storage medium 1 compares a plain-text predetermined encipherment key, which is set and stored in the storage medium 1, with a predetermined encipherment key obtained by deciphering the enciphered data for the information that is an object of the write demand with the plain-text predetermined encipherment key to check the information that is an object of the write demand transmitted from the depositing apparatus 7.

When the storage medium 1 receives a read demand to read information stored in the storage medium 1 from the depositing apparatus 7, it is possible that the storage medium 1 transmits by radio communication at the first predetermined frequency an identification number and a term of validity along with the information that is an object of the read demand to the depositing apparatus 7.

The depositing apparatus 7 then checks the identification number and the term of validity.

It is also possible that a maximum amount of deposit money and a maximum balance are set and stored in advance in the storage medium 1. In a depositing process by the depositing apparatus 7, the depositing apparatus 7 acquires the maximum amount of deposit money and the maximum balance along with the balance information from the storage medium 1 and checks the maximum amount of deposit money and the maximum balance.

It is possible that the system includes a totaling apparatus for totaling a) the accumulation of the deposited money which is written as the deposit money information into each storage medium 1 by the depositing apparatus 7 and b) the accumulation of collected tolls which is transmitted to each storage medium 1 from the toll adjusting gate in the toll pre-payment system. The totaling apparatus manages a total sum that is a balance of these accumulations.

The system further includes an inquiring apparatus 8 for inquiring about information stored in the storage medium 1. When the storage medium 1 is inserted in the inquiring apparatus 8, the inquiring apparatus 8 obtains information stored in the storage medium by radio communication at the first predetermined frequency with the storage medium 1, and outputs this information.

The inquiring apparatus 8 may obtains not only designated information from the storage medium 1 and outputs the designated information, but also obtains a history of the designated information from the storage medium 1 to output the history of the designated information.

When the storage medium 1 receives a read demand to read information stored in the storage medium 1 from the inquiring apparatus 8, the storage medium 1 transmits an identification number along with the information that is an object of the read demand to the inquiring apparatus 8 by radio communication at the first predetermined frequency. The inquiring apparatus 8 may check correctness of the identification number.

When the storage medium 1 receives a read demand to read information stored in the storage medium from the inquiring apparatus 8, the storage medium 1 transmits a predetermined encipherment key, which is in a plain-text, and enciphered data for the information that is an object of the read demand to the inquiring apparatus 8 by radio communication at the first predetermined frequency. The inquiring apparatus 8 deciphers the enciphered data for the information that is an object of the read demand with the plain-text predetermined encipherment key which is transmitted from the storage medium 1.

At the exit toll adjusting gate employing the toll pre-payment system as the first or the second payment system, the settling apparatus 5 at this exit toll adjusting gate exchanges information with the storage medium 1 on the vehicle 3 to obtain use information including unique information about an entrance toll adjusting gate through which the vehicle 3 has passed and the balance information in addition to a result of recognition about a vehicle type of the vehicle 3. The settling apparatus 5 calculates a toll to be collected on the basis of the use information and the result of the recognition, and subtracts the toll to be collected from a balance included in the balance information. The setting apparatus 5 then transmits a) the balance information including a new balance which is a result of the subtraction and b) adjustment result information including the calculated toll and payment distinction indicating the pre-payment system to the storage medium 1 to write them therein.

At the entrance/exit toll adjusting gate employing the toll pre-payment system as the first or the second toll payment system, the settling apparatus 6 at this entrance/exit toll adjusting gate exchanges information with the storage medium 1 on the vehicle 3 to acquire the balance information and a recognition result about a vehicle type of the vehicle 3. The setting apparatus 6 calculates a toll to be collected on the basis of the recognition result, subtracts the toll to be collected from a balance included in the balance information, and transmits a) the balance information including a new balance which is a result of the subtraction and b) the adjustment result information including payment distinction showing the collected toll and payment distinction indicating the pre-payment system to the storage medium 1 to write them thereinto.

When the storage medium 1 is inserted in the frequency converting apparatus 2, the frequency converting apparatus 2 transmits a password input through the frequency converting apparatus 2 to the storage medium 1 by radio communication at the first predetermined frequency. The storage medium 1 compares a password, which is set and stored in the storage medium 1, with the password transmitted from the frequency converting apparatus 2 to check on a user of the storage medium 1.

At the exit toll adjusting gate employing the toll post-payment system as the first or the second toll payment system, the exit toll adjusting gate has a vehicle type recognizing apparatus which can automatically recognize a type of vehicle 3 passing through this exit toll adjusting gate. The settling apparatus 5 at the exit toll adjusting gate exchanges information with the storage medium 1 to obtain the personal information and the use information including the unique information about an entrance toll adjusting gate through which the vehicle 3 has passed and in addition obtains a result of recognition of the type of vehicle 3 from the vehicle type recognizing apparatus. The setting apparatus 5 calculates a toll to be collected on the basis of the use information and the recognition result, and transmits the adjustment result information including the toll to be collected and payment distinction showing that this is the toll post-payment system to the storage medium 1 to write it as the use information thereinto.

The entrance/exit toll adjusting gate employing the toll post-payment system as the first or the second payment system includes a vehicle type recognizing apparatus which can automatically recognize a type of vehicle 3 passing through this entrance/exit toll adjusting gate. The settling apparatus 6 at the entrance/exit toll adjusting gate exchanges information with the storage medium 1 on the vehicle 3 to acquire the personal information and in addition obtains a result of the recognition of the type of vehicle 3 from the vehicle type recognizing apparatus. The setting apparatus 6 calculates a toll to be collected on the basis of the recognition result, and transmits a) the adjustment result information, including the toll to be collected, and b) payment distinction showing that this is the toll post-payment system to the storage medium 1 to write it as the use information thereinto.

If the toll post-payment is employed, a host computer, managing the settling apparatus 5 or the settling apparatus 6, withdraws the charged toll calculated by the settling apparatus 5 or the settling apparatus 6 from a bank account specified in the personal information acquired by the settling apparatus 5 or the settling apparatus 6.

The exit toll adjusting gate or the entrance/exit toll adjusting gate employing the toll post-payment system is divided into three zones which are 1) a vehicle type recognizing zone for recognizing a type of vehicle 3 by the vehicle recognizing apparatus, 2) a toll settling zone for automatically adjusting a toll by the settling apparatus 5 or the settling apparatus 6, and 3) and an image zone for photographing an improper or invalid vehicle by a photographing apparatus.

In each of the zones, information is exchanged with the storage medium 1 about a vehicle passing through to acquire the personal information from the storage medium 1. A result of the recognition of the vehicle type, a result of the adjustment and a result of the photographing obtained in the respective three zones are correlated to a specific vehicle on the basis of the obtained personal information.

It is possible to provide a sensor for detecting passage of the vehicle 3 in each of the zones. When the sensors detect passage of the vehicle 3, the personal information is acquired from the storage medium 1 on the vehicle 3 in each of the zones, and processing in each of the zones is performed.

The entrance toll adjusting gate employing the toll post-payment system as the first or the second toll payment system is divided into two zones which are 1) a passage recognizing zone for writing the use information including the unique information about the entrance toll adjusting gate as the adjustment information into the storage medium 1 on the vehicle 3 passing through the entrance toll adjusting gate by the writing apparatus 4 and 2) an image zone for photographing an improper or invalid vehicle by a photographing apparatus.

It is possible to provide sensors for detecting passage of the vehicle 3 in the respective two zones. If the sensors detect passage of the vehicle 3, processing in each of the zones is performed.

Figure 2:
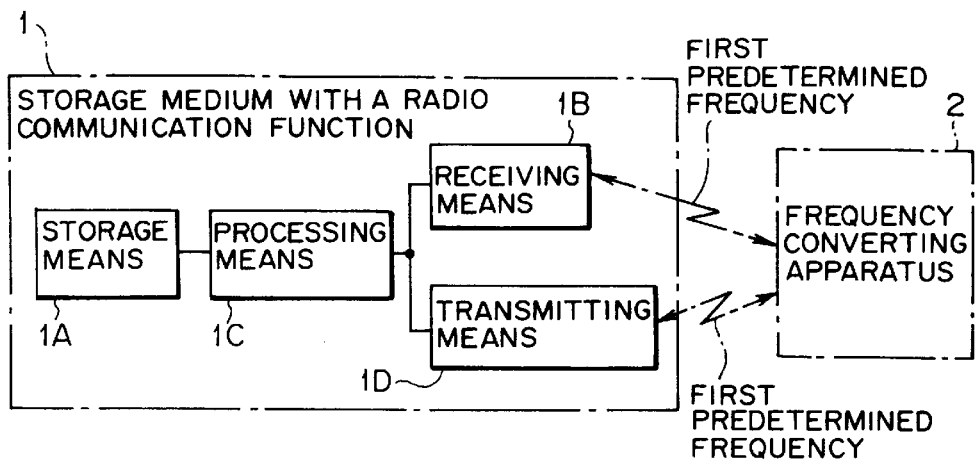

FIG. 2 is a block diagram showing another aspect of this invention (i.e., a storage medium having a radio communication function for the automatic toll adjusting system). A storage medium 1 having the radio communication function shown in FIG. 2 is possessed by each of the users and is to be used in the automatic toll adjusting system which was described above with reference to FIG. 1. The storage medium 1 has a storing means 1A, a receiving means 1B, a processing means 1C and a transmitting means 1D.

The storing means 1A stores the adjustment information necessary for toll adjustment therein. The receiving means 1B receives information from the outside by radio communication at the first predetermined frequency.

The processing means 1C reads information stored in the storing means 1A or writes information into the storing means 1A on the basis of information received by the receiving means 1B. The transmitting means 1D transmits responsive information including information output from the storing means 1A by radio communication at the first predetermined frequency.

At the toll adjusting gate employing the first toll payment system, information is directly exchanged between the receiving means 1B and the transmitting means 1D of the storage medium 1 and a writing apparatus (refer to numeral 4 in FIG. 1) or the settling apparatus (refer to reference numerals 5 and 6 in FIG. 1) for automatic toll adjustment by radio communication at the first predetermined frequency.

On the other hand, at the toll adjusting gate employing the second toll payment system, under a condition where the storage medium 1 is inserted in the frequency converting apparatus 2 (which converts information at the first predetermined frequency into the second predetermined frequency, and which converts information at the second predetermined frequency into the first predetermined frequency), information is indirectly exchanged between the receiving means 1B and the transmitting means 1D of the storage medium 1 and the writing apparatus or the settling apparatus for automatic toll adjustment at the toll adjusting gate via the frequency converting apparatus 2 by radio communication at the second predetermined frequency.

The storing means 1A retains a) information which is in a state of enciphered data which is obtained by enciphering the information with a predetermined encipherment key from the outside and b) the predetermined encipherment key in a state of plain-text. The storing means also sets and stores a password therein in advance.

When receiving a read demand from the outside through the receiving means 1B, the processing means 3C reads out a) enciphered data for the information that is an object of the read demand and b) a plain-text predetermined encipherment key, and transmits them through the transmitting means 1D.

The storage medium 1 further includes a) a deciphering means for deciphering an encipherment key that was used to encipher the enciphered data and is included in the enciphered data for information that is an object of a write demand on the basis of the plain-text predetermined encipherment key which is stored in the storing means 1A when the storage medium 1 receives the write demand transmitted from the outside corresponding to transmission of the information that is an object of the read demand by a receiving means 1B, and b) an encipherment key check means for comparing 1) the encipherment key which is deciphered by the deciphering means and 2) the plain-text predetermined encipherment key which is stored in the storing means 1A to check the information that is an object of the write demand.

The storage medium 1 may further include a password check means. When the storage medium 1 receives a read demand accompanied by a password through the receiving means 1B during a depositing process for toll pre-payment, the password check means compares the password accompanying the read demand with the password stored in the storing means 1A to check on a payer. The storage medium 1 may still further include a second password check means. When the storage medium 1 receives a password input through the frequency converting apparatus 2 when inserted into the frequency converting apparatus 2, this second password check means compares the received password with a password stored in the storing means 1A to check on a user (i.e., user and payer may be the same or may be different).

Figure 3:
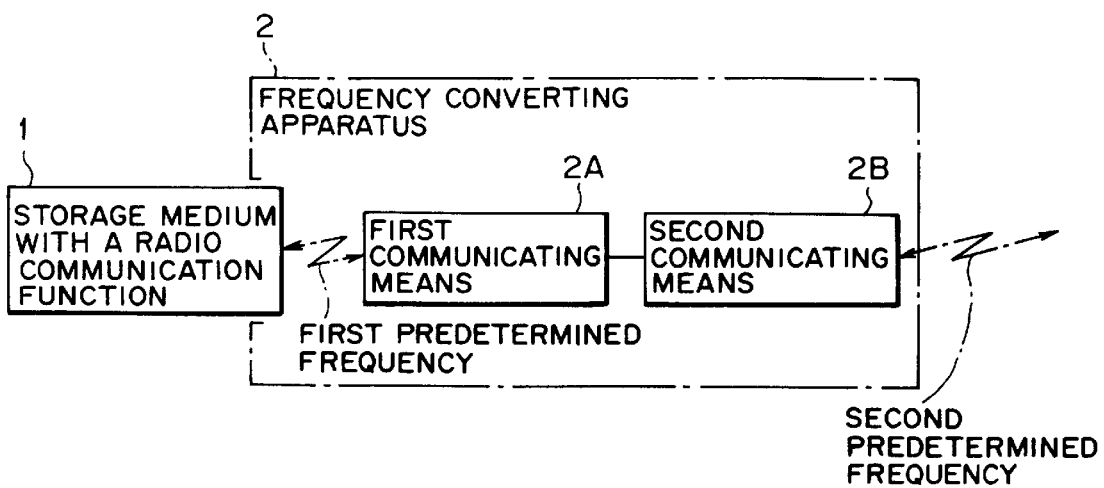

FIG. 3 is a block diagram showing another aspect of this invention (i.e., a frequency converting apparatus for the automatic toll adjusting system). A frequency converting apparatus 2 shown in FIG. 3 is used in the automatic toll adjusting system, which was described above with reference to FIG. 1.

The frequency converting apparatus 2 has the storage medium 1 having the radio communication function (which is possessed by each user, and stores the adjustment information necessary for toll adjustment and exchanges information with the outside by radio communication at the first predetermined frequency) inserted therein, when the user passes through a toll adjusting gate.

The frequency converting apparatus 2 has a first communicating means 2A and a second communicating means 2B.

The first communicating means 2A exchanges information with the storage medium 1 by radio communication at the first predetermined frequency when the storage medium 1 is inserted in the frequency converting apparatus 2. The second communicating means 2B exchanges information with the outside by radio communication at the second predetermined frequency. When the storage medium 1 is inserted in the frequency converting apparatus 2, the first communication means 2A transmits information, received from the outside by the second communication means 2B, to the storage medium 1 by radio communication at the first predetermined frequency, while the second communicating means 2B transmits information, received from the storage medium 1 by the first communicating means, to the outside by radio communication at the second predetermined frequency.

At the toll adjusting gate, information is exchanged between a) the writing apparatus (refer to reference numeral 4 in FIG. 1) or the settling apparatus (refer to reference numerals 5 and 6 in FIG. 1) for automatic toll adjustment at the toll gate and b) the storage medium 1 via the first communication means 2A and the second communicating means 2B of the frequency converting apparatus 2 under a condition where the storage medium 1 is inserted in the frequency converting apparatus 2.

If a password is set and stored in advance in the storage medium 1 having the radio communication function, the frequency converting apparatus 2 may have an inputting means for inputting the password to check on a user of the storage medium 1 when the storage medium 1 is inserted therein, and to transmit the password output through the inputting means to the storage medium 1 through the first communicating means 2A by radio communication at the first predetermined frequency.

Figure 4:
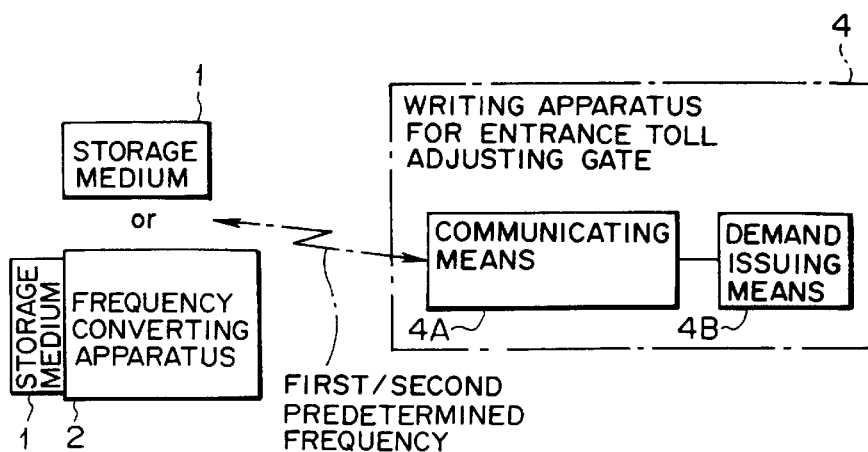

FIG. 4 is a block diagram showing still another aspect of this invention (i.e., a writing apparatus for the automatic toll adjusting system). A writing apparatus 4 shown in FIG. 4 is used in the automatic toll adjusting system which was described above with reference to FIG. 1 for writing the use information, which is necessary for automatic toll adjustment, as the adjustment information in the storage medium 1 having the radio communication function.

The writing apparatus 4 has a communicating means 4A and a demand issuing means 4B.

At the entrance toll adjusting gate employing the first toll payment system, the communicating means 4A exchanges information with the storage medium 1 having the radio communication function by radio communication at the first predetermined frequency. At the entrance toll adjusting gate employing the second toll payment system, the radio communicating means 4A exchanges information with the storage medium 1 having the radio communication function by radio communication at the second predetermined frequency.

The demand issuing means 4B issues a write demand including the unique information about an entrance toll adjusting gate to the storage medium 1 passing through the entrance toll adjusting gate through the communicating means 4A. A passage time (i.e., a time at which the vehicle passed through the entrance toll adjusting gate) may be included in the use information along with the unique information about the entrance toll adjusting gate.

If an identification number and a term of validity of the storage medium 1 is set and stored in advance in the storage medium 1 having the radio communication function, the writing apparatus 4 may include a check means to perform a check on the identification number and the term of validity. In this case, when the user with the storage medium 1 passes through the entrance toll adjusting gate, the demand issuing means 4B issues a read demand to the storage medium 1 to read an identification number and a term of validity for the storage medium 1 on the vehicle through the communicating means 4A prior to issuing a write demand to write the use information. When the communicating means 4A receives the identification number and the term of validity from the storage medium 1 in response to the read demand, this check means performs a check on the received identification number and the term of validity.

If the information stored in the storage medium 1 is enciphered data having been enciphered with a predetermined encipherment key and the storage medium 1 retains the predetermined encipherment key as plain-text, the writing apparatus 4 has a deciphering means for deciphering the enciphered data. In this case, the communicating means 4A receives the enciphered data for an identification number and a term of validity and the plain-text predetermined encipherment key from the storage medium 1 in response to a read demand issued from the demand issuing means 4B. The deciphering means deciphers the enciphered data for the identification number and the term of validity with the plain-text predetermined encipherment key.

If the enciphered data for the identification number and the term of validity includes an enciphered encipherment key which is obtained by enciphering the plain-text predetermined encipherment key with the predetermined encipherment key, the writing apparatus 4 may have an encipherment key check means. The encipherment key check means compares the plain-text predetermined encipherment key, which is provided along with the enciphered data, with a predetermined encipherment key which is obtained by deciphering the enciphered data by the deciphering means to check the information that is an object of the read demand.

If the information stored in the storage medium 1 is enciphered data which is enciphered with a predetermined encipherment key, the writing apparatus 4 has an enciphering means for enciphering the use information which is an object of a write demand issued for the demand issuing means to write it into the storage medium 1 with a plain-text predetermined encipherment key which is received along with the enciphered data. The enciphering means enciphers the plain-text predetermined encipherment key, which is used for enciphering, with the predetermined encipherment key on the basis of the predetermined encipherment key. This enciphered predetermined encipherment key may be included in the enciphered data for the information that is an object of the write demand to write it into the storage medium 1.

Figure 5:
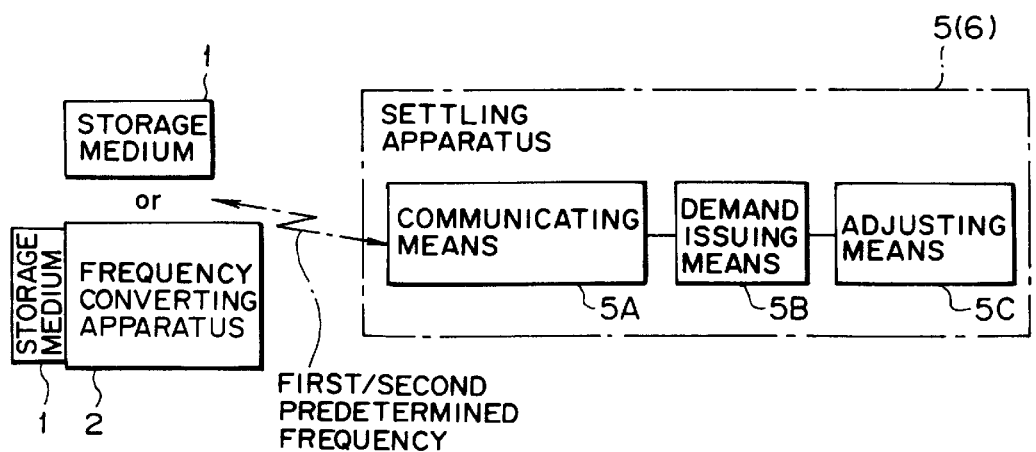

FIG. 5 is a block diagram showing still another aspect of this invention (i.e., a settling apparatus for the automatic toll adjusting system). The settling apparatus 5 (6) shown in FIG. 5 is used in the automatic toll adjusting system which was described above with reference to FIG. 1. The settling apparatus 5 (6) is installed at a toll adjusting gate to acquire or to obtain the adjustment information from the storage medium 1 having the radio communication function and automatically adjusts a toll to be charged to a holder of the storage medium 1 on the basis of the adjustment information.

The settling apparatus 5 (6) has a communicating means 5A, a demand issuing means 5B and a toll adjusting means 5C.

The communicating means 5A exchanges information with the storage medium 1 having the radio communication function by radio communication at the first predetermined frequency at a toll adjusting gate employing the first toll payment system. The communicating means 5A exchanges information with the storage medium 1 by radio communication at the second predetermined frequency at a toll adjusting gate employing the second toll payment system.

The demand issuing means 5B issues a) a read demand to read adjustment information or b) a write demand to write adjustment result information onto the storage medium 1 through the communicating means 5A. The toll adjusting means 5C automatically adjusts a toll to be charged to a holder of the storage medium 1 on the basis of the adjustment information which is transmitted from the storage medium 1 in response to the read demand which is issued from the demand issuing means 5B and received through the communicating means 5A.

When the user with the storage medium 1 passes through the exit toll adjusting gate or the entrance/exit toll adjusting gate, the demand issuing means 5B issues a read demand to a storage medium 1 and vehicle to read the adjustment information through the communicating means 5A. When the communicating means 5A receives the adjustment information from the storage medium 1 in response to the read demand, the adjusting means 5C automatically adjusts a toll to be charged to the holder of the storage medium 1 on the basis of the received adjustment information.

The demand issuing mean 5B then issues a write demand to the storage medium 1 to write the adjustment result information including the collected toll adjusted by the toll adjusting means 5C and payment distinction showing whether this payment system is the first toll payment system or the second toll payment system to the storage medium 1 through the communicating means 5A.

If an identification number and a term of validity of the storage medium 1 having the radio communication function are set and stored in advance in the storage medium 1, the settling apparatus 5 (6) may have a check means to perform a check on the identification number and the term of validity. In this case, the demand issuing means 5B issues a read demand to read the identification number and the term of validity from the storage medium 1 through the communicating means 5A when a settling process is initiated. When the communicating means 5A receives the identification number and the term of validity from the storage medium 1 in response to the read demand, the check means performs a check on the received identification number and the term of validity.

If the information stored in the storage medium 1 is enciphered data having been enciphered with a predetermined encipherment key and the storage medium 1 retains the predetermined encipherment key as plain-text, the settling apparatus 5 (6) has a deciphering means to decipher the enciphered data. In this case, the communicating means 5A receives the enciphered data for information that is an object of the read demand and the plain-text predetermined encipherment key from the storage medium 1 in response to the read demand issued from the demand issuing means 5B. The deciphering means deciphers the enciphered data for the identification number and the term of validity with the plain-text predetermined encipherment key.

On this occasion, if the enciphered data which is the information that is an object of the read demand includes an enciphered encipherment key obtained by enciphering the plain-text predetermined encipherment key with the predetermined encipherment key, the settling apparatus 5 (6) may has an encipherment key check means. The encipherment check means compares the plain-text predetermined encipherment key, which is received along with the enciphered data, with a predetermined encipherment key which is obtained by deciphering the enciphered data by the deciphering means to check the information that is an object of the read demand.

If the information stored in the storage medium 1 is enciphered data having been enciphered with a predetermined encipherment key, the settling apparatus 5 (6) may have an enciphering means for enciphering the toll adjustment result information, which is an object of a write demand issued from the demand issuing means 5B, and is to be written in the storage medium 1 with the plain-text predetermined encipherment key which is received with the enciphered data. The enciphering means enciphers the plain-text predetermined encipherment key, which is used for enciphering, with the predetermined encipherment key. The enciphered predetermined encipherment key may be included in the enciphered data for the information that is an object of a write demand to write the information in the storage medium 1.

Figure 6:
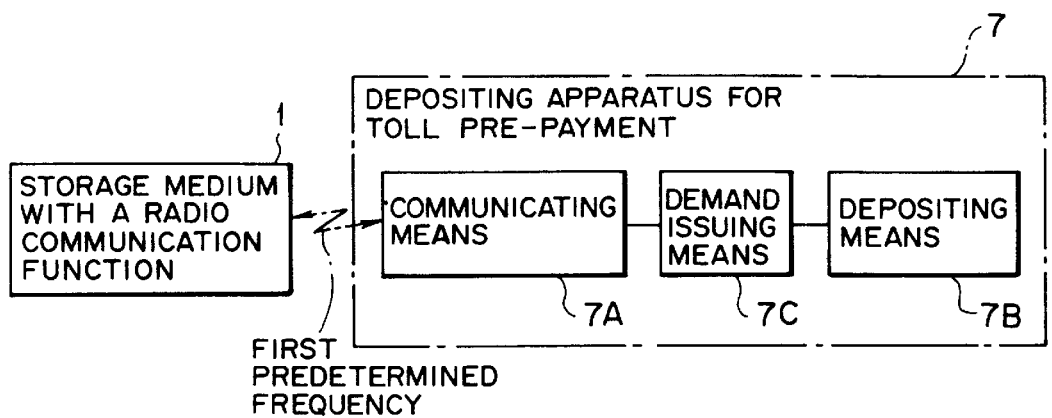

FIG. 6 is a block diagram showing still another aspect of this invention (i.e., a depositing apparatus for the automatic toll adjusting system). The depositing apparatus 7 shown in FIG. 6 is used in the automatic toll adjusting system which was described above with reference to FIG. 1, which performs a depositing process for toll pre-payment on the storage medium 1 having the radio communication function. The storage medium retains the balance information therein that is an object of a charged toll upon automatic toll adjustment at a toll adjusting gate in the toll pre-payment system.

The depositing apparatus 7 has a communicating means 7A, a depositing means 7B and a demand issuing means 7C.

The communicating means 7A directly exchanges information with the storage medium 1 having the radio communication function by radio communication at the first predetermined frequency. The depositing means 7B performs a depositing process on the storage medium 1 having the radio communication function.

The demand issuing means 7C issues a read demand to the storage medium 1 through the communicating means 7A, or a write demand to write depositing information and new balance information resulted from the depositing process performed by the depositing means 7B.

When the depositing apparatus 7 performs the depositing process on the storage medium 1, the demand issuing means 7C issues a read demand through the communicating means 7A to the storage medium 1. When the communicating means 7A receives the balance information from the storage medium 1 in response to the read demand, the depositing means 7B adds a sum of money deposited this time (i.e., currently deposited) to a balance included in the received balance information to calculate a new balance.

The demand issuing means 7C then issues a write demand to write the balance information, including the new balance calculated by the depositing means 7B, and the depositing information, including the sum of money deposited this time, to the storage medium 1 through the communicating means 7A.

If a password of the storage medium 1 is set and stored in advance in the storage medium 1, the depositing apparatus 7 may have an inputting means for inputting the password to check on a user of the storage medium 1 when the storage medium 1 is inserted therein, and to transmit the password input through the input means to the storage medium 1 through the communicating means 7A by radio communication at the first predetermined frequency.

If an identification number and a term of validity of the storage medium 1 are set and stored in advance in the storage medium 1, the depositing apparatus 7 may have a check means for performing a check on the identification number and the term of validity. In this case, the demand issuing means 7C issues a read demand to read the identification number and the term of validity to the storage medium 1 through the communicating means 7A when the depositing process is initiated. When the communicating means 7A receives the identification number and the term of validity from the storage medium 1 in response to the read demand, the check means performs a check on the received identification number and the term of validity.

If a maximum amount of deposit money and a maximum balance for the storage medium 1 are set and stored in advance in the storage medium 1, the depositing apparatus 7 may have a depositing money check means for checking the depositing process by the depositing means 7B. In this case, the demand issuing means 7C issues a read demand to read the maximum amount of deposit money and the maximum balance from the storage medium 1 through the communicating means 7A when the depositing process is initiated. When the communicating means 7A receives the maximum amount of deposit money and the maximum balance from the storage medium 1 in response to the read demand, the depositing money check means checks the depositing process performed by the depositing means 7B on the basis of the received maximum amount of deposit money and the maximum balance.

Further, if information in the storage medium 1 is enciphered data having been enciphered with a predetermined encipherment key and the storage medium 1 retains the predetermined encipherment key as plain-text therein, the depositing apparatus 7 includes a deciphering means for deciphering the enciphered data. In this case, the communicating means 7A receives the enciphered data, for information that is an object of the read demand, and the plain-text predetermined encipherment key which is transmitted from the storage medium 1 in response to the read demand from the demand issuing means 7C. The deciphering means deciphers the enciphered data for the information that is an object of the read demand with the plain-text predetermined encipherment key.

On this occasion, if the enciphered data includes an enciphered predetermined encipherment key, which is obtained by enciphering the plain-text predetermined encipherment key with the predetermined encipherment key, the depositing apparatus 7 may have an encipherment key check means. The encipherment key check means compares the plain-text predetermined encipherment key, which is received with the enciphered data, with the predetermined encipherment key, which is obtained by deciphering the enciphered data by the deciphering means, to check the information that is an object of the read demand.

If the information stored in the storage medium 1 is enciphered data having been enciphered with a predetermined encipherment key, the depositing apparatus 7 has an enciphering means for enciphering the depositing information and the balance information, that are an object of a write demand issued from the demand issuing means 7C to write the information into the storage medium 1, with the plain-text predetermined encipherment key which is received with the enciphered data. The enciphering means enciphers the plain-text predetermined encipherment key, which is used for enciphering, with the predetermined encipherment key. The enciphered predetermined encipherment key may be included in the enciphered data of the information that is an object of a write demand to write it into the storage medium 1.

Figure 7:
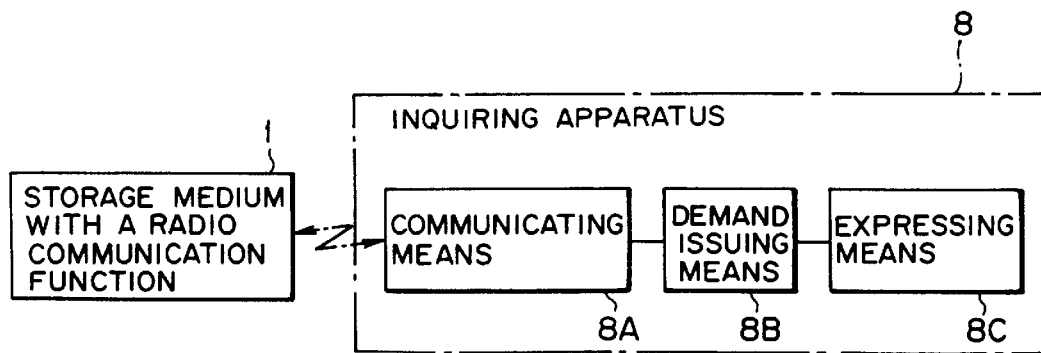

FIG. 7 is a block diagram showing still another aspect of this invention (i.e., an inquiring apparatus for the automatic toll adjusting system). The inquiring apparatus 8 shown in FIG. 7 is used in the automatic toll adjusting system which was described above with reference to FIG. 1, which inquires about information stored in the storage medium 1 having the radio communication function.

The inquiring apparatus 8 has a communicating means 8A, a demand issuing means 8B and an expressing or outputting means 8C.

The communicating means 8A directly exchanges information with the storage medium 1 having the radio communication function by radio communication at the first predetermined frequency. The demand issuing apparatus 8B issues a read demand to read information stored in the storage medium 1 through the communicating means 8A to the storage medium 1 having the radio communication function. The expressing or outputting means 8C clearly outputs the information transmitted from the storage medium 1 in response to the read demand issued from the demand issuing means 8B and received by the receiving means 8A.

If an identification number of the storage medium 1 is set and stored in advance in the storage medium 1, the inquiring apparatus 8 may have a check means for performing a check on the identification number. In this case, the demand issuing means 8B issues a read demand to read the identification number from the storage medium 1 through the communicating means 8A when an inquiring process is initiated. When the communicating means 8A receives the identification number transmitted from the storage medium 1 in response to the read demand, the check means performs a check on the received identification number.

If information stored in the storage medium 1 is enciphered data having been enciphered with a predetermined encipherment key and the storage medium 1 retains the predetermined encipherment key as plain-text therein, the inquiring apparatus 8 has a deciphering means for deciphering the enciphered data. In this case, the communicating means 8A receives the enciphered data, for the information that is an object of a read demand issued from the demand issuing means 8B which is transmitted from the storage medium 1 in response to the read demand, and the plain-text predetermined encipherment key. The deciphering means deciphers the enciphered data for the information that is an object of the read demand with the plain-text predetermined encipherment key.

In the automatic toll adjusting system according to this invention shown in FIG. 1, at the toll adjusting gate employing the first toll payment system, information is directly exchanged with the storage medium 1 by radio communication at the first predetermined frequency to automatically adjust a toll in the first toll payment system. On the other hand, at the toll adjusting gate employing the second toll payment system, the storage medium 1 is inserted in the frequency converting apparatus 2, and information is exchanged indirectly with the storage medium 1 via the frequency converting apparatus 2 by radio communication at the second predetermined frequency to automatically adjust a toll in the second toll payment system.

In other words, by selecting either the direct radio communication at the first predetermined frequency with the storage medium 1 or the indirect radio communication at the second predetermined frequency with the storage medium 1 via the frequency converting apparatus 2 under a condition where the storage medium 1 is inserted in the frequency converting apparatus 2, it is possible for the user to voluntarily select the first or the second toll payment system.

On a toll road where a toll according to a trip distance is collected, the writing apparatus 4 for the entrance toll adjusting gate writes the use information, including the unique information about the entrance toll adjusting gate as the adjustment information, into the storage medium 1 on the vehicle 3 passing through the toll adjusting gate by radio communication. The use information is directly written at the first predetermined frequency when the user selects the first toll payment system, or indirectly written via the frequency converting apparatus 2 at the second predetermined frequency when the user selects the second toll payment system. The settling apparatus 5 for the exit toll adjusting gate acquires the adjustment information from the storage medium 1 directly by radio communication at the first predetermined frequency when the user selects the first toll payment system, or indirectly via the frequency converting apparatus 2 by radio communication at the second predetermined frequency when the user selects the second toll payment system to automatically adjust a toll for the toll road charged to the holder of the storage medium 1 based on the adjustment information.

On a toll road where a toll irrespective of a trip distance is collected, the settling apparatus 6 for the entrance/exit toll adjusting gate acquires the adjustment information from the storage medium 1 directly by radio communication at the first predetermined frequency when the user selects the first payment system, or indirectly via the frequency converting apparatus 2 by radio communication at the second predetermined frequency when the user selects the second toll payment system to automatically adjust a toll charged to the holder of the storage medium 1 based on the adjustment information.

Upon automatic toll adjustment, the settling apparatus 5 or the settling apparatus 6 transmits adjustment result information, including a toll to be collected and payment distinction showing whether this toll payment is in the first payment system or in the second payment system, to the storage medium 1 directly by radio communication at the first predetermined frequency when the user selects the toll pre-payment, or indirectly via the frequency converting apparatus 2 by radio communication at the second predetermined frequency when the user selects the toll post-payment. The setting apparatus 5 or 6 writes the adjustment result information as the use information into the storage medium 1. Accordingly, the storage medium 1 can retain and manage the adjustment result information (the use information) therein.

In the system of this invention, information written in the storage medium 1 is enciphered data for security reasons. A predetermined encipherment key, used to encipher the data, is set and stored as plain-text in the storage medium 1. In addition, a password, an identification number and a term of validity of the storage medium 1 are set and stored in advance in the storage medium 1. Further, information (enciphered data) exchanged with the storage medium 1 by radio communication includes an enciphered encipherment key which is obtained by enciphering the plain-text predetermined encipherment key with the predetermined encipherment key.

When the storage medium 1 receives a read demand to read information stored in the storage medium 1 from the writing apparatus 4, the settling apparatus 5 or the settling apparatus 6, the storage medium 1 transmits the predetermined plain-text encipherment key and enciphered data which is the information that is an object of the read demand to the writing apparatus 4, the settling apparatus 5 or the settling apparatus 6. The writing apparatus 4, the settling apparatus 5 or the settling apparatus 6 deciphers the enciphered data, which is the information that is an object of the read demand, with the plain-text predetermined encipherment key from the storage medium 1, whereby it is possible to prevent the information from being wrongfully intercepted when the information is transmitted from the storage medium 1 to the writing apparatus 4, the settling apparatus 5 or the settling apparatus 6.

When the writing apparatus 4, the settling apparatus 5 or the settling apparatus 6 deciphers the enciphered data, the plain-text predetermined encipherment key, which is received with the enciphered data, is deciphered with a predetermined encipherment key which is obtained by deciphering the enciphered data. The apparatuses 4, 5 or 6 thus check the information that is an object of a read demand transmitted from the storage medium 1. If any fraudulent, invalid or improper act such as falsification has been done on the data stored in the storage medium 1, it is possible to verify such data.

When the writing apparatus 4, the settling apparatus 5 or the settling apparatus 6 writes information into the storage medium 1, the information that is an object of a write demand is enciphered, in the writing apparatus 4, the settling apparatus 5 or the settling apparatus 6 with a plain-text predetermined encipherment key output from the storage medium 1, and the enciphered data is transmitted to and written in the storage medium 1, whereby it is possible to prevent the information from being wrongfully intercepted when the information is transmitted from the writing apparatus 4, the settling apparatus 5 or the settling apparatus 6 to the storage medium 1.

When the storage medium 1 receives the enciphered data that is an object of the write demand issued from the writing apparatus 4, the settling apparatus 5 or the settling apparatus 6, the storage medium 1 compares a plain-text predetermined encipherment key, which is set and stored in advance in the storage medium 1, with a predetermined encipherment key, which is obtained by deciphering the enciphered data that is an object of the write demand with the plain-text predetermined encipherment key, to check the information that is an object of the write demand which is transmitted from the writing apparatus 4, the settling apparatus 5 or the settling apparatus 6. If any fraudulent, invalid or improper act such as falsification has been done on the data to be written in the storage medium 1, it is possible to verify such data.

When the storage medium 1 transmits the information demanded by the writing apparatus 4, the settling apparatus 5 or the settling apparatus 6, the storage medium 1 transmits an identification number and a term of the validity along with the information to the writing apparatus 4, the settling apparatus 5 or the settling apparatus 6. The writing apparatus 4, the settling apparatus 5 or the settling apparatus 6 checks the identification number and the term of validity, whereby it is possible to confirm the validity of the storage medium 1, and to avoid fraudulent, invalid or improper use of the storage medium 1.

On a toll road where a toll according to a trip distance is collected, the writing apparatus 4 transmits a passage time (i.e. time of passage) through the entrance toll adjusting gate to the storage medium 1 on the vehicle 3 passing through the entrance toll adjusting gate and writes the passage time as the use information into the storage medium 1. Therefore, when a toll is automatically adjusted by the settling apparatus 5 for the exit toll adjusting gate, the settling apparatus 5 may acquire the passage time from the storage medium 1 to perform a check on a required time (i.e. the time which was required by the vehicle to travel between the entrance and exit toll adjusting gates) from a) the passage time at the entrance toll adjusting gate to b) an arrival time at the exit toll adjusting gate. If the user has done any fraudulent, invalid or improper act during use of the toll road, it is possible to verify such an act by determining a time period necessary for the user to travel on the toll road and to perform such a check.

If either the first toll payment system or the second toll payment system is the toll pre-payment system, a depositing process, for toll pre-payment, on the storage medium 1 can be performed using the depositing apparatus 7 for the toll pre-payment. Namely, the storage medium 1 retains therein the depositing money information, which is output from the depositing apparatus 7, and the balance information, which is an object of toll collection, in the event of automatic toll adjustment at the toll adjusting gate in the toll pre-payment system. For the depositing process, the storage medium 1 is inserted into the depositing apparatus 7. The depositing apparatus 7 acquires the balance information from the storage medium 1 by direct radio communication at the first predetermined frequency with the storage medium 1, adds a sum of money currently deposited to a balance included in the balance information, directly transmits the balance information including a new balance obtained by addition of the sum of money, and the depositing information, including the sum of money deposited this time, to the storage medium 1 by radio communication at the first predetermined frequency to write the balance information and the depositing information in the storage medium 1. Thus, the depositing process performed on the storage medium 1 is completed.

During the depositing process by the depositing apparatus 7, a password input through the depositing apparatus 7 is directly transmitted to the storage medium 1 by radio communication at the first predetermined frequency, compared in the storage medium 1 with a password set and stored in the storage medium 1 to check on a payer to the storage medium 1, thereby verifying whether the payer is the owner of the storage medium.

When the storage medium 1 transmits information demanded by the depositing apparatus 7, a plain-text predetermined encipherment key is directly transmitted along with enciphered data for the information to the depositing apparatus 7 by radio communication at the first predetermined frequency. The depositing apparatus 7 deciphers the enciphered data, which is the information that is an object of the read demand, with the plain-text predetermined encipherment key which is transmitted from the storage medium 1, thereby preventing the information from being wrongfully intercepted when the information is transmitted from the storage medium 1 to the depositing apparatus 7.

When the depositing apparatus 7 deciphers the enciphered data, the predetermined plain-text encipherment key, which is received with the enciphered data, is compared with a predetermined encipherment key, which is obtained by deciphering the enciphered data, to check the information that is an object of the read demand transmitted from the storage medium 1. It is, therefore, possible, if any fraudulent, improper or invalid act such as falsification has been done on the data stored in the storage medium 1, to verify such data.

When information is written into the storage medium 1 from the depositing apparatus 7, the depositing apparatus 7 enciphers information, that is an object of the write demand, with the plain-text predetermined encipherment key which is transmitted from the storage medium 1. This enciphered data is directly transmitted to the storage medium 1 by radio communication at the first predetermined frequency to be written in the storage medium 1. It is, therefore, possible to prevent the information from being fraudulently intercepted when the information is transmitted from the depositing apparatus 7 to the storage medium 1.

When the storage medium 1 receives the enciphered data, that is an object of the write demand transmitted from the depositing apparatus 7, the storage medium 1 compares the plain-text predetermined encipherment key, which is set and stored in advance in the storage medium 1, with a predetermined encipherment key which is obtained by deciphering the enciphered data of the information that is an object of the write demand with the plain-text predetermined encipherment key, to check the information that is an object of the write demand transmitted from the depositing apparatus 7. Accordingly, if any fraudulent, invalid or improper act such as falsification as been done on the data to be written into the storage medium 1, it is possible to verify such data.

When the storage medium 1 transmits information demanded by the depositing apparatus 7 to the depositing apparatus 7, the storage medium 1 directly transmits an identification number and a term of validity along with the information to the depositing apparatus 7 by radio communication at the first predetermined frequency. The depositing apparatus 7 checks the identification number and the term of validity. Accordingly, it is possible to confirm correctness of the storage medium 1, and to avoid a fraudulent, invalid or improper use of the storage medium 1.

During the depositing process by the depositing apparatus 7, the depositing apparatus 7 acquires a maximum amount of deposit money and a maximum balance along with the balance information from the storage medium 1 to perform a check on the maximum amount of deposit money and the maximum balance. Accordingly, it is possible to prevent deposit money which exceeds the maximum amount of deposit money or a balance from exceeding the maximum balance in the depositing process.

A totaling apparatus totals accumulation of sums of depositing money and accumulation of collected tolls for each storage medium 1 to manage a total sum that is a balance of these accumulation. Accordingly, if a sum of payment to the storage medium 1 has been fraudulently, improperly or invalidly operated, it is possible to verify such a fraudulent, invalid or improper operation.

It is possible that the inquiring apparatus 8 and the storage medium 1 communicate directly with each other by radio communication at the first predetermined frequency by inserting the storage medium 1 into the inquiring apparatus 8 so that inquiring apparatus 8 may output information retained (i.e., stored) in the storage medium 1, so that the owner or user of the storage medium can understand and manage the information in the storage medium 1. On this occasion, the inquiring apparatus 8 can output not only designated information but also a history of the designated information so that a use history or the like can also be understood and managed by the user thereof.

When the storage medium 1 transmits information, which is demanded by the inquiring apparatus 8, to the inquiring apparatus 8, the storage medium 1 directly transmits an identification number along with the information to the inquiring apparatus 8 by radio communication at the first predetermined frequency. The inquiring apparatus 8 checks the identification number to confirm correctness of the storage medium 1 so that it is possible to avoid a fraudulent, improper or invalid use of the storage medium 1.

When the storage medium 1 transmits information, which is demanded by the inquiring apparatus 8, to the inquiring apparatus 8, the storage medium 1 directly transmits a plain-text predetermined encipherment key along with enciphered data for the information to the inquiring apparatus 8 by radio communication at the first predetermined frequency. The inquiring apparatus 8 deciphers the enciphered data, which is the information that is an object of the read demand, with the plain-text predetermined encipherment key transmitted from the storage medium 1. In consequence, it is possible to prevent the information from being fraudulently or wrongfully intercepted when the information is transmitted from the storage medium 1 to the inquiring apparatus 8.

At the exit toll adjusting gate employing the toll pre-payment system as the first or the second toll payment system, information is exchanged between the settling apparatus 5 and the storage medium 1 to automatically adjust a toll by the settling apparatus 5. More specifically, the settling apparatus 5 acquires the unique information (the use information) about the entrance toll adjusting gate through which the vehicle 3 has passed and the balance information from the storage medium 1 along with a result of recognition of a type of vehicle 3, and calculates a toll to be collected on the basis of the use information and the recognition result. The settling apparatus 5 transmits the adjustment information, including a new balance after subtracting the charged toll (the balance information), a charged toll, and payment distinction (pre-payment) to the storage medium 1 to write them into the storage medium 1. Thus, a sequence of automatic toll adjustments in the toll pre-payment system by the settling apparatus 5 is completed.

At the entrance/exit toll adjusting gate employing the toll pre-payment system as the first or the second toll payment system, information is exchanged between the settling apparatus 6 and the storage medium 1 in order to automatically adjust a toll by the settling apparatus 6. Namely, the settling apparatus 6 acquires the balance information from the storage medium 1 in addition to a result of recognition of a type of vehicle 3, and calculates a toll to be collected based on the recognition result. The settling apparatus 6 transmits the adjustment result information, including a new balance (the balance information) after subtracting the charged toll, the charged toll and distinction of payment (pre-payment) to the storage medium 1 and write them in the storage medium 1. Thus, a sequence of automatic toll adjustments by the settling apparatus 6 is completed.

When the storage medium 1 is inserted into the frequency converting apparatus 2 so as to select the toll post-payment system, a password input through the frequency converting apparatus 2 is directly transmitted to the storage medium 1 by radio communication at the first predetermined frequency. The storage medium 1 then compares the input password with a password which is set and stored in the storage medium 1 to check a user of the storage medium 1, thereby verifying whether the user is the owner himself or herself.

At the exit toll adjusting gate employing the toll post-payment system as the first or the second toll payment system, information is exchanged between the settling apparatus 5 and the storage medium 1 to automatically adjust a toll by the settling apparatus 5. More specifically, the settling apparatus 5 acquires the personal information (the adjustment information) and the unique information about the entrance toll adjusting gate through which the vehicle 3 has passed in addition to acquiring a result of recognition of a type of vehicle 3 by the vehicle type recognizing apparatus. The setting apparatus 5 calculates a toll to be collected on the basis of the use information and the recognition result. The settling apparatus 5 then transmits the adjustment result information including a charged toll so calculated and distinction of payment (post-payment) to the storage medium 1 to write them in the storage medium 1. Thus, a sequence of automatic toll adjustments in the toll post-payment system by the settling apparatus 5 is completed.

At the entrance/exit toll adjusting gate employing the toll post-payment system as the first or the second toll payment system, information is exchanged between the settling apparatus 6 and the storage medium 1 to automatically adjust a toll by the settling apparatus 6. More specifically, the settling apparatus 6 acquires the personal information (the adjustment information) and a result of recognition of a type of vehicle 3 obtained by the vehicle type recognizing apparatus, and calculates a toll to be collected on the basis of the recognition result. The settling apparatus 6 then transmits the adjustment result information, including the calculated toll and distinction of payment (post-payment), to the storage medium 1 to write the adjustment result information in the storage medium 1. Thus, a sequence of automatic toll adjustments in the toll post-payment system by the settling apparatus is completed.

If the toll post-payment system is selected, the host computer managing the settling apparatus 5 or the settling apparatus 6 withdraws the calculated toll from a bank account specified in the personal information to finally settle the toll.

At the exit toll adjusting gate or the entrance/exit toll adjusting gate employing the toll post-payment system, three zones are provided which are 1) a vehicle type recognizing zone for recognizing a type of vehicle 3 by the vehicle type recognizing apparatus, 2) a toll settling zone for automatically adjust a toll by the settling apparatus 5 or the settling apparatus 6, and 3) an image zone for photographing an improper or invalid vehicle by the photographing apparatus. To automatically adjust a toll, it is sufficient for the vehicle to simply pass through the vehicle recognizing zone and the toll settling zone in this order without stopping. The photographing apparatus photographs the vehicle which is acting fraudulently, invalidly or improperly, so it is possible to identify the improper or invalid vehicle from a photograph to take any measure desired thereafter.

By acquiring the personal information from the storage medium 1 of a vehicle passing through each of the zones, it is possible to manage a result of the vehicle type recognition, a result of the adjustment and a result of the photographing which are obtained in the respective zones correspondingly to a specific vehicle on the basis of the personal information.

A process in each zone is automatically carried out when a sensor detects passage of the vehicle 3 so that an unmanned exit toll adjusting gate or the unmanned entrance/exit toll adjusting gate becomes possible.

At the entrance toll adjusting gate employing the toll post-payment system as the first or the second toll payment system, two zones are provided which are 1) a passage recognizing zone for writing the unique information (the use information) about the entrance toll adjusting gate as the adjustment information in the storage medium 1 by the writing apparatus 4, and 2) an image zone for photographing an improper or invalid vehicle by a photographing apparatus. To write the unique information about the entrance toll adjusting gate in the storage medium 1, it is sufficient for the vehicle 3 to simply pass through the passage recognizing zone without stopping. The photographing apparatus takes a photograph of a vehicle acting fraudulently, invalidly or improperly. In consequence, it is possible to identify an improper or invalid vehicle from a photograph to take any measure desired after that. A process in each zone is automatically carried out when a sensor detects passage of the vehicle 3 so that an unmanned entrance toll adjusting gate becomes possible.

If a storage medium having the radio communication function for the automatic toll adjusting system of this invention, which was described above with reference to FIG. 2, is used, the receiving means 1B and the transmitting means 1D of the storage medium 1 directly exchange information with the writing apparatus or the settling apparatus, which is used for automatic adjustment at the toll adjusting gate employing the first payment system, by radio communication at the first predetermined frequency to automatically adjust a toll in the first toll payment system.

At the toll adjusting gate employing the second toll payment system, the storage medium 1 is inserted in the frequency converting apparatus 2, and information is indirectly exchanged between the transmitting means 1B and the receiving means 1D of the storage medium 1 and the writing apparatus or the settling apparatus, which is used for the automatic toll adjustment at the toll adjusting gate, via the frequency converting apparatus 2 by radio communication at the second predetermined frequency to automatically adjust a toll in the second payment system.

In short, the user directly holds the storage medium 1, having the radio communication function, against the writing apparatus or the settling apparatus for automatic toll adjustment at the toll adjusting gate so as to select the direct radio communication at the first predetermined frequency, or inserts the storage medium 1 having a radio communication function into the frequency converting apparatus 2 so as to select the indirect radio communication at the second predetermined frequency via the frequency converting apparatus 2. By selecting either the direct radio communication or the indirect radio communication, the user can voluntarily select the first or the second payment system.

In the storage medium 1 of this invention, information written in the storage medium 1 is enciphered data for security. In addition, a predetermined encipherment key, which is used to encipher the enciphered data, is set and stored as plain-text in the storage medium 1, in addition a password of the storage medium 1 is set and stored in advance in the storage medium 1.

When the receiving means 1B receives a read demand from the outside, the processing means 1C reads out enciphered data, for the information that is an object of the read demand, and a plain-text predetermined encipherment key from the storing means 1A, and the transmitting means 1D transmits them. Thus, it is possible to prevent the information from being fraudulently or wrongfully intercepted when the information is transmitted from the storage medium 1.

When the receiving means 1B receives a write demand, corresponding to the transmission of the information that is an object of the read demand, from the outside, the deciphering means deciphers an encipherment key, which is included in the enciphered data, which is the information that is an object of the write demand with the plain-text predetermined encipherment key, which is stored in the storing means 1A. The encipherment key check means compares the deciphered encipherment key with the plain-text predetermined encipherment key, which is stored in the storing means 1A, to check the information that is an object of the write demand. Thus, if any fraudulent, invalid or improper act such as falsification has been done on data to be written in the storage medium 1, it is possible to verify such data.

Further, the receiving means 1B receives a read demand accompanied by a password from the outside upon a depositing process for the toll pre-payment. The password check means compares the password accompanying the read demand with a password stored in the storage means 1A to check on a payer depositing to the storage medium 1. Thus, it is possible to verify whether the payer is the owner himself or herself.

Similarly, when the receiving means 1B receives a password input through the frequency converting apparatus 2 when the storage medium 1 is inserted in the frequency converting apparatus 2, the password check means compares the received password with a password stored in the storing means 1A to check on a user of the storage medium 1. Thus, it is possible to verify whether the user is the owner himself or herself.

When the user passes through the toll adjusting gate, the storage medium 1 having the radio communication function is inserted in the frequency converting apparatus for the automatic toll adjusting system of this invention which was described above with reference to FIG. 3. When the storage medium 1 is inserted into the frequency converting apparatus 2, information transmitted at the first predetermined frequency is converted into the second predetermined frequency, or information transmitted at the second predetermined frequency is converted into the first predetermined frequency through the first communicating means 2A and the second communicating means 2B of the frequency converting apparatus 2. The converted information is exchanged between the storage medium 1 and the writing apparatus or the settling apparatus which is used for automatic toll adjustment at the toll adjusting gate to automatically adjust a toll.

If a password is set and stored in advance in the storage medium 1 for security, the password is input through the inputting means when the storage medium 1 is inserted in the frequency converting apparatus 2. This password is transmitted by the first communicating means 2A to the storage medium 1 by radio communication at the first predetermined frequency. At the storage medium 1, the input password is compared with a password which is set and stored in advance in the storage medium 1 to check on a user of the storage medium 1. Thus, it is possible to verify whether the user is the owner himself or herself.

In the writing apparatus for the automatic toll adjusting system of this invention which was described above with reference to FIG. 4, when the user passes through the entrance toll adjusting gate, the demand issuing means 4B issues a write demand to write the use information, including the unique information about the entrance toll adjusting gate, to the storage medium 1 having the radio communication function. This writing demand is transmitted by the communicating means 4A at the entrance toll adjusting gate employing the first payment system by radio communication at the first predetermined frequency, or indirectly via the frequency converting apparatus 2 at the entrance toll adjusting gate employing the second predetermined frequency.

The use information, including the unique information about the entrance toll adjusting gate, is written in the storage medium 1 as above so that it is possible to calculate a toll according to a trip distance based on the unique information about the entrance toll adjusting gate which is read out from the storage medium 1 when the toll is automatically adjusted at the exit toll adjusting gate.

On this occasion, a passage time (i.e., time of passage) of the vehicle through the entrance toll adjusting gate is written in the storage medium 1 such as to be included in the use information along with the unique information about the entrance toll adjusting gate. Thus, it is possible to perform a check at the exit toll adjusting gate on the basis of a required time from a) the passage time read out from the storage medium 1 to b) an arrival time at the exit toll adjusting gate.

If an identification number and a term of validity of the storage medium 1 are set and stored in advance in the storage medium 1 for security, the demand issuing means 4B issues a read demand to the storage medium 1 to read the identification number and the term of validity from the storage medium 1 through the communicating means 4A when the user with the storage medium 1 passes through the entrance toll adjusting gate. When the identification number and the term of validity are read out from the storage medium 1 in response to the read demand, the check means performs a check on the identification number and the term of validity read out from the storage medium 1. Thus, it is possible to confirm correctness of the storage medium 1, in addition to avoiding a fraudulent, invalid or improper use of the storage medium 1.

If information to be written in the storage medium 1 is enciphered as enciphered data and a predetermined encipherment key, which is used to encipher the information, is set and stored as plain-text in the storage medium 1, the enciphered data for the identification number and the term of validity and the plain-text predetermined encipherment key are read out from the storage medium 1 in response to the read demand which is issued from the demand issuing means 4B. The deciphering means deciphers the enciphered data for the identification number and the term of validity with the plain-text predetermined encipherment key. Thus, it is possible to prevent the information from being fraudulently or wrongfully intercepted when the information is transmitted from the storage medium 1 to the writing apparatus 4.

If information (enciphered data) exchanged with the storage medium 1 by radio communication includes an enciphered predetermined encipherment key, which is obtained by enciphering a plain-text predetermined encipherment key with the predetermined encipherment key, the encipherment key check means compares the plain-text predetermined encipherment key, received with the enciphered data, with a predetermined encipherment key, which is obtained by deciphering the enciphered data by the deciphering means, to check the information that is an object of the read demand. If any fraudulent, improper or invalid act such as falsification has been done on the data in the storage medium 1, it is possible to verify such data (i.e., verify data is falsified).

The use information to be written in the storage medium 1 is enciphered by the enciphering means with the plain-text predetermined encipherment key received with the enciphered data of the identification number and the term of validity. Thus, it is possible to prevent the information from being fraudulently intercepted when the information is transmitted from the writing apparatus 4 to the storage medium 1.

On this occasion, the enciphering means enciphers the plain-text predetermined encipherment key, which is used for the encipherment, with the predetermined encipherment key, too, and this enciphered predetermined encipherment key is included in the enciphered data, which is the information that is an object of the write demand, to write the information in the storage medium 1. Thus, it is possible to check the information that is an object of the write demand at the storage medium 1 by comparing the predetermined encipherment key in the enciphered data with a predetermined encipherment key retained in the storage medium 1. If any fraudulent, invalid or improper act such as falsification has been done on the data in the storage medium 1, it is possible to verify such data.

In the settling apparatus for the automatic toll adjusting system of this invention which was described above with reference to FIG. 5, the demand issuing means 5B issues a read demand, to read the adjustment information, or a write demand, to write the adjustment result information, to the storage medium 1 having the radio communication function of the vehicle when the user passes through the exit toll adjusting gate or the entrance/exit toll adjusting gate.

At the exit toll adjusting gate or the entrance/exit toll adjusting gate employing the first payment system, these demands are transmitted by the communicating means 5A to the storage medium 1 by radio communication at the first predetermined frequency. To the contrary, at the exit toll adjusting gate or the entrance/exit toll adjusting gate employing the second payment system, these demands are transmitted to the storage medium 1 by radio communication at the second predetermined frequency.

When the user passes through the exit toll adjusting gate or the entrance/exit toll adjusting gate, the demand issuing means 5B issues a read demand to the storage medium 1 to read the adjusting information from the storage medium 1. When the adjustment information is read out from the storage medium 1 in response to the read demand, the toll adjusting means 5C automatically adjusts a toll to be charged to the holder of the storage medium 1 on the basis of the adjustment information.

After the automatic toll adjustment, the demand issuing means 5B issues a write demand to write the adjustment result information, including a charged toll adjusted by the toll adjusting means 5C and payment distinction (the first/ the second payment system), to the storage medium 1. This adjustment result information is written as the use information in the storage medium 1. In consequence, it is possible to manage a use history or the like in terms of the toll road on the basis of the adjustment result information retained in the storage medium 1.

If an identification number and a term of validity of the storage medium 1 are set and stored in advance in the storage medium 1 for security, the demand issuing means 5B issues a read demand to the storage medium 1 to read the identification number and the term of validity from the storage medium 1 through the communicating means 5A when the settling process is initiated. When the identification number and the term of validity are read out from the storage medium 1 in response to the read demand, the check means performs a check on the identification number and the term of validity transmitted from the storage medium 1, thereby confirming correctness of the storage medium 1 besides preventing fraudulent, invalid or improper use of the storage medium 1.

If information to be written in the storage medium 1 is enciphered as enciphered data and a predetermined encipherment key, which is used to encipher the information, is set and stored as plain-text in the storage medium 1 for security, the enciphered data, which is the information that is an object of a read demand, and the plain-text predetermined encipherment key are read out from the storage medium 1 in response to the read demand issued from the demand issuing means 5B. The deciphering means deciphers the enciphered data with the plain-text predetermined encipherment key so that it is possible to prevent the information from being fraudulently or wrongfully intercepted when the information is transmitted from the storage medium 1 to the settling apparatus 5 (6).

If information (enciphered data), which is exchanged with the storage medium 1 by radio communication, includes an enciphered predetermined encipherment key, which is obtained by enciphering a plain-text predetermined encipherment key with the predetermined encipherment key, the encipherment key check means compares the plain-text predetermined encipherment key, which is received with the enciphered data, with a predetermined encipherment key which is obtained by deciphering the enciphered data, by the deciphering means to check the information that is an object of a read demand. If any fraudulent, improper or invalid act such as falsification has been done on the data in the storage medium 1, it is, therefore, possible to verify such data.

The use information to be written in the storage medium 1 is enciphered with a plain-text predetermined encipherment key which is received with the enciphered data. Thus, it is possible to prevent the information from being fraudulently or wrongfully intercepted when the information is transmitted from the settling apparatus 5 (6) to the storage medium 1.

On this occasion, the plain-text predetermined encipherment key, which is used for the encipherment, is also enciphered with the predetermined encipherment key. This enciphered predetermined encipherment key is included in the enciphered data, which is the information that is an object of a write demand, to write the information in the storage medium 1. Thus, a check on the information that is an object of the write demand by comparing the predetermined encipherment key in the enciphered data with a predetermined encipherment key retained in the storage medium 1 at the storage medium 1 becomes possible. If any fraudulent, invalid or improper act such as falsification has been done on the data in the storage medium 1, it is, therefore, possible to verify such data.

When the depositing apparatus for the automatic toll adjusting system of this invention which was described above with reference to FIG. 6 performs the depositing process for toll pre-payment on the storage medium 1 having the radio communication function retaining the balance information therein, where the storage medium 1 becomes an object of a charged toll upon automatic toll adjustment at the toll adjusting gate in the toll pre-payment system, the storage medium 1 is inserted in the depositing apparatus.

When the storage medium 1 is inserted in the depositing apparatus 7, the communication means 7A directly exchanges information with the storage medium 1 by radio communication at the first predetermined frequency. The demand issuing means 7C issues a read demand to read the balance information from the storage medium 1. When the balance information is read out from the storage medium 1 in response to the read demand, the depositing means 7B adds a sum of money currently received to a balance included in the balance information output from the storage medium 1 to calculate a new balance. The demand issuing means 7C then issues a write demand to write the balance information including the new balance and the depositing information including the sum of money deposited this time to the storage medium 1. This information is written in the storage medium 1. As above, the depositing process on the storage medium 1 is completed.

Incidentally, if a password is set and stored in advance in the storage medium 1 for security, the password is input through the inputting means and transmitted by the communication means 7A to the storage medium 1 by radio communication at the first predetermined frequency when the storage medium 1 is inserted in the depositing apparatus 7. Thus, a check on a user of the storage medium 1, by comparing the input password with the password set and stored in advance in the storage medium 1, becomes possible at the storage medium 1 to verify whether the user is the owner himself or herself.

If an identification number and a term of validity of the storage medium 1 are set and stored in advance in the storage medium 1 for security, the demand issuing means 7C issues a read demand to read the identification number and the term of validity from the storage medium 1 through the communicating means 7A when the depositing process is initiated. When the identification number and the term of validity are read out from the storage medium 1 in response to the read demand, the check means performs a check on the identification number and the term of validity to verify correctness of the storage medium 1. This is effective to avoid a fraudulent, invalid or improper use of the storage medium 1.

If a maximum amount of deposit money and a maximum balance for the storage medium 1 are set and stored in advance in the storage medium 1, the demand issuing means 7C issues a read demand to the storage medium 1 to read the maximum amount of deposit money and the maximum balance from the storage medium 1 having the radio communication function through the communicating means 7A when the depositing process is initiated. When the maximum amount of deposit money and the maximum balance are read out from the storage medium 1 in response to the read demand, the depositing money check means performs a check on the maximum amount of deposit money and the maximum balance output from the storage medium 1. It is, therefore, possible to prevent a sum of money deposited through the depositing means 7B from exceeding the maximum amount of deposit money or prevent a balance from exceeding the maximum balance as a result of the depositing process by the depositing means 7B.

If information to be written in the storage medium 1 is enciphered as enciphered data and a predetermined encipherment key, which is used to encipher the information, is set and stored as plain-text in the storage medium 1, the enciphered data, which is the information that is an object of a read demand, and the plain-text predetermined encipherment key are read out from the storage medium 1 in response to a read demand issued from the demand issuing means 7C. The deciphering means deciphers the enciphered data with the plain-text predetermined encipherment key. Thus, it is possible to prevent the information from being fraudulently intercepted when the information is transmitted from the storage medium 1 to the depositing apparatus 7.

On this occasion, the information (enciphered data), which is exchanged with the storage medium 1 by radio communication, includes an enciphered plain-text predetermined encipherment key which is enciphered with the predetermined encipherment key. The encipherment key check means compares the plain-text predetermined encipherment key, which is received with the enciphered data, with a predetermined encipherment key, which is obtained by deciphering the enciphered data by the deciphering means, to check the information that is an object of the read demand. If any fraudulent, invalid or improper act such as falsification has been done on the data stored in the storage medium 1, it is possible to verify such data.

The use information, to be written in the storage medium 1, is enciphered with the plain-text predetermined encipherment key, which is received with the enciphered data, by the enciphering means. This is effective to prevent the information from being fraudulently intercepted when the information is transmitted from the depositing apparatus 7 to the storage medium 1.

Further, the enciphering means also enciphers the plain-text predetermined encipherment key, which is used for encipherment, with the predetermined encipherment key. This enciphered predetermined encipherment key is included in the information that is an object of the write demand to write the information in the storage medium 1 so that a check on the information that is an object of the write demand, by comparing at the storage medium 1 the predetermined encipherment key in the enciphered data with a predetermined encipherment key retained in the storage medium 1, becomes possible. If any fraudulent, invalid or improper act such as falsification has been done on the data in the storage medium 1, it is possible to verify such data.

When information stored in the storage medium 1 having the radio communication function is to be accessed, the storage medium 1 is inserted in the inquiring apparatus for the automatic toll adjusting system of this invention which was described above with reference to FIG. 7.

When the storage medium 1 is inserted in the inquiring apparatus 8, the communicating means 8A directly exchanges the information with the storage medium 1 by radio communication at the first predetermined frequency. The demand issuing means 8B issues a read demand to the storage medium 1 to read the information that is an object of the read demand from the storage medium 1. When the information that is an object of the read demand is read out from the storage medium 1 in response to the read demand, the expressing or outputting means 8C clearly outputs the information that is an object of the read demand output from the storage medium 1 so that it is possible to understand and confirm the information stored in the storage medium 1 to manage the information.

Meanwhile, the identification number of the storage medium 1 is set and stored in advance in the storage medium 1 for security. The demand issuing means 8B issues a read demand to the storage medium 1 to read the identification number from the storage medium 1 through the communicating means 8A when an inquiring process is initiated. When the identification number is read out from the storage medium 1 in response to the read demand, the check means performs a check on the identification number output from the storage medium 1 to confirm correctness of the storage medium 1. As a result, it is possible to avoid a fraudulent, invalid or improper use of the storage medium 1.

If information to be written into the storage medium 1 is enciphered as enciphered data and a predetermined encipherment key, which is used to encipher the information, is set and stored as plain-text in the storage medium 1, the enciphered data for the information that is an object of inquiry and the plain-text predetermined encipherment key are read out from the storage medium 1 in response to a read demand issued from the demand issuing means 8B. The deciphering means deciphers the enciphered data, which is the information that is an object of the inquiry, with the plain-text predetermined encipherment key. In consequence, it is possible to prevent the information from interception when the information is transmitted from the storage medium 1 to the inquiring apparatus 8.

With the automatic toll adjusting system or the various apparatus for this system of this invention, the user can voluntarily select a toll payment system by selecting a frequency for radio communication at the toll adjusting gate. This manner may largely improve service to the users of the toll road.

Particularly, the user selects either direct radio communication at the first predetermined frequency with the storage medium 1 having the radio communication function or indirect radio communication at the second predetermined frequency with the storage medium 1 having the radio communication via the frequency converting apparatus 2 by inserting the storage medium 1 having the radio communication function into the frequency converting apparatus 2 to voluntarily select a toll payment system at the toll gate. This manner may largely improve service to the users of the toll road.

Either the writing apparatus 4 for the entrance toll adjusting gate or the settling apparatus 5 for the exit toll adjusting gate on a toll road where a toll according to a trip distance is collected, or the settling apparatus 6 for the entrance/exit toll adjusting gate on a toll road where a fixed toll irrespective of a trip distance is collected can automatically adjust a toll for a toll road or the like charged the holder of the storage medium 1 on the basis of the adjustment information.

Accordingly, this invention can achieve ticketless toll adjustment or toll adjustment requiring no stopping of vehicles (when the post-payment is selected, in particular). Moreover, according to this invention, the user can voluntarily select the first or second payment system (pre-payment or post-payment system) so that this invention may improve service for the users of the toll road.

Upon automatic toll adjustment, the settling apparatus 5 or 6 writes the adjustment result information including a charged toll and payment distinction (pre-payment/post-payment) as the use information in the storage medium 1, and the storage medium 1 retains the adjustment result information therein. It is, therefore, possible to manage the adjustment result information, and to manage and understand a use history by a holder of the storage medium 1. This contributes to an improvement of service for the holder of the storage medium 1.

Further, the storage medium 1 can retain the depositing information and the balance information therein, and the balance information can be added to or rewritten by direct communication at the first predetermined frequency between the depositing apparatus 7 and the storage medium 1 so that a depositing process on the storage medium 1 in the toll pre-payment system is possible.

The inquiring apparatus 8 directly communicates with the storage medium 1 by radio communication at the first predetermined frequency so as to clearly output part or all of various information (the adjustment result information, the use information, the personal information, the depositing information, etc.) and histories of the various information stored in the storage medium 1. Accordingly, it is possible to understand or confirm information in the storage medium 1 to manage it, which contributes to an improvement of service for a holder of the storage medium 1.

Meanwhile, enciphered data for information demanded by the writing apparatus 4, the settling apparatus 5 or 6, the depositing apparatus 7 or the inquiring apparatus 8 is transmitted along with a plain-text predetermined encipherment key from the storage medium 1 to each of the apparatuses. In each of the apparatuses 4 through 8, the enciphered data is deciphered with the predetermined encipherment key. This is helpful to prevent the information from interception when the information is transmitted from the storage medium 1 to each of the apparatuses 4 through 8.

When the enciphered data is deciphered in the writing apparatus 4, the settling apparatus 5 or 6, or the depositing apparatus 7, the plain-text predetermined encipherment key, which is received with the enciphered data, is compared with a predetermined encipherment key, which is obtained by deciphering the enciphered data, to check the information supplied from the storage medium 1. If any fraudulent, invalid or improper act such as falsification has been done on the data in the storage medium 1, it is possible to verify such data immediately and certainly.

Further, the enciphered data which is enciphered in the writing apparatus 4, the settling apparatus 5 or 6, or the depositing apparatus 7 is transmitted to the storage medium 1 to be written therein so that an interception of the information can be prevented with certainty when the information is transmitted from each of the apparatuses 4 through 7 to the storage medium 1.

When the storage medium 1 receives the enciphered data from the writing apparatus 4, the settling apparatus 5 or 6, or the depositing apparatus 7, a plain-text predetermined encipherment key, which is stored in advance in the storage medium 1, is compares with a predetermined encipherment key which is obtained by deciphering the enciphered data with the predetermined encipherment key to check the information output from each of the apparatuses 4 through 7. If any fraudulent, invalid or improper act such as falsification has been done on the data to be written in the storage medium 1, it is possible to verify such data immediately and certainly.

Information demanded by the writing apparatus 4, the settling apparatus 5 or 6, the depositing apparatus 7 or the inquiring apparatus 8 is transmitted along with an identification number and a term of validity from the storage medium 1 to each of the apparatuses 4 through 8, and the identification number and the term of validity are checked in each of the apparatuses 4 through 8. As a result, correctness of the storage medium 1 can be confirmed. Further, a fraudulent, invalid or improper use of the storage medium 1 can be prevented with certainty.

Moreover, when the depositing process is performed or the storage medium 1 is inserted in the frequency converting apparatus 2, a password input through the depositing apparatus 7 or the frequency converting apparatus 2 is transmitted to the storage medium 1, and the password is compared with a password, which is set in advance in the storage medium 1, to check a payer depositing to the storage medium 1 or a user of the storage medium 1. In consequence, it is possible to verify whether the payer or user is the owner himself or herself. This makes it further possible to avoid fraudulent, invalid or improper use of the storage medium 1, to skip an input of the password upon an actual toll adjustment, and to quicken the toll adjusting process.

In the depositing process, a maximum amount of deposit money and a maximum balance are acquired along with the balance information from the storage medium 1 to perform a check on the maximum amount of deposit money and the maximum balance. Accordingly, it is possible to prevent a sum of deposit money from exceeding the maximum amount of deposit money or a balance from exceeding the maximum balance as a result of the depositing process. Further, more money than necessity is prevented from being received in the depositing process. If the storage medium 1 is used fraudulently, improperly or invalidly, damage caused can be minimized.

The totaling apparatus totals accumulation of sums of received money and accumulation of collected tolls for each storage medium 1 to manage a total sum that is a balance of these accumulation. If someone fraudulently, improperly or invalidly manipulates a sum of the money paid to the storage medium 1, such an operation can be verified. Further fraudulent, invalid or improper acts such as forged payments can be prevented with certainty.

At the entrance toll adjusting gate on a toll road where a toll according to a trip distance is collected, a passage time through this entrance toll adjusting gate is written in the storage medium 1 by the writing apparatus 4. When a toll is automatically adjusted by the settling apparatus for the exit toll adjusting gate, it is possible to determine a time period required to reach this exit adjusting gate from the passage time written in the storage medium 1. If any fraudulent, invalid or improper use has been done during the use of the toll road, it is possible to verify it, and to avoid fraudulent, improper or invalid use of the toll road with certainty.

According to this invention, a security function may be largely improved as above. If the storage medium 1 having the radio communication function is used, it is possible to cope with interception of information by radio communication, fraudulent, improper or invalid use of the storage medium 1, falsification such as forged payment on the data in the storage medium 1, fraudulent, invalid or improper use of the toll road, etc.

At the exit toll adjusting gate or the entrance/exit toll adjusting gate in the toll post-payment system, there are provided three zones, which are 1) the vehicle type recognizing zone, 2) the toll settling zone and 3) the image zone. The user can automatically adjust a toll by simply passing through the vehicle type recognizing zone and the toll settling zone in this order in the vehicle 3 without stopping. On this occasion, an improper or invalid vehicle is photographed in the image zone. Thus, it is possible to identify the improper or invalid vehicle to take a measure to, for example, charge a penalty. Thus, it is possible to cope with an improper or invalid vehicle such as bilking a toll due to automatic toll adjustment requiring no stopping of vehicles.

An identification number is acquired from the storage medium 1 which is on a vehicle passing through each of the zones so that a result of the vehicle type recognition, a result of the adjustment, a result of the photographing, which is obtained in the respective zones, can be corresponded to a specific vehicle 3 on the basis of the identification number. Even if a plurality of vehicles successively pass through the adjusting gate within a short period of time, it is possible to manage results of the processes in the respective zones by the vehicles.

At the entrance toll adjusting gate in the toll post-payment system, there are provided two zones, which are 1) the passage recognizing zone and 2) the image zone.

When the vehicle 3 passes through the passage recognizing zone without stopping, the unique information about the entrance adjusting gate can be written in the storage medium 1. Any improper or invalid vehicle is photographed in the image zone so that it is possible to cope with an improper or invalid vehicle such as a vehicle not carrying the storage medium 1 or the like.

By automatically carrying out a process in each of the zones when the sensor detects passage of a vehicle, it is possible to achieve an unmanned toll adjusting gate in the toll post-payment system, and to save labor in the toll adjusting process.

(b) Description of a System According to an Embodiment of This Invention

Hereinafter, a description will be made of an is embodiment of this invention by reference to the drawings.

Figure 8:
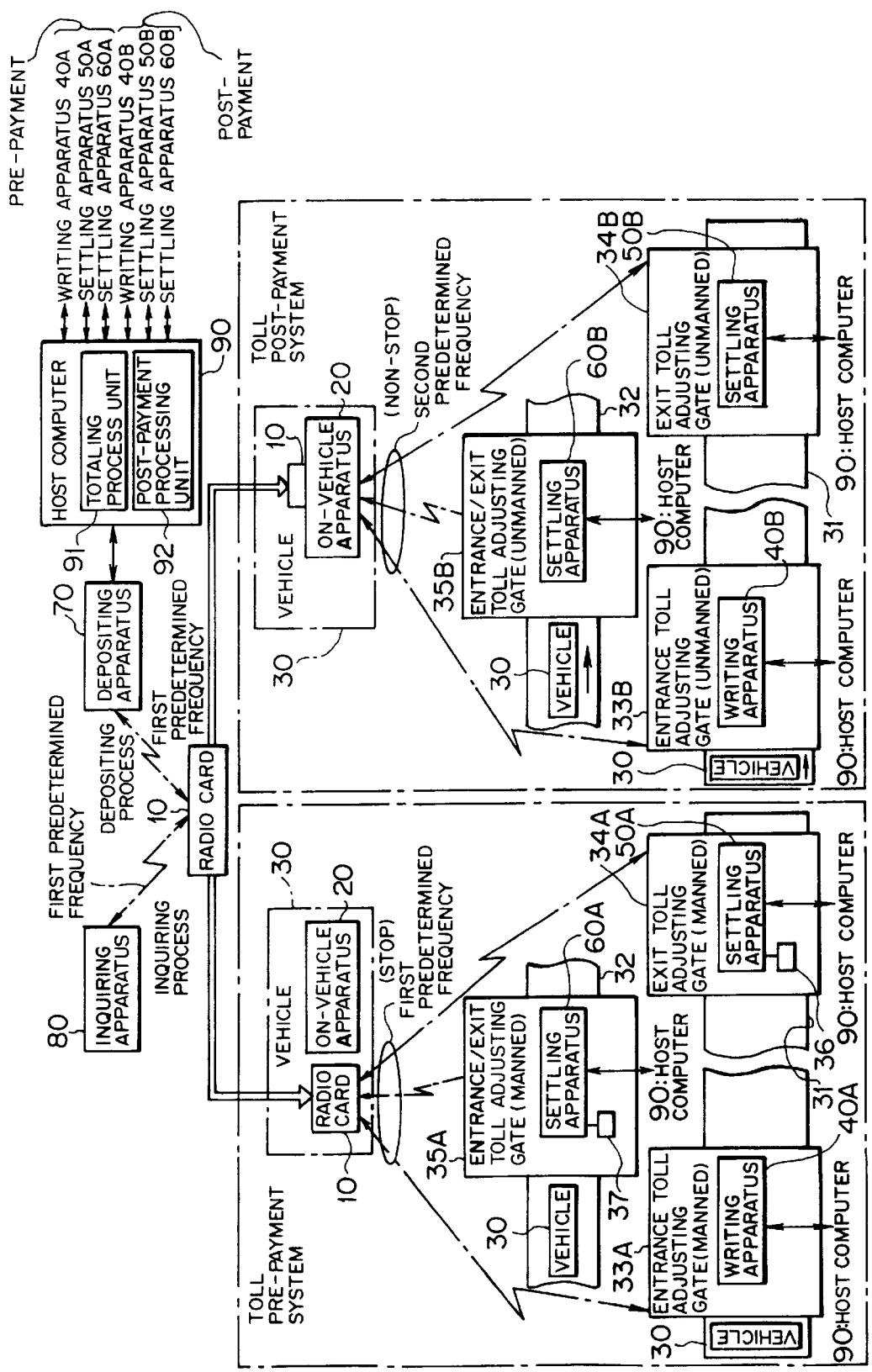
FIG. 8 is a block diagram showing an entire configuration of an automatic toll adjusting system according to an embodiment of this invention.

FIG. 8 is a block diagram showing an entire structure of an automatic toll adjusting system for a toll road as an embodiment of this invention. In FIG. 8, reference numeral 10 denotes a radio card (a storage medium with a radio communication function), 20 denotes an on-vehicle apparatus (a frequency converting apparatus, terminal equipment), and 30 denotes a vehicle. This embodiment is applied to a system for collecting a toll for a toll road. Here a pre-payment system is used as a first payment system, and a post-payment (credit) system is used as a second payment system.

The radio card 10 is carried by a user of a toll road. The radio card 10 stores various information therein which is necessary for adjustment of a toll for a toll road and transmits and receives the information by a radio communication at a first predetermined frequency with an external apparatus. A detailed description of a structure of the radio card 10 will be described later with reference to FIG. 9.

The radio card 10 is, in general, a storage medium of a card type which receives and transmits data by radio communication with an interface device (a base station), and retains and manages the data in files (a storage 11 described later). A power source for the radio card 10 is contained in the radio card 10 itself, or supplied from the outside by radio (a microwave or the like) when the radio card 10 is activated. This invention is applicable to either case.

The on-vehicle apparatus 20 is mounted in each of the vehicles 30 traveling on the toll road. The on-vehicle apparatus 20 has the radio card 10 inserted thereinto when the toll post-payment system is selected as described later, converts information at a first predetermined frequency into a second predetermined frequency for the toll post-payment to transmit the information by radio communication to the external apparatus, and in addition converts the information at the second predetermined frequency received from the external apparatus into the first predetermined frequency to transmit the information to the radio card 10 by radio communication. Detailed description of a structure of the on-vehicle apparatus 20 will be described later with reference to FIG. 10.

There are, in general, two types of toll roads where a toll depending on a trip distance is collected as represented by Tomei Highway or the like (reference numeral 31 in FIG. 8), and a toll irrespective of a trip distance is collected as represented by Shuto Highway or the like (reference numeral 32 in FIG. 8).

Typically, on a toll road 31 where a toll depending on a trip distance of a vehicle is collected, the vehicle 30 passes through a toll post at an entrance (referred to as an entrance toll adjusting gate in this embodiment) and a toll post at an exit (referred to as an exit toll adjusting gate in this embodiment) to collect a toll. On a toll road 32 where a toll is collected irrespectively of a trip distance, the vehicle 30 passes through one toll gate installed at an entrance or an exit (referred to as an entrance/exit toll adjusting gate in this embodiment) to adjust a toll.

In this embodiment, there are two types of systems, one employing a toll pre-payment system where a toll is adjusted at each of the toll gates at an entrance, an exit and an entrance/exit of the toll roads 31 and 32, which are installed for only the toll pre-payment system, and the other employing a toll post-payment system where toll gates are installed for only the toll post-payment system. In FIG. 8, reference numeral 33A denotes an entrance toll adjusting gate for the toll pre-payment system, 33B denotes an entrance toll adjusting gate for the toll post-payment system, 34A denotes an exit toll adjusting gate for the toll pre-payment system, 34B denotes an exit toll adjusting gate for the toll post-payment system, 35A denotes an entrance/exit toll adjusting gate for the toll pre-payment system, and 35B denotes an entrance/exit toll adjusting gate for the toll post-payment system.

The entrance toll adjusting gate 33A for the toll pre-payment system and the entrance toll adjusting gate 33B in the toll post-payment system are provided with a writing apparatus 40A for the entrance toll adjusting gate in the toll pre-payment system and a writing apparatus 40B for the entrance toll adjusting gate for the toll post-payment system, respectively. The exit toll adjusting gate 34A in the toll pre-payment system and the exit toll adjusting gate 34B in the toll post-payment system are provided with a settling apparatus 50A for the exit toll adjusting gate in the toll pre-payment system and a settling apparatus 50B for the exit toll adjusting gate in the toll post-payment system, respectively. The entrance/exit toll adjusting gate 35A in the toll pre-payment system and the entrance/exit toll adjusting gate 35B in the toll post-payment system are provided with a settling apparatus 60A for the entrance/exit toll adjusting gate in the toll pre-payment system and a settling apparatus 60B for the entrance/exit toll adjusting gate in the toll post-payment system, respectively.

Each of the writing apparatus 40A and 40B transmits use information such as unique information about the corresponding entrance toll adjusting gate 33A or 33B (for example, a tollhouse code, a tollhouse name, etc.), a date and time of the use (a passage time at the gate) and the like to the radio card 10 of the vehicle 30 passing through the corresponding entrance toll adjusting gate 33A or 33B to write the information as adjustment information by radio communication as described later. A structure of each of the writing apparatus 40A and 40B will be described in detail later with reference to FIG. 11.

Each of the setting apparatus 50A and 50B at the corresponding exit toll adjusting gate 34A or 34B acquires adjustment information (such as unique information about the entrance toll adjusting gate 33A or 33B which is written by the writing apparatus 40A or 40B, personal information including an identification number, etc.) from the radio card 10 by radio communication as described later to automatically adjust a toll for the toll road charged to a holder of the radio card 10 on the basis of the adjustment information and vehicle type information. Structures of these settling apparatus 50A and 50B will be described in detail later with reference to FIGS. 12 and 13, respectively.

Each of the setting apparatus 60A or 60B at the corresponding entrance/exit toll adjusting gate 35A or 35B acquires adjustment information (such as personal information including an identification number, etc.) from the radio card 10 by radio communication, as described later, to automatically adjust a toll for the toll road charged to a holder of the radio card 10 on the basis of the adjustment information and vehicle type information. Structures of these setting apparatus 60A and 60B will be described in detail later with reference to FIGS. 14 and 15, respectively.

In this embodiment, the toll adjusting gates 34A and 35A employing the toll pre-payment system are manned. The vehicle 30 stops at the toll adjusting gate 34A or 35A, and is subjected to an adjusting process (a settling process) according to a type of vehicle recognized by the attendant by radio communication as described later. Toll display units 36 and 37 are installed at the toll adjusting gates 34A and 35A, respectively, each of which shows a charged toll as a result of the adjustment of the toll to the user of the toll road in the vehicle 30. Incidentally, the toll adjusting gates 34A, 35A may be unmanned.

The toll adjusting gates 33B, 34B and 35B employing the toll post-payment system are unmanned. The vehicle 30 does not stop at the toll adjusting gate 33B, 34B and 35B, but is subjected to an automatic adjusting process according to vehicle type information obtained by automatic recognition by radio communication as described later. Structures of the toll adjusting gates 33B, 34B and 35B will be described in detail later with reference to FIGS. 18 and 19.

In a system according to this embodiment, at the toll adjusting gates 33A, 34A and 35A employing the toll pre-payment system, the radio card 10 directly exchanges information with the writing apparatus 40A, or the settling apparatus 50A or 60A by radio communication at the first predetermined frequency to automatically adjust the tolls in the toll pre-payment system. To the contrary, at the toll adjusting gates 33B, 34B and 35B employing the toll post-payment system, the radio card 10 is inserted into the on-vehicle apparatus 20 to indirectly exchange information with the writing apparatus 40B, the settling apparatus 50B or 60B at the corresponding toll adjusting gates 33B, 34B or 35B via the on-vehicle apparatus 20 by a radio communication at the second predetermined frequency to automatically adjust a toll in the toll post-payment system.

In practice, if a toll adjustment in the toll pre-payment system is selected, a user of the toll road stops the vehicle 30 at the toll adjusting gate 33A, 34A or 35A employing the toll pre-payment system, and points the radio card 10 directly at an antenna (refer to reference numbers 42, 43, 52, 53, 62 and 63 in FIGS. 11 through 15) of the writing apparatus 40A, the settling apparatus 50A or the settling apparatus 60A so as to adjust a toll in the toll pre-payment system. On that occasion, the toll display unit 36 or 37 displays a charged toll or gives an indication of completion of toll collection.

When the toll post-payment system is selected, the user of the toll road inserts the radio card 10 in advance into the on-vehicle apparatus 20. It is sufficient for the user to drive the vehicle 30 through the toll adjusting gate 33B, 34B or 35B employing the toll post-payment system without stopping so as to adjust the toll in the toll pre-payment system via the on-vehicle apparatus 20. At that time, completion of the toll collection may be notified to the user from the on-vehicle apparatus 20 with a sound or a light.

In the case of the automatic toll adjustment by the settling apparatus 50A, 50B, 60A or 60B, information about a result of the toll adjustment, including a charged toll having been adjusted and payment distinction showing whether the payment system is the toll pre-payment system or the toll post-payment system, is directly transmitted to the radio card 10 by radio communication at the first predetermined frequency or indirectly via the on-vehicle apparatus 20 by radio communication at the second predetermined frequency and is written as use information into the radio card 10.

The toll pre-payment system necessitates a prior depositing process. The system according to this embodiment includes a depositing apparatus 70 for the toll pre-payment system to perform the depositing process.

In order to perform the depositing process for the toll pre-payment system on the radio card 10, the depositing apparatus 70 acquires balance information (that is an object of a toll collection at the time of automatic adjustment at each of the toll adjusting gates 34A or 35B in the toll pre-payment system) from the radio card 10 by radio communication at the first predetermined frequency with the radio card 10 when the radio card 10 is inserted into the depositing apparatus 70. The depositing apparatus 70 adds a sum of money deposited this time to a balance included in the balance information to obtain a new balance, transmits the balance information including the new balance and depositing information including the sum of money deposited this time to the radio card 10 by radio communication at the first predetermined frequency to write them into the radio card 10. A structure of the depositing apparatus 70 will be described in detail later with reference to FIG. 16.

The system according to the invention also includes an inquiring apparatus 80 which inquires about various information (refer to FIG. 21) stored in the radio card 10. The inquiring apparatus 80 obtains various information stored in the radio card 10 by radio communication at the first predetermined frequency with the radio card 10 when the radio card 10 is inserted into the inquiring apparatus 80, and clearly outputs (for example, displays on a display or prints out; refer to FIGS. 34 through 36) the various information.

A structure of the inquiring apparatus 80 will be described in detail later with reference to FIG. 17.

The above-described writing apparatus 40A and 40B, the settling apparatus 50A, 50B, 60A and 60B, and the depositing apparatus 70 in the system according to this embodiment are managed by a host computer 90.

The host computer 90 provides information necessary for a negative check (i.e., insufficient balance check) performed in the writing apparatus 40A and 40B, the settling apparatus 50A, 50B, 60A and 60B and the depositing apparatus 70, and in addition manages a result of the depositing process performed by the depositing apparatus 70 on each radio card 10 or a result of the toll adjusting process in each of the settling apparatus 50A, 50B 60A or 60B.

Figure 26:
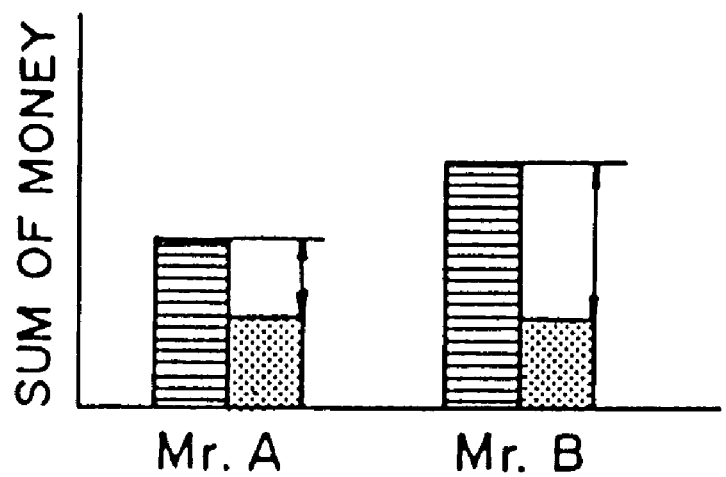
FIG. 26 is a graph depicting an operation of a totaling process unit according to the embodiment.

The host computer 90 has a totaling process unit (totaling apparatus) 91 and a post-payment processing unit 92. The totaling process unit 91 totals a) accumulation of deposit money to be written into the radio card 10 as the depositing information from the depositing apparatus 70 and b) accumulation of tolls having been collected to be written into the radio card 10 as the use information from the settling apparatus 50A or 60A in the toll pre-payment system for each of the radio cards 10, and manages a total sum that is a balance of these accumulations (refer to FIG. 26) for each of the radio cards 10 (personal) and for the entire system (a total sum). The post-payment processing unit 92 asks a bank or the like to perform a process for withdrawing a charged toll that has been calculated by the settling apparatus 50A or 60A in the toll post-payment system from a bank account or the like specified by the personal information obtained by the settling apparatus 50A or 60A.

(c) Description of Security Mechanism of This Embodiment

Figure 9:
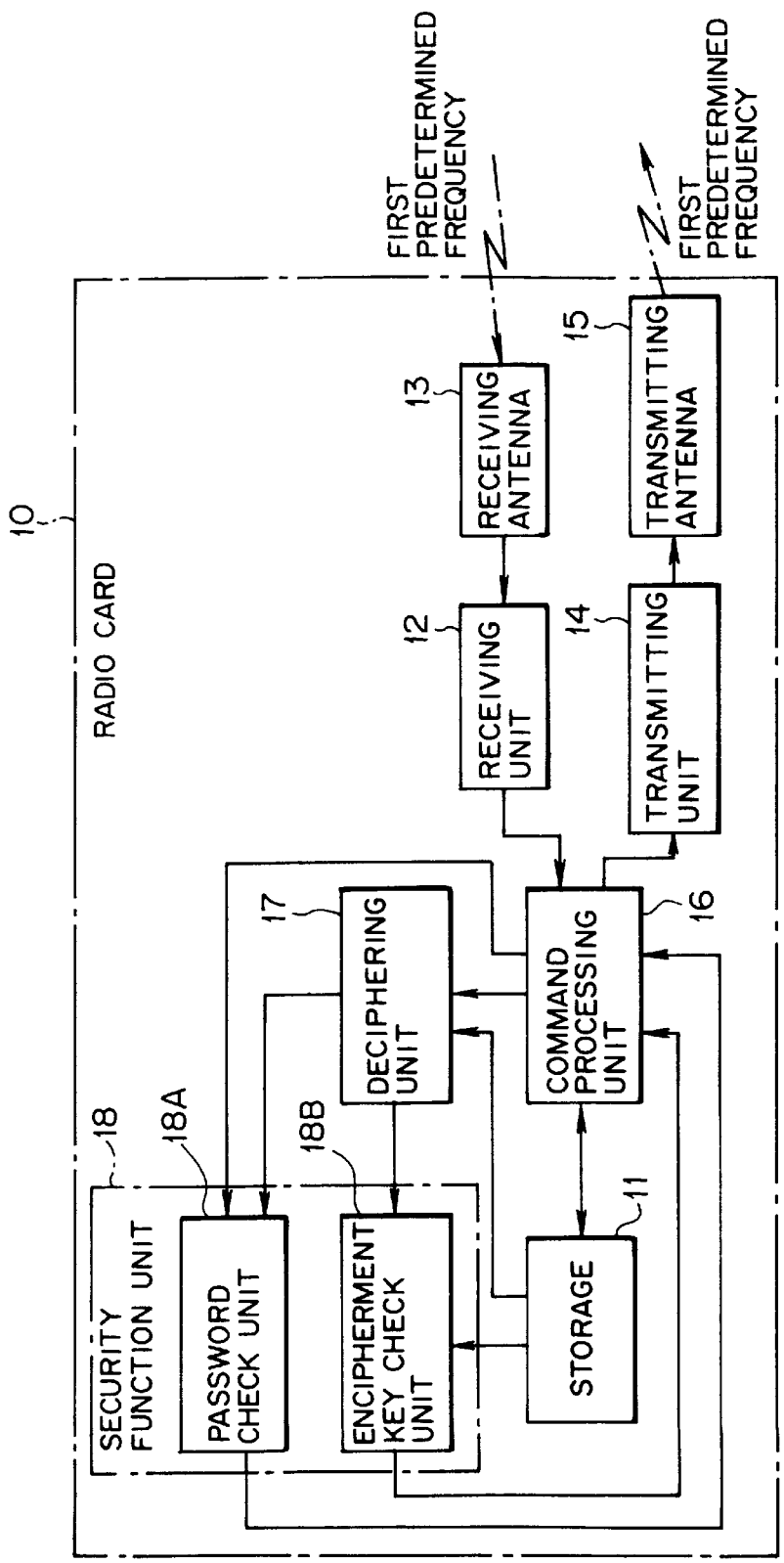
FIG. 9 is a block diagram of a radio card according to the embodiment of this invention.

The radio card 10, which will be described in detail later with reference to FIG. 9, has a storage (a storage means) 11 to store therein various information necessary for toll adjustment. The storage 11 stores therein information such as, for example, shown in FIG. 21. A data structure in the storage 11 is a tree structure made up of a directory 11A that is a control area and files 11B through 11F which are managed by the directory 11A.

In a personal information file 11B, an identification number is stored (a system ID-personal ID) which was set when the radio card 10 was issued, and in addition stores a name, an address, a telephone number and the like about a holder of the radio card 10 in an enciphered state which is enciphered by a predetermined encipherment key, that is, as enciphered data. Incidentally, the encipherment key is set when the card is issued, but is variable depending on the number of issued radio cards 10 or a date of the issuance of the radio card 10.

In a security information file 11C, the above encipherment key is stored as plain-text (in a state not enciphered), and in addition to the encipherment key, a password selected by the holder when the radio card 10 was issued, and a term of validity which was set when the radio card 10 was issued are all in a state where they have been enciphered with that encipherment key.

In a use information file 11D, the use information is stored which is obtained at each of the toll adjusting gates (toll houses) 33A, 33B, 34A, 34B, 35A and 35B as a result of use of the toll road in a state where they have been enciphered with the encipherment key.

For instance, as the use information at the entrance toll adjusting gates 33A and 33B, a type (entrance), a tollhouse code, date and time when the vehicle 30 passed through, etc. are written from the writing apparatus 40A and 40B. As the use information at the exit toll adjusting gates 34A and 35B, a type (exit), a tollhouse code, data and time of the payment, distinction of the payment (pre- or post-), a type of the vehicle/a charge, etc. are written from the settling apparatus 50A and 50B. As the use information at the entrance/exit toll adjusting gates 35A and 35B, a type (entrance/exit), a tollhouse code, date and time of the payment, distinction of the payment (pre- or post-), a type of the vehicle/a charge, etc. are written from the settling apparatus 60A and 60B.

Meanwhile, it is possible to erase the use information which is written at the entrance toll adjusting gates 33A and 33B by overwriting the use information output from the exit toll adjusting gates 34A and 34B. Since the use information is written in the use information file 11D, the past twenty generations, for example, are kept (the oldest is erased when the use information in the twenty-first generation is written) so that a generation management (a history management) is possible.

A depositing information file 11E is made up of two subfiles 11E-1 and 11E-2. In the subfile 11E-1, there is stored a maximum amount of deposit money that is depositable at a time when the depositing apparatus 70 performs the depositing process. The maximum amount of deposit money is enciphered with the encipherment key. In the subfile 11E-2, there is stored depositing information (a place of deposit, date and time of deposit, a sum of deposit money, etc.) which is written from the depositing apparatus 70 in a state where it is enciphered with the encipherment key. As the depositing information written in the subfile 11E-2, the past twenty generations, for example, are kept so that a generation management (a history management) is possible similar to the above-described use information.

In a balance information file 11F, there are stored a maximum balance beyond which the depositing apparatus 70 cannot perform the depositing process, and a balance obtained by subtracting a charged toll in the toll adjusting process by the settling apparatus 50A or 60A in the toll pre-payment system. This balance is updated in the depositing process performed by the depositing apparatus 70. Both the balance and the maximum balance are stored in an enciphered state where they are enciphered with the encipherment key.

Figure 21:
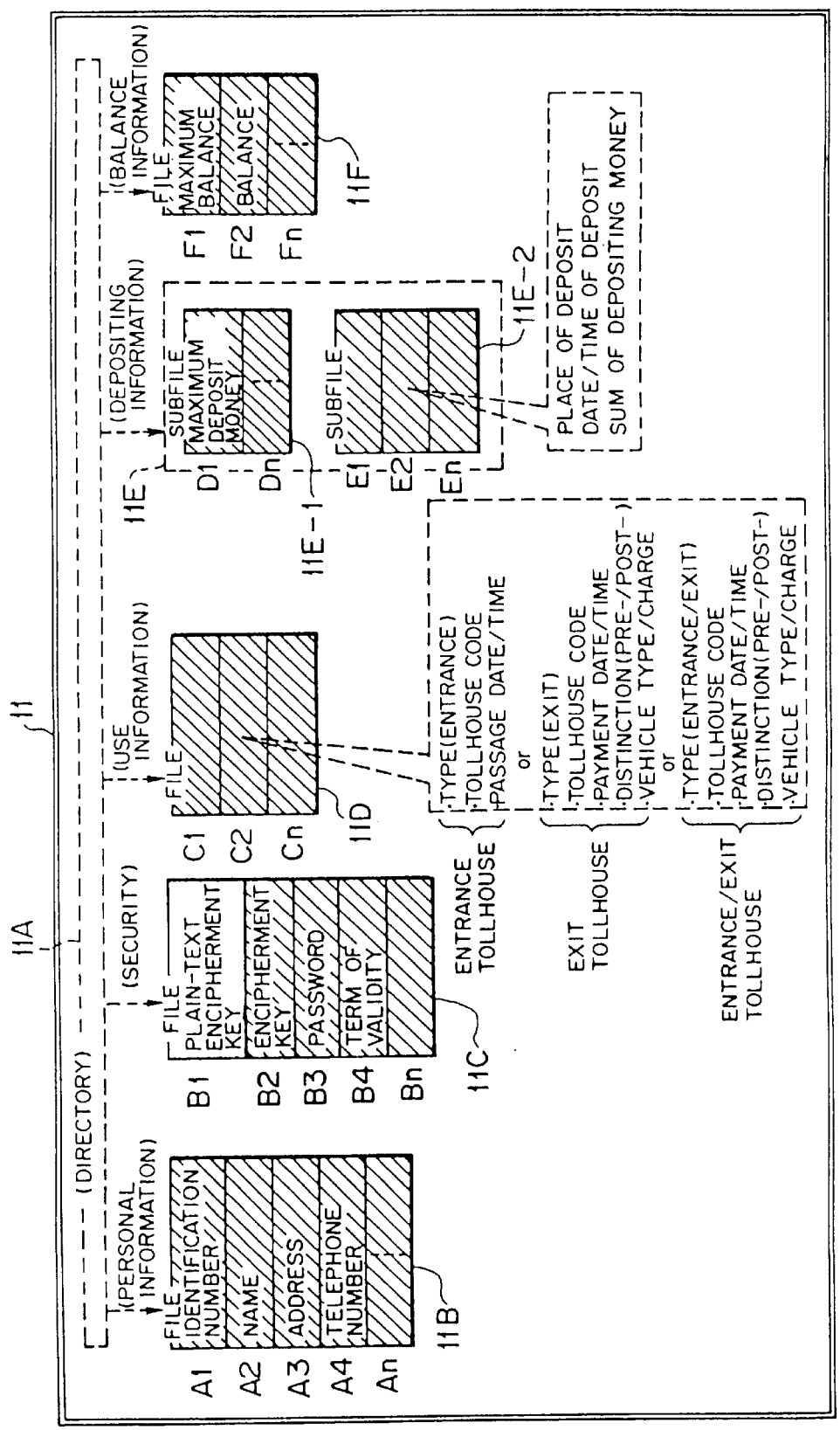
FIG. 21 is an illustration depicting a structure of data in a storage of the radio card according to the embodiment.

In FIG. 21, "A1, A2, . . . , An; B1, B2, . . . , Bn; C1, C2, . . . , Cn; D1, D2, . . . , Dn; E1, E2, . . . , En; F1, F2, . . . , Fn" in the respective files 11B through 11F designate record numbers in the files 11B through 11F. In FIG. 21, the shaded portions indicate enciphered data.

In the system according to this embodiment, the password selected by the holder when the radio card 10 was issued is set in advance in the security information file 11C as stated before. By using the password, verification as to whether the user is the owner himself or herself is carried out in the following manner.

In the case of toll adjustment in the toll pre-payment system, a password input through the depositing apparatus 70 is transmitted to the radio card 10 by radio communication at the first predetermined frequency when the depositing apparatus 70 performs the depositing process. In the radio card 10, a password, which is set and stored in the radio card 10, is deciphered into a plain-text state from an enciphered state, the deciphered password is then compared with the password transmitted from the depositing apparatus 70 to check on a payer depositing to the radio card 10, in other word, to verify whether a payer depositing to the radio card 10 is the owner himself or herself. In practice, the verification of the user by inputting the password is skipped when a toll is actually adjusted in the toll pre-payment system at the toll adjusting gate 34A or 35A.

In the case of toll adjustment in the toll post-payment system, a password input through the on-vehicle apparatus 20 is transmitted to the radio card 10 by radio communication at the first predetermined frequency when the radio card 10 is inserted in the on-vehicle apparatus 20. In the radio card 10, a password set and stored in the radio card 10 is deciphered from an enciphered state into a plain-text state, and the deciphered password is compared with the password transmitted from the on-vehicle apparatus 20 to check on the user of the radio card 10, that is, to verify whether the user is the owner himself or herself. In practice, the verification of the user by inputting the password is skipped when the toll is actually adjusted in the toll post-payment system at the toll adjusting gate 34B or 35B.

A check on a) a payer depositing to the radio card 10 when the depositing apparatus 70 performs the depositing process or b) a user of the radio card 10 when the radio card 10 is inserted into the on-vehicle apparatus 20 enables a verification of the payer or the user as to whether the payer or the user is the owner of the radio card 10 to avoid a fraudulent, invalid or improper use of the radio card 10. By virtue of this check, it is possible to omit an input of the password when a toll is actually adjusted so that an adjusting process can be performed more swiftly.

In the system according to this embodiment, the information is exchanged as enciphered data by radio communication between the radio card 10 and each apparatus (the writing apparatus 40A, 40B, the settling apparatus 50A, 50B, 60A, 60B, the depositing apparatus 70 or the inquiring apparatus 80). This is effective to prevent the information from easily being intercepted, in addition to enable a verification of falsified data with use of the encipherment key as follows.

Figure 20:
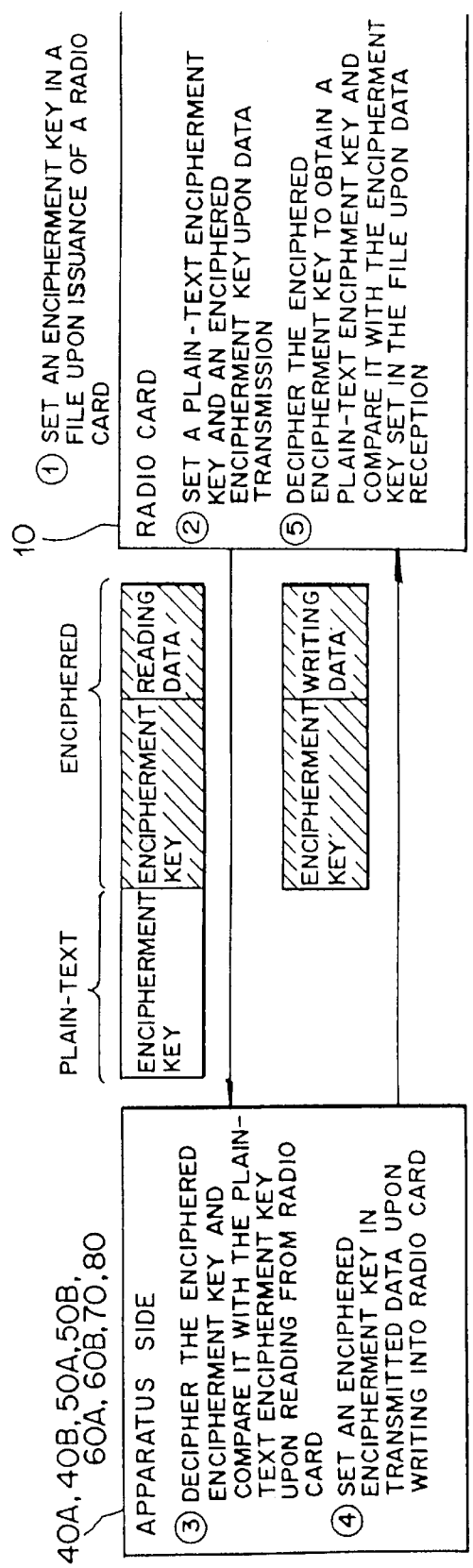
FIG. 20 is an illustration depicting a structure of communication data and a method for detecting tampered data upon radio communication according to the embodiment.

As shown in FIG. 20, when data is transmitted from the radio card 10 to each apparatus, read-in data to be transmitted, that has been enciphered with a plain-text encipherment key, is transmitted along with a plain-text encipherment key and an enciphered encipherment key. On the side of the apparatus, the enciphered data is deciphered with the plain-text encipherment key received at the same time, and the deciphered encipherment key is compared with the plain-text encipherment key, thereby verifying falsified data.

Written data to be transmitted from each apparatus to the radio card 10 and the encipherment key are enciphered with this encipherment key, and transmitted as enciphered data to the radio card 10. When receiving the written data, the radio card 10 deciphers the encipherment key, which is in an enciphered state and which is received at the same time as the written data, with the plain-text encipherment key which is stored in the security information file 11C of the storage 11, compares the deciphered encipherment key with the plain-text encipherment key to verify falsified data.

Next, verification of falsified data as above in the system of this embodiment shown in FIG. 8 will be described in more detail.

When the radio card 10 receives a read demand to read out information stored in the radio card 10 from the writing apparatus 40A, 40B, the settling apparatus 50A, 50B, the settling apparatus 60A, 60B, the depositing apparatus 70 or the inquiring apparatus 80, the radio card 10 transmits a plain-text encipherment key and enciphered data, that is an object of the read demand, to the writing apparatus 40A, 40B, the settling apparatus 50A, 50B, 60A, 60B, the depositing apparatus 70, or the inquiring apparatus 80 directly by radio communication at the first predetermined frequency or indirectly via the on-vehicle apparatus 20 by radio communication at the second predetermined frequency.

The writing apparatus 40A, 40B, the settling apparatus 50A, 50B 60A, 60B, the depositing apparatus 70 or the inquiring apparatus 80 deciphers the received enciphered data with the plain-text encipherment key transmitted from the radio card 10, compares the deciphered encipherment key, obtained from the enciphered data, with the plain-text encipherment key, which is received along with the enciphered data, to check the information that is an object of the read demand issued from the radio card 10. If any fraudulent, invalid or improper act such as falsification has been done on the data in the radio card 10, it is possible to verify such data, as above.

It is possible in the above manner to prevent with certainty, the information from being intercepted when the data is transmitted from the radio card 10 to the writing apparatus 40A, 40B, the settling apparatus 50A, 50B 60A, 60B, the depositing apparatus 70 or the inquiring apparatus 80, and to verify falsified data quickly and certainly.

When the information is written from the writing apparatus 40A, 40B, the settling apparatus 50A, 50B, 60A, 60B or the depositing apparatus 70 into the radio card 10, the writing apparatus 40A, 40B, the settling apparatus 50A, 50B 60A, 60B or the depositing apparatus 70 enciphers the data, that is an object of the write demand, and the encipherment key with the plain-text encipherment key, and transmits the enciphered data directly to the radio card 10 by radio communication at the first predetermined frequency, or indirectly via the on-vehicle apparatus 20 by radio communication at the second predetermined frequency.

The radio card 10 deciphers the enciphered data, which is received from the writing apparatus 40A, 40B, the settling apparatus 50A, 50B, 60A, 60B or the depositing apparatus 70, with the plain-text encipherment key which is stored in the security information file 11C in the storage 11, compares this plain-text encipherment key with the encipherment key obtained by deciphering the enciphered data to check the information that is an object of the write demand issued from the writing apparatus 40A, 40B, the settling apparatus 50A, 50B 60A, 60B or the depositing apparatus 70. If any fraudulent, invalid or improper measures such as falsification or the like is taken on the data to be written in the radio card 10, it is possible to verify such data.

As above, it is possible to prevent information from being intercepted with certainty when data is transmitted from the writing apparatus 40A, 40B, the settling apparatus 50A, 50B, 60A, 60B or the depositing apparatus 70 to the radio card 10, and to verify falsified data immediately and certainly.

In the system according to this embodiment, it is possible to verify a fraudulent, invalid or improper use as described below, in addition to verification as to whether a payer or a user is the owner of the radio card 10 and verification of falsified data.

When the radio card 10 receives a read demand to read information stored in the radio card 10 from the writing apparatus 40A, 40B, the settling apparatus 50A, 50B, the settling apparatus 60A, 60B or the depositing apparatus 70, the radio card 10 transmits an identification number (a system ID-a personal ID) and a term of validity along with the data that is an object of the read demand to the writing apparatus 40A, 40B, the settling apparatus 50A, 50B, 60A, 60B or the depositing apparatus 70 directly by radio communication at the first predetermined frequency, or indirectly via the on-vehicle apparatus 20 by radio communication at the second predetermined frequency. The writing apparatus 40A, 40B, the settling apparatus 50A, 50B, 60A, 60B or the depositing apparatus 70 performs a check on the identification number and the term of validity.

If the radio card 10 receives a read demand to read information stored in the radio card 10 from the inquiring apparatus 80, the radio card 10 transmits only the identification number along with the data, that is an object of the read demand issued from the inquiring apparatus 80, to the inquiring apparatus 80 by radio communication at the first predetermined frequency. The inquiring apparatus 80 performs a check on the identification number.

In the event of a check on the identification number, a negative check is performed using a system ID in the identification number on the basis of information provided by the host computer 90 to confirm correctness of the radio card 10. A check on the basis of the term of validity is used to determine whether the radio card 10 is valid or not. These checks are effective to confirm correctness of the radio card 10, and to avoid fraudulent, invalid or improper use of the radio card 10 previously and certainly.

When the depositing apparatus 70 performs the depositing process, the depositing apparatus 70 acquires a maximum amount of deposit money and a maximum balance along with the balance information from the radio card 10, and performs a check on the maximum amount of deposit money and the maximum balance. By checking a maximum sum (a maximum amount of deposit money) receivable at a time and a maximum sum (a maximum balance) retainable in the radio card 10, it is possible to prevent the money paid through the depositing apparatus 70 from exceeding the maximum amount of deposit money or prevent the balance from exceeding the maximum balance as a result of the depositing process. This can further prevent more money than necessary from being received in the depositing process so as to minimize damage, caused by, for example, fraudulent, invalid or improper use.

On a toll road 31 where a toll according to a trip distance is collected, the settling apparatus 50A or 50B at the exit toll adjusting gate 34A or 34B directly acquires a passage time (i.e., time of passage) of the vehicle 30 at the entrance toll adjusting gate 33A or 33B (use date/time) which was written as the use information into the radio card 10 by the writing apparatus 40A or 40B by radio communication at the first predetermined frequency, or indirectly via the on-vehicle apparatus 20 by radio communication at the second predetermined frequency, calculates a time period required for the vehicle 30 to reach the exit toll adjusting gate 34A or 34B from the passage time of the vehicle 30 at the entrance toll adjusting gate 33A or 33B in order to check whether the required time period (i.e., amount of time required by the vehicle to travel between the entrance and exit) is reasonable or not.

This check makes it possible to determine a time period that the user has required to travel on the toll road 31, and verify if the user has done any fraudulent, invalid or improper act during the use of the toll road, to avoid fraudulent, invalid or improper use of the toll road.

Contents of the verification for verifying fraudulent, invalid or improper use performed in the depositing apparatus 70, the writing apparatus 40A, 40B, the settling apparatus 50A, 50B, 60A, 60B, or the inquiring apparatus 80 are tabulated in Table 1 as shown below for easy understanding. In Table 1, ○ shows that a check is performed, and Δ shows that a check is performed at only the exit toll adjusting gates 34A and 34B.

TABLE 1

|  | depositing apparatus | writing apparatus, settling apparatus | inquiring apparatus |
|---|---|---|---|
| (1) check correctness of the radio card using a system ID of the identification number (system ID-personal ID) | ○ | ○ | ○ |
| (2) check a term of validity of the radio card | ○ | ○ | — |
| (3) check a maximum sum (a ceiling of depositing money) receivable at a time | ○ | — | — |
| (4) check a maximum sum (a ceiling of balance) retainable in the radio card | ○ | — | — |
| (5) calculate a required time period from a passage time at the entrance toll adjusting gate to check as to whether the time period is reasonable | — | Δ | — |

In the system according to this embodiment, the totaling process unit 91 of the host computer 90 managing the depositing apparatus 70, and the settling apparatus 50A and 60A in the toll pre-payment system totals a) accumulation of sums of deposit money written as the depositing money information in the radio card 10 from the money receiving apparatus 70 and b) accumulation of collected tolls written as the use information into the radio card 10 from the settling apparatus 50A and 60A for each radio card 10 and for the entire system, and manages a total sum as a balance of these accumulations.

If a sum of the money from the radio card 10 is incorrect, it is possible to verify such an operation and avoid a fraudulent, invalid or improper act such as a fake transfer of money or the like. For instance, if the depositing process is fraudulently, invalidly or improperly performed on the radio card 10 without using the depositing apparatus 70, the accumulation of collected tolls increases although the accumulation of sums of deposit money does not increase, so the total sum becomes a negative value. Accordingly, by watching the total sum (i.e., negative check), it is possible to verify a fraudulent, invalid or improper depositing process.

As above, it is possible in the system according to this embodiment to build up a security function. In the case of using the radio card 10, it is, therefore, possible to cope, with certainty, with information which is intercepted by radio communication, fraudulent, invalid or improper use of the radio card 10, forgery of data in the radio card 10 such as fake transfer of money, fraudulent, invalid or improper use of the toll road, etc.

Meanwhile, a description of a practical structure to accomplish the above-described security in the system according to this embodiment will be made when each of the apparatuses configuring this system is described by reference to FIGS. 9 through 17.

(d) Description of Radio Card

Now, referring to FIG. 9, a description will be made of a structure of the radio card 10 according to this embodiment, which is carried by a user of the toll road. In FIG. 9, reference numeral 11 denotes a storage (a storing means) for storing various information (adjustment information necessary for toll adjustment for the toll roads 31 and 32) in a data structure described before with reference to FIG. 21, 12 denotes a receiving unit (a receiving means) which demodulates a carrier wave transmitted by radio communication at the first predetermined frequency for the toll pre-payment system and received by a built-in receiving antenna 13, and which takes out (i.e., outputs) received data (a command) processable in a command processing unit 16 which is described later. Reference numeral 14 denotes a transmitting unit (a transmitting means) which modulates transmitted data into a carrier wave at the first predetermined frequency, and in addition which supplies electrical energy necessary for transmission to a built-in transmitting antenna 15 to transmit the transmitted data (responsive information) to the outside through the transmitting antenna 15 by radio communication at the first predetermined frequency.

Reference numeral 16 denotes a command processing unit (a processing means) which performs processes on files in the storage 11 such as designated file opening (Open), data reading (Read), data writing (Write), designated file closing (Close), etc. on the basis of the command information received by the receiving unit 12, and which notifies responsive information to the transmitting unit 14.

When receiving a read demand from the outside through the receiving unit 12, the command processing unit 16 reads out enciphered data (responsive information) that is an object of the read demand and a plain-text encipherment key from the storage 11, and transmits them at the first predetermined frequency through the transmitting unit 14 and the transmitting antenna 15.

Reference numeral 17 denotes a deciphering unit (a deciphering means). When receiving a write demand through the receiving antenna 13 and the receiving unit 12 from the outside in response to the transmission of the data that is the object of the read demand as above, the deciphering unit 17 deciphers an encipherment key, included in the enciphered data that is an object of the write demand, with the plain-text encipherment key stored in the storage 11.

Reference numeral 18 denotes a security function unit which has a password check unit 18A and an encipherment key check unit 18B.

The password check unit 18A compares a password obtained by deciphering enciphered data, for the password stored in the storage 11 by the deciphering unit 17, with a password received from the outside through the receiving unit 12 to verify the owner of the radio card 10.

The password received from the outside is either a password which is input through the depositing apparatus 70 when deposit money for the toll pre-payment is processed, or a password which is input through the on-vehicle apparatus 20 when the radio card 10 is inserted in the on-vehicle apparatus 20. By comparing these passwords in the password check unit 18A, a check on a payer who operates the depositing apparatus 70, and a check on a user who inserts the radio card 10 into the on-vehicle apparatus 20 to use the radio card 10 are performed.

The encipherment key check unit 18B compares the encipherment key, which is deciphered by the deciphering unit 17, with the plain-text encipherment key in the storage 11 to check data that is an object of a write demand which is issued from the writing apparatus 40A, 40B, the settling apparatus 50A, 50B, 60A, 60B or the depositing apparatus 70.

If the password check unit 18A or the encipherment key check unit 18B determines NG (No Good), this effect is transmitted by the command processing unit 16 to the apparatus which transmitted the password or the data.

At the toll adjusting gates 33A, 34A and 35A employing the toll pre-payment system, the radio card 10 of this embodiment directly exchanges information through the receiving unit 12 (the receiving antenna 13) and the transmitting unit 14 (the transmitting antenna 15) of the radio card 10 with the writing apparatus 40A, or the settling apparatus 50A or 60A, which are provided for the automatic toll adjustment at the toll adjusting gate 33A, 34A or 35A, by radio communication at the first predetermined frequency to automatically adjust a toll in the toll pre-payment system, as stated before.

On the other hand, at the toll adjusting gate 33B, 34B and 35B employing the toll post-payment system, the radio card 10 is inserted into the on-vehicle apparatus 20 which is mounted in each vehicle 30, and indirectly exchanges information with the writing apparatus 40B, the settling apparatus 50B or 60B at the toll adjusting gate 33B, 34A or 35B through the receiving unit 12 (the receiving antenna 13) and the transmitting unit 14 (the transmitting antenna 15) in the radio card 10 via the on-vehicle apparatus 20 by radio communication at the second predetermined frequency to automatically adjust a toll in the toll post-payment system.

If a user of the toll road 31 or 32 selects the toll pre-payment system, the user stops the vehicle 30 at the toll adjusting gate 33A, 34A or 35A for the toll pre-payment system. The user can automatically adjust a toll in the toll pre-payment system by radio communication at the first predetermined frequency only by holding up the radio card 10 directly toward the writing apparatus 40A, the settling apparatus 50A or 60A without opening the window or the like.

If a user of the toll road 31 or 32 selects the toll post-payment system, the user does not need to stop the vehicle 30 at the toll adjusting gate 33B, 34B or 35B in the toll post-payment system but passes through the gate in a state where the radio card 10 is inserted in the on-vehicle apparatus 20 to automatically adjust a toll in the toll post-payment system indirectly by radio communication at the second predetermined frequency.

To perform a depositing process from the depositing apparatus 70 on the radio card 10, the radio card 10 is inserted into the depositing apparatus 70, and the receiving unit 12 (the receiving antenna 13) and the transmitting unit 14 (the transmitting antenna 15) of the radio card 10 directly exchange information with the depositing apparatus 70 by radio communication at the first predetermined frequency to perform the depositing process.

When the above-mentioned radio card 10 of this embodiment receives a read demand from the outside through the receiving antenna 13 and the receiving unit 12, enciphered data, that is an object of the read demand, and a plain-text encipherment key are read out from the storage 11 by the command processing unit 16, and transmitted by the transmitting unit 14 and the transmitting antenna 15. Encipherment of transmitted data as above is effective to prevent information from being intercepted when the information is transmitted from the radio card 10.

When the radio card 10 receives a write demand (enciphered data) through the receiving unit 12 from the outside, the deciphering unit 17 deciphers an encipherment key, which is included in data to be written (the enciphered data), with a plain-text encipherment key stored in the storage 11. The encipherment key check unit 18B then compares the deciphered encipherment key, which is deciphered, with the plain-text encipherment key in the storage 11, to check the data to be written. If any fraudulent, invalid or improper act such as falsification has been done on the data to be written in the radio card or the like, it is possible to verify such data.

When the radio card 10 is inserted into the on-vehicle apparatus 20 or the depositing apparatus 70, which performs a depositing process, the receiving unit 12 receives a password input through the depositing apparatus 70 and the on-vehicle apparatus 20 by radio communication at the first predetermined frequency, and the password check unit 18A compares the received password with a password which is obtained by deciphering enciphered data for the password stored in the storage 11 by the deciphering unit 17 to check on validity of a payer operating the depositing apparatus 70 or a user inserting the radio card 10 in the on-vehicle apparatus 20 to use the system (a verification on the person). These checks are effective to avoid a fraudulent, invalid or improper use of the radio card. In addition to this, the above embodiment makes it possible to skip an input of the password in the event of an actual adjustment of the payment so that the adjusting process can be carried out speedy.

(e) Description of On-vehicle Apparatus

Figure 10:
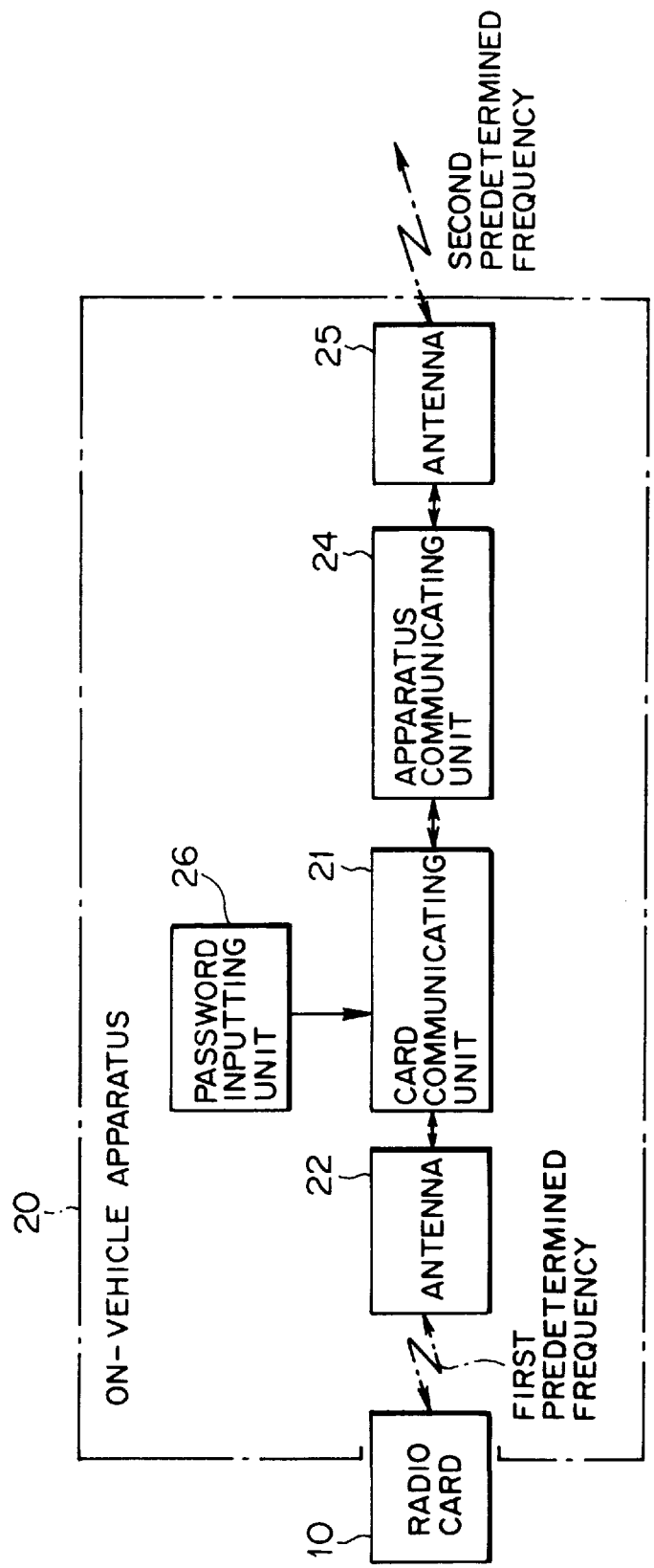
FIG. 10 is a block diagram of an on-vehicle device according to the embodiment of this invention.

Referring to FIG. 10, a structure of the on-vehicle apparatus (a frequency converting apparatus) 20 of this embodiment, which is mounted on the vehicle 30, will now be described. The on-vehicle apparatus 20 has the radio card 10 inserted therein when the vehicle 30 passes through the toll adjusting gate 33B, 34B or 35B employing the toll post-payment system to adjust a toll in the toll post-payment system, as stated before.

As shown in FIG. 10, the on-vehicle apparatus 20 of this embodiment has a card communicating unit (a first communicating means) 21, an antenna 22, an apparatus communicating unit (a second communicating means) 24, an antenna 25 and a password inputting unit (a keyboard) 26.

The card communicating unit 21 has a function for exchanging data necessary for an adjustment process in the toll post-payment system with the radio card 10 through the antenna 22 by radio communication at the first predetermined frequency when the radio card 10 is inserted therein, and in addition a function for shutting off a radio wave at the first predetermined frequency, which is used to communicate with the radio card 10 to prevent the radio wave from being intercepted outside the on-vehicle apparatus 20.

The apparatus communication apparatus 24 exchanges data, which is necessary for a toll adjusting process in the toll post-payment system, through the antenna 25 by radio communication at the second predetermined frequency for the toll post-payment system with an external apparatus (the writing apparatus 40B, the settling apparatus 50B or 60B).

When the radio card 10 is inserted into the on-vehicle apparatus 20, the card communication unit 21 transmits data, which is received from the external apparatus by the apparatus communicating unit 24, to the radio card 10 by radio communication at the first predetermined frequency, and in addition transmits data received from the radio card 10 by the card communicating unit 21 to the external apparatus by radio communication at the second predetermined frequency.

Under a condition where the radio card 10 is inserted in the on-vehicle apparatus 20 at the toll adjusting gate 33B, 34B or 35B employing the toll post-payment system, data for the toll pre-payment system at the first predetermined frequency is converted into the second predetermined frequency for the toll post-payment system through the card communicating unit 21 and the apparatus communicating unit 24. In addition information at the second predetermined frequency is converted into the first predetermined frequency at the same time so that data necessary for an adjusting process of the toll post-payment is exchanged between the writing apparatus 40B, the settling apparatus 50B or 60B at the toll adjusting gate 33B, 34B or 35B and the radio card 10.

The password inputting unit 26 is configured with, for example, a keyboard. When the radio card 10 is inserted into the on-vehicle apparatus 20, the password inputting unit 26 is used to input a password in order to check on a validity of a user of the radio card 10. The password input through the password inputting unit 26 is transmitted by the card communication unit 21 to the radio card 10 through the antenna 22 by radio communication at the first predetermined frequency so that the password check unit 18A (refer to FIG. 9) in the radio card 10 can check on the validity of the user of the radio card 10 (a verification of the person). The verification as to whether the user of the radio card 10 is the person himself or herself when the radio card 10 is inserted in the on-vehicle apparatus 20 can be skipped by inputting a password when the user actually adjusts the toll in the toll post-payment system at the adjusting gate 34B or 35B. As a result, the adjusting process can be accelerated.

(f) Description of Writing Apparatus for Entrance Toll Adjusting Gate

Figure 11:
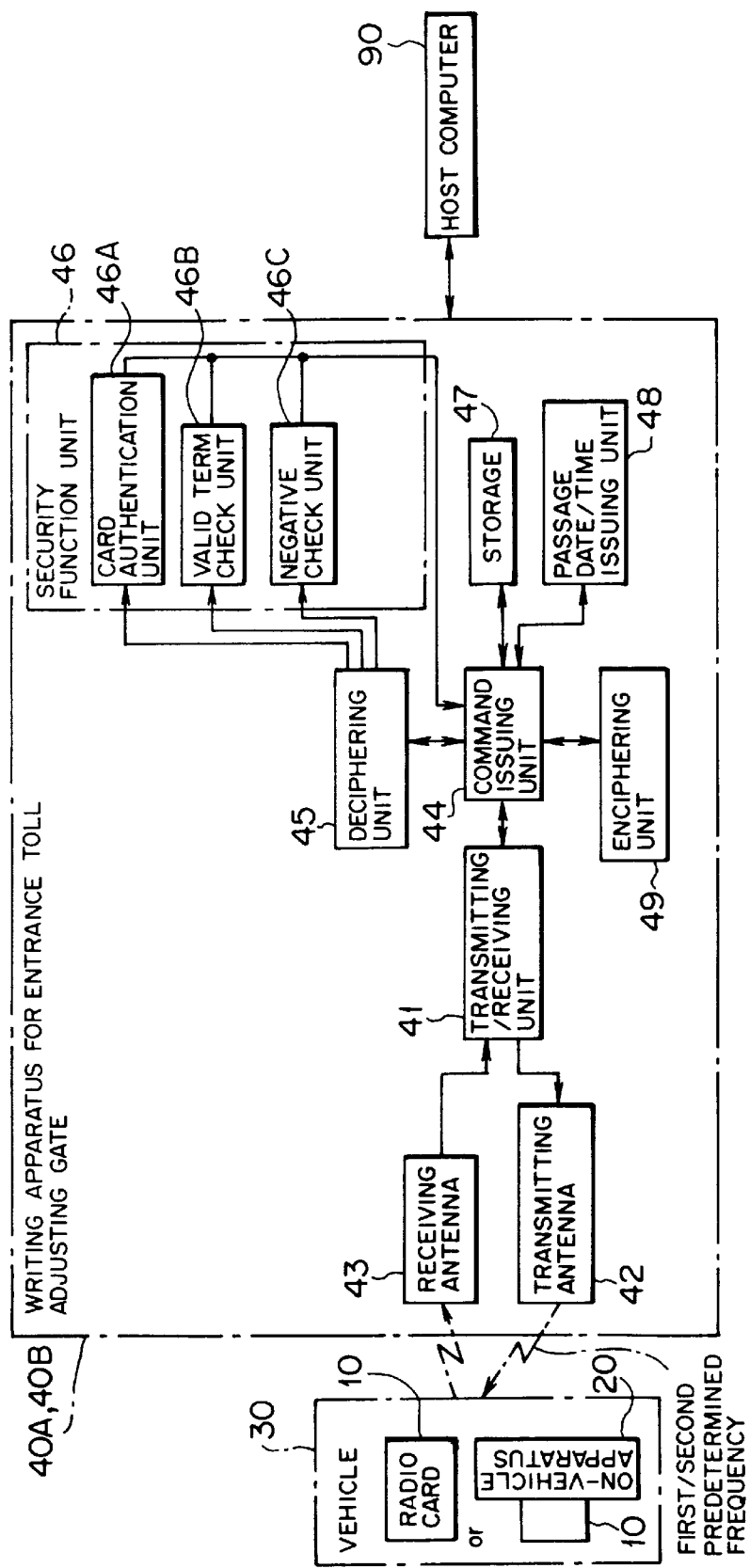
FIG. 11 is a block diagram of a writing apparatus for an entrance toll adjusting gate according to the embodiment.

Referring to FIG. 11, a structure of the writing apparatus 40A or 40B at the entrance toll adjusting gate according to this embodiment will be described next. The writing apparatus 40A or 40B is used to write the use information about the toll road 31 (a tollhouse code, date and time of the use, etc.) as adjustment information in the radio card 10. The writing apparatus 40A or 40B is installed at the entrance toll adjusting gate 33A or 33B on the toll road 31 where a toll according to a trip distance is collected. According to this embodiment, the writing apparatus 40A at the toll adjusting gate in the toll pre-payment system and the writing apparatus 40B at the toll adjusting gate in the toll post-payment system have similar structures.

In FIG. 11, reference numeral 41 denotes a transmitting/receiving unit (a communicating means). The transmitting/receiving unit 41 directly exchanges information with the radio card 10 at the entrance toll adjusting gate 33A employing the toll pre-payment system by radio communication at the first predetermined frequency. At the entrance toll adjusting gate 33B employing the toll post-payment system, the transmitting/receiving unit 41 indirectly exchanges information with the radio card 10 via the on-vehicle apparatus 20 by radio communication at the second predetermined frequency.

In practice, the transmitting/receiving unit 41 modulates transmitted data into a carrier wave at the first predetermined frequency or the second predetermined frequency, and supplies electrical energy necessary for the transmission to a transmitting antenna 42. In addition to this, the transmitting/receiving unit 41 demodulates a carrier wave at the first predetermined frequency or at the second predetermined frequency, which is received by a built-in receiving antenna 43, to output received data (a response to the command) processable in a command issuing unit 44 to be described later.

Reference numeral 44 denotes the command issuing unit (a demand issuing means). The command issuing unit 44 issues to the radio card 10 (1) an Open command (an open demand) to open a designated file in the radio card 10, (2) a Read command (a read demand) to read the designated record in the opened file, (3) a Write command (a write demand) to write the designated data in the opened file, and (4) a close command (a close demand) to close the designated file in the radio card 10 through the transmitting/receiving unit 41.

Particularly, the command issuing unit 44 in the writing apparatus 40A or 40B of this embodiment issues a write demand (a Write command) to the radio card 10 to write the use information about the entrance toll adjusting gate 33A or 33B in the radio card 10 on the vehicle 30 passing through the entrance gate 33A or 33B through the transmitting/receiving unit 41. This command issuing unit 44 functions to write a tollhouse code (unique information) about the entrance toll adjusting gate 33A or 33B stored beforehand in the storage 47 or passage date/time of the vehicle 30 issued by a passage date/time issuing unit 48 as the use information into the storage 11 (i.e., the use information file 11D; refer to FIG. 21) of the radio card 10.

The command issuing unit 44 issues a read demand (a Read command) to the radio card 10 to read the identification number and the term of validity retained in the storage 11 from the radio card 10 through the transmitting/receiving unit 41 prior to issuing the write demand to write the use information. This command issuing unit 44 functions to read the identification number and the term of validity from the radio card 10.

Reference numeral 45 denotes a deciphering unit (a deciphering means). The deciphering unit 45 deciphers the identification number and the term of validity (enciphered data), which is read out from the storage 11 of the radio card 10, in response to the read command which is issued from the command issuing unit 44, and an encipherment key (enciphered data) which is attached to these data with a plain-text encipherment key received at the same time.

Reference numeral 46 denotes a security function unit having a card authentication unit (an encipherment key check means) 46A, a valid term check unit 46B and a negative check unit 46C.

The card authentication unit 46A compares the plain-text encipherment key, received along with the enciphered data, with an encipherment key obtained by deciphering the enciphered data by the deciphering unit 45 to check information that is an object of the read demand.

The term validity check unit 46B checks whether the term of validity of the radio card 10 has expired or not based on the term of validity which is received from the radio card 10. The negative check unit 46C performs a negative check using a system ID contained in the identification number based on information provided from the host computer 90.

Incidentally, when the card authentication unit 46A, the term validity check unit 46B or the negative check unit 46C determines NG (No Good), this effect is sent from the command issuing unit 44 to the radio card 10 or the host computer 90.

Reference numeral 49 denotes an enciphering unit (an enciphering means). The enciphering unit 49 enciphers data to be written in the storage 11 of the radio card 10, which is included along with an encipherment key, with this encipherment key in response to the write demand from the command issuing unit 44.

Figure 23:
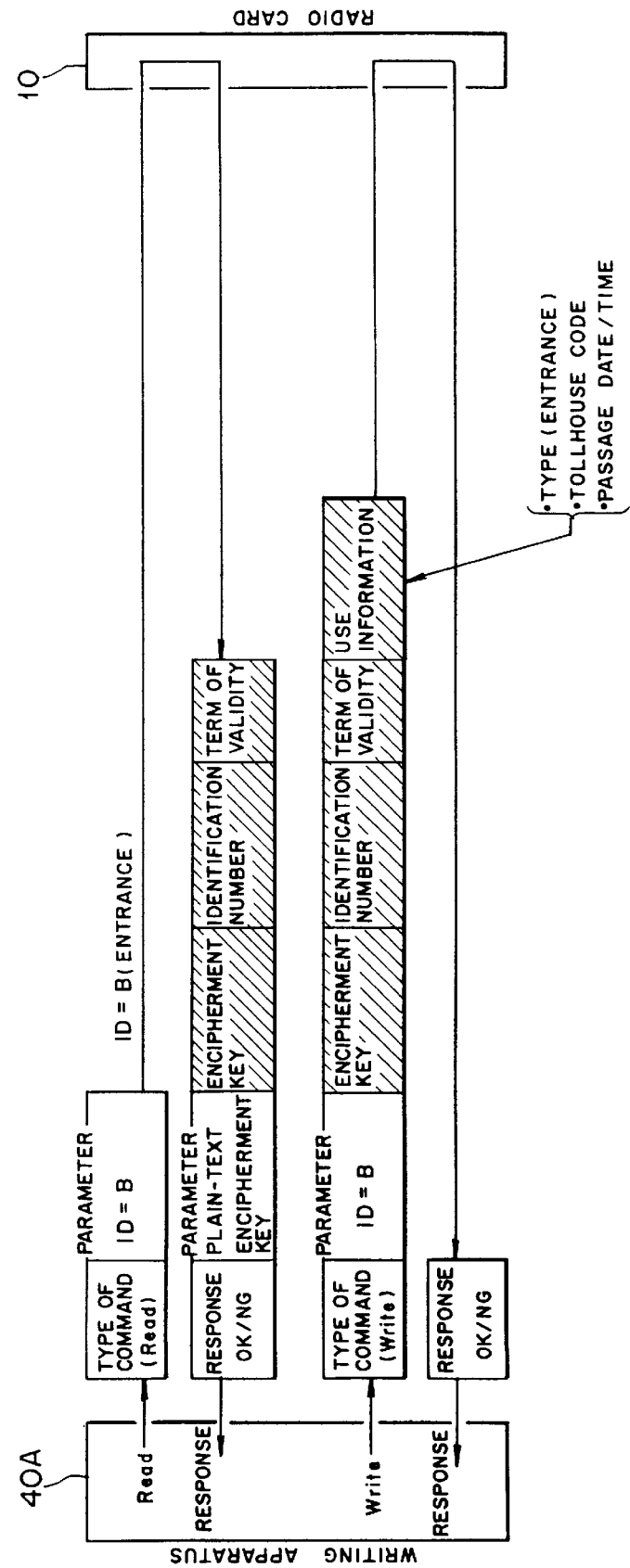
FIG. 23 is an illustration of communication data at the entrance toll adjusting gate in the a pre-payment process according to the embodiment.
Figure 27:
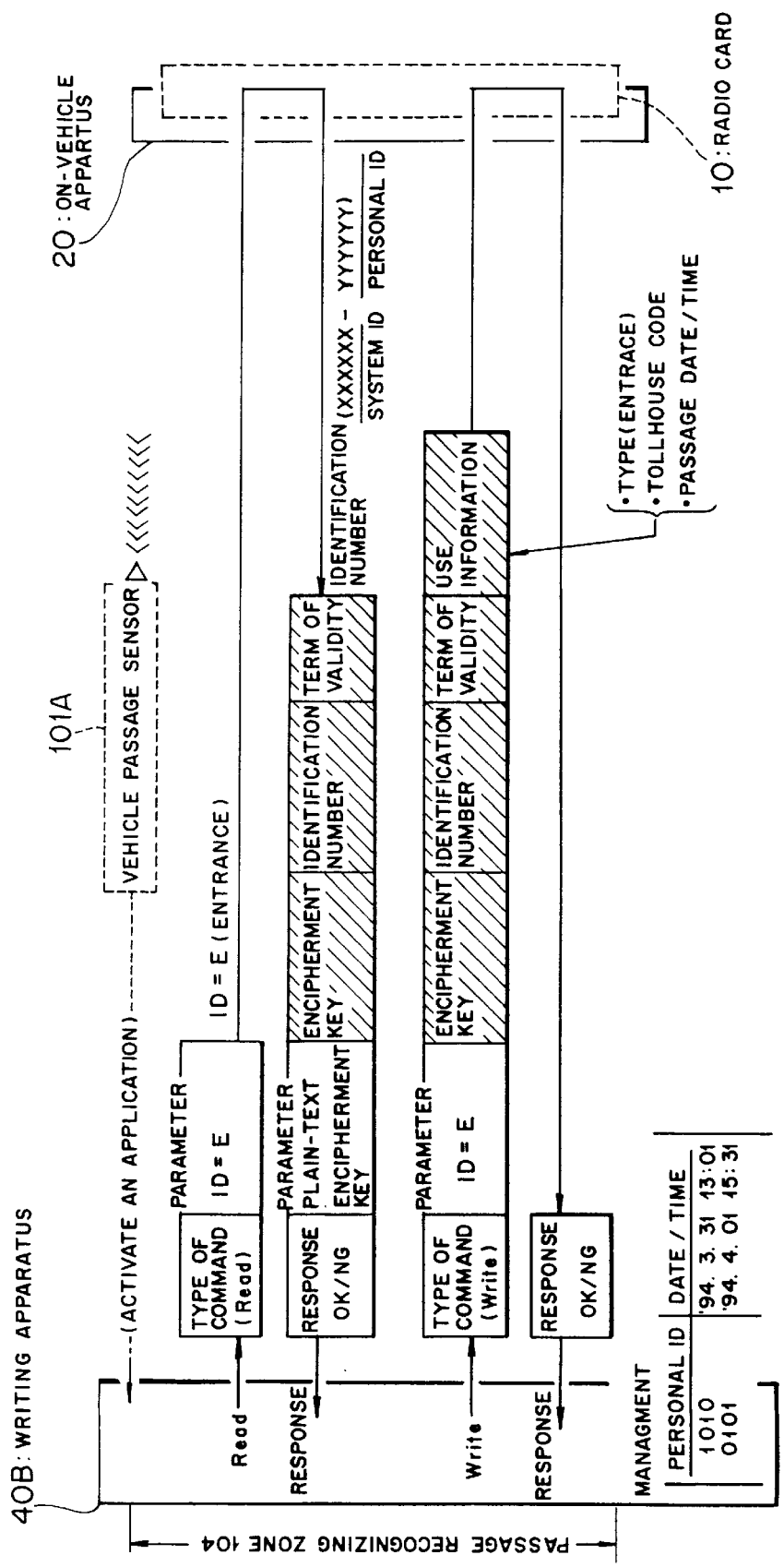
FIG. 27 is an illustration of communication data at the entrance toll adjusting gate in the toll post-payment process according to the embodiment.

In the above-mentioned writing apparatus 40A or 40B of this embodiment, when the vehicle 30 passes through the entrance toll adjusting gate 33A or 33B on the toll road 31 where a toll according to a trip distance is collected, the command issuing unit 44 issues a write demand to write the use information, including a tollhouse code for the entrance toll adjusting gate 33A or 33B and passage date/time, to the radio card 10 on the vehicle 30 (refer to FIGS. 23 and 27). This use information is written in the use information file 11D in the storage 11 of the radio card 10. This write demand is directly transmitted by the transmitting/receiving unit 41 to the radio card 10 by radio communication at the first predetermined frequency at the entrance toll adjusting gate 33A for the toll pre-payment system (refer to FIG. 23). At the entrance toll adjusting gate 33B in the toll post-payment system, this write demand is indirectly transmitted through the on-vehicle apparatus 20 by radio communication at the second predetermined frequency (refer to FIG. 27).

Since the use information, including the tollhouse code of the entrance toll adjusting gate 33A or 33B and the passage date/time, is written in the radio card 10 as above, it is, as will be described later, possible to calculate a toll according to a trip distance based on the tollhouse code of the entrance toll adjusting gate 33A or 33B which is read out from the radio card 10 when the toll is automatically adjusted at the exit toll adjusting gate 34A or 34B. It is also possible to calculate a time period required for the vehicle 30 to reach the exit toll adjusting gate 34A or 34B based on the passage time at the entrance toll adjusting gate 33A or 33B to check whether the required time is reasonable or not.

If any fraudulent, invalid or improper act such as falsification has occurred to data in the radio card 10, a check on the encipherment key by the card authentication unit 46A enables verification of such data.

Further, the term validity check unit 46B determines whether the term of validity of the radio card 10 has expired or not, and the negative check unit 46C performs a negative check on the radio card 10 to confirm correctness of the radio card 10, and to avoid a fraudulent, invalid or improper use of the radio card 10.

Data to be read from the radio card 10 into the writing apparatus 40A or 40B is enciphered, which is deciphered by the deciphering unit 45. Data written in the radio card from the writing apparatus 40A or 40B is enciphered by the enciphering unit 49. Thus, it is possible to prevent information from being intercepted when the data is transmitted from the radio card 10 to the writing apparatus 40A or 40B, or from the writing apparatus 40A or 40B to the radio card 10.

The encipherment key is enciphered by the enciphering unit 49 along with the data to be written into the radio card 10 at the same time, and transmitted to the radio card 10. It is therefore possible to check the data that is an object of a write demand by the above-described encipherment key check unit 18B at the radio card 10.

(g) Description of Settling Apparatus for Exit Toll Adjusting Gate

Figure 12:
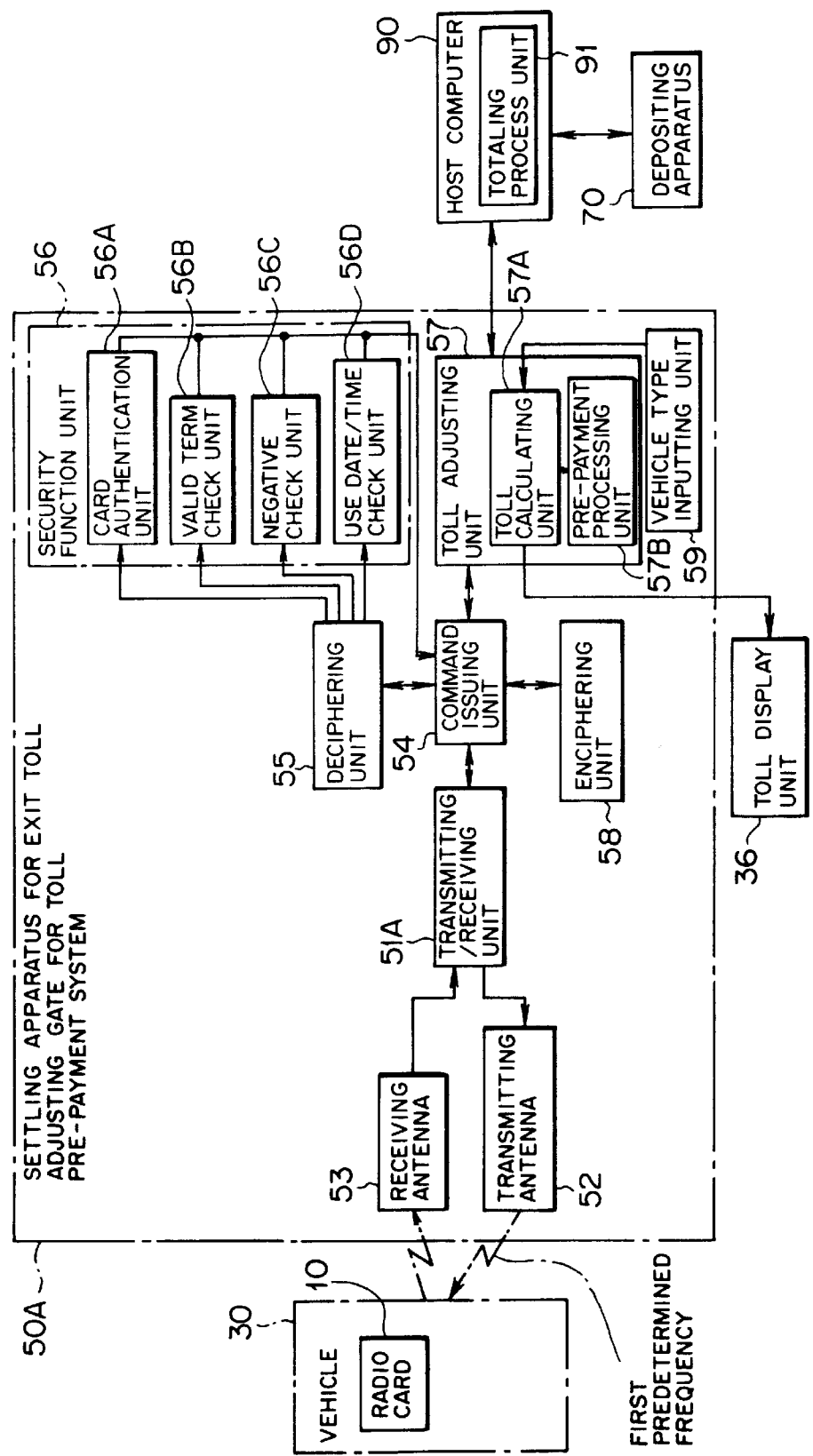
FIG. 12 is a block diagram of a settling apparatus for an exit toll adjusting gate in a toll pre-payment system according to the embodiment.
Figure 13:
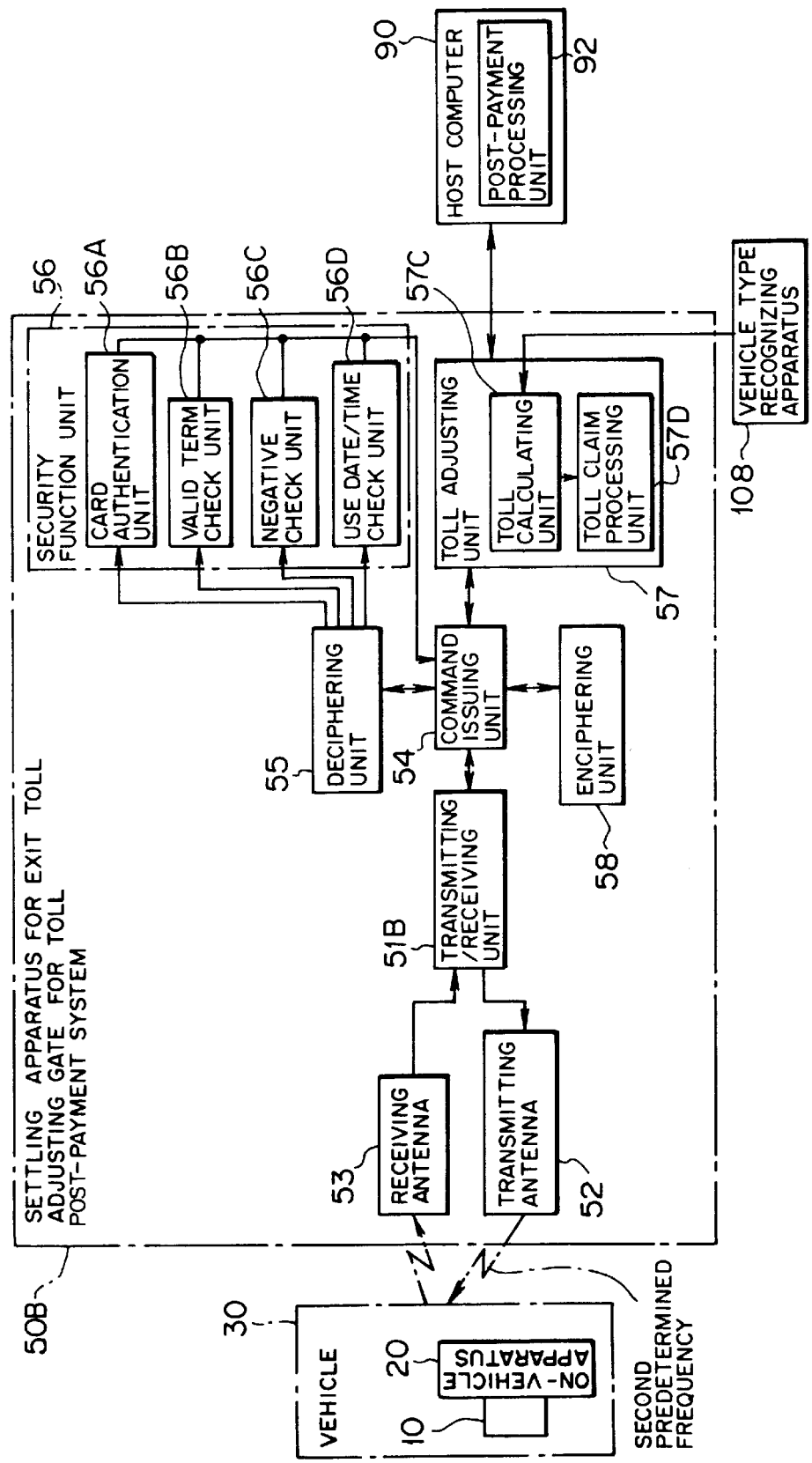
FIG. 13 is a block diagram of a settling apparatus for an exit toll adjusting gate in a toll post-payment system according to the embodiment.

Referring to FIGS. 12 and 13, a description will be made next for structures of the settling apparatus 50A for the exit toll adjusting gate in the post pre-payment system and the settling apparatus 50B for the exit toll adjusting gate in the toll post-payment system according to this embodiment.

The settling apparatus 50A and 50B are each adapted to acquire adjustment information from the radio card 10 in order to automatically collect a toll for the toll road from a holder of the radio card 10 based on the adjustment information. The settling apparatus 50A and 50B are installed at the respective exit toll adjusting gates 34A and 35B on the toll road where a toll is collected according to a trip distance. These settling apparatus 50A and 50B have similar structures as shown in FIGS. 12 and 13, respectively.

In FIGS. 12 and 13, reference numeral 51A denotes a transmitting/receiving unit (a communicating means) provided in the settling apparatus 50A for the exit toll adjusting gate in the toll pre-payment system. The transmitting/receiving unit 51A directly exchanges information with the radio card 10 by radio communication at the first predetermined frequency. Reference numeral 51B denotes the transmitting/receiving unit (a communicating means) provided in the settling apparatus 50B for the exit toll adjusting gate in a toll post-payment system. The transmitting/receiving unit 51B indirectly exchanges information via the on-vehicle apparatus 20 with the radio card 10 by radio communication at the second predetermined frequency.

More specifically, each of the transmitting/receiving units 51A and 51B modulates transmitted data into a carrier wave at the first predetermined frequency or at the second predetermined frequency, and supplies electric energy necessary for the transmission to a built-in transmitting antenna 52. On the other hand, each of the transmitting/receiving unit 51A and 51B demodulates a carrier wave at the first or the second predetermined frequency which is received through a built-in receiving antenna 53 to output received data (a response to a command) processable in a command issuing unit 54 to be described later.

Reference numeral 54 denotes the command issuing unit (a demand issuing means). The demand issuing unit 54 issues an Open command, a Read command, a Write command and a Close command to the radio card 10 through the transmitting/receiving unit 51A or 51B similar to the command issuing unit 44 described with reference to FIG. 11.

Particularly, the command issuing unit 54 in the settling apparatus 50A or 50B of this embodiment issues a read demand to the radio card 10 to read out an identification number, a term of validity and adjustment information (use information, balance information, etc.) retained in the storage 11, or issues a write demand to the radio card 10 to write adjustment result information obtained by a toll adjusting unit 57, which will be described later, for the radio card 10 to read the identification number, the term of validity and the toll adjustment information from the radio card 10 and to write the toll adjustment result information or the balance information into the radio card 10.

Reference numeral 57 denotes the toll adjusting unit (an application; a toll adjusting means). The toll adjusting means 57 automatically adjusts a toll for the toll road charged to the holder of the radio card 10 on the basis of the toll adjustment information, which is transmitted from the radio card 10 in response to the read demand from the command issuing unit 54 and which is received through the transmitting/receiving unit 51A or 51B.

The toll adjusting unit 57 in the settling apparatus 50A in the toll pre-payment system has a toll calculating unit 57A and a pre-payment processing unit 57B. The toll calculating unit 57A calculates a toll charged for the vehicle 30 on the basis of the tollhouse code included in the use information, which is read out from the radio card 10, and a vehicle type of the vehicle 30, which is input through a vehicle type inputting unit 59 by an attendant of the exit toll adjusting gate 34A. The calculated toll is displayed on the toll display unit 36, and in addition is transmitted to the totaling process unit 91 of the host computer 90, and is to manage a total sum by the totaling process unit 92 (Refer to FIG. 26).

The pre-payment processing unit 57B subtracts a charged toll, which is calculated by the toll calculating unit 57A, from a balance included in the balance information which is read out from the radio card 10, and outputs a result of the subtraction as a new balance.

In the settling apparatus 50A for the toll pre-payment system, the command issuing unit 54 issues a write demand to write the adjustment result information, including a collected toll calculated by the toll calculating unit 57A and distinction of payment (pre-payment), and the balance information including the new balance, and this information is written in the radio card 10.

The toll adjusting unit 57 in the settling apparatus 50B for the toll post-payment system has a toll calculating unit 57C and a toll claim processing unit 57D. The toll calculating unit 57C calculates a toll charged for the vehicle 30 on the basis of a tollhouse code, included in the use information which is read out from the radio card 10, and a result of vehicle type recognition of the vehicle 30 output from a vehicle type recognizing apparatus 108 (described later with reference to FIG. 19) at the exit toll adjusting gate 34B.

The toll claim processing unit 57D claims payment of a charged toll which is calculated by the toll calculating unit 57C on a post-payment processing unit 92 of the host computer 90 based on the personal information (an identification number, etc.) included in the toll adjustment information which is read out from the radio card 10.

In the settling apparatus 50B for the toll post-payment system, the command issuing unit 54 issues a write demand to write the adjustment result information, including a charged toll calculated by the toll calculating unit 57C, and distinction of payment (post-payment), and this toll adjustment result information is written in the radio card 10.

In FIGS. 12 and 13, reference numeral 55 denotes a deciphering unit (a deciphering means). The deciphering unit 55 deciphers various information (enciphered data) and an encipherment key (enciphered data), which is attached to the data read out from the storage 11 of the radio card 10 in response to a read demand issued from the command issuing unit 54, with a plain-text encipherment key received at the same time.

Reference numeral 56 denotes a security function unit. The security function unit 56 has a card authentication unit (an encipherment key check means) 56A, a valid term check unit 56B, a negative check unit 56C and a use date/time check unit 56D. The card authentication unit 56A, the valid term check unit 56B and the negative check unit 56C function in the same way as the card authentication unit 46A, the valid term check unit 46B and the negative check unit 46C which were described above with reference to FIG. 11, so no additional description thereof is made here.

The use date/time check unit 46D calculates a time required for the vehicle 30 to reach the exit toll adjusting gate 34A or 34B from a passage time (use date/time) at the entrance toll adjusting gate 33A or 33B included in the use information which is read out from the storage 11 of the radio card 10, and checks whether the required time is reasonable or not.

If the card authentication unit 46A, the valid term check unit 56B, the negative check unit 56C or the use date/time check unit 56D determines NG (No Good), this determination is sent through the command issuing unit 54 to the radio card 10 or the host computer 90.

Reference numeral 58 denotes an enciphering unit (an enciphering means). The enciphering unit 58 enciphers data and an encipherment key, to be written in the radio card 10 in response to a write demand from the command issuing unit 54, with this encipherment key.

To use the above-mentioned settling apparatus 50A of this embodiment, the vehicle 30 stops at the exit toll adjusting gate 34A if a toll in the toll pre-payment system is adjusted at the exit toll adjusting gate 34A on the toll road 31 where a toll according to a trip distance is collected. At the exit toll adjusting gate 34A, information is directly exchanged between the radio card 10 and the settling apparatus 50A by radio communication at the first predetermined frequency when the radio card 10 is held against the settling apparatus 50A.

Figure 24:
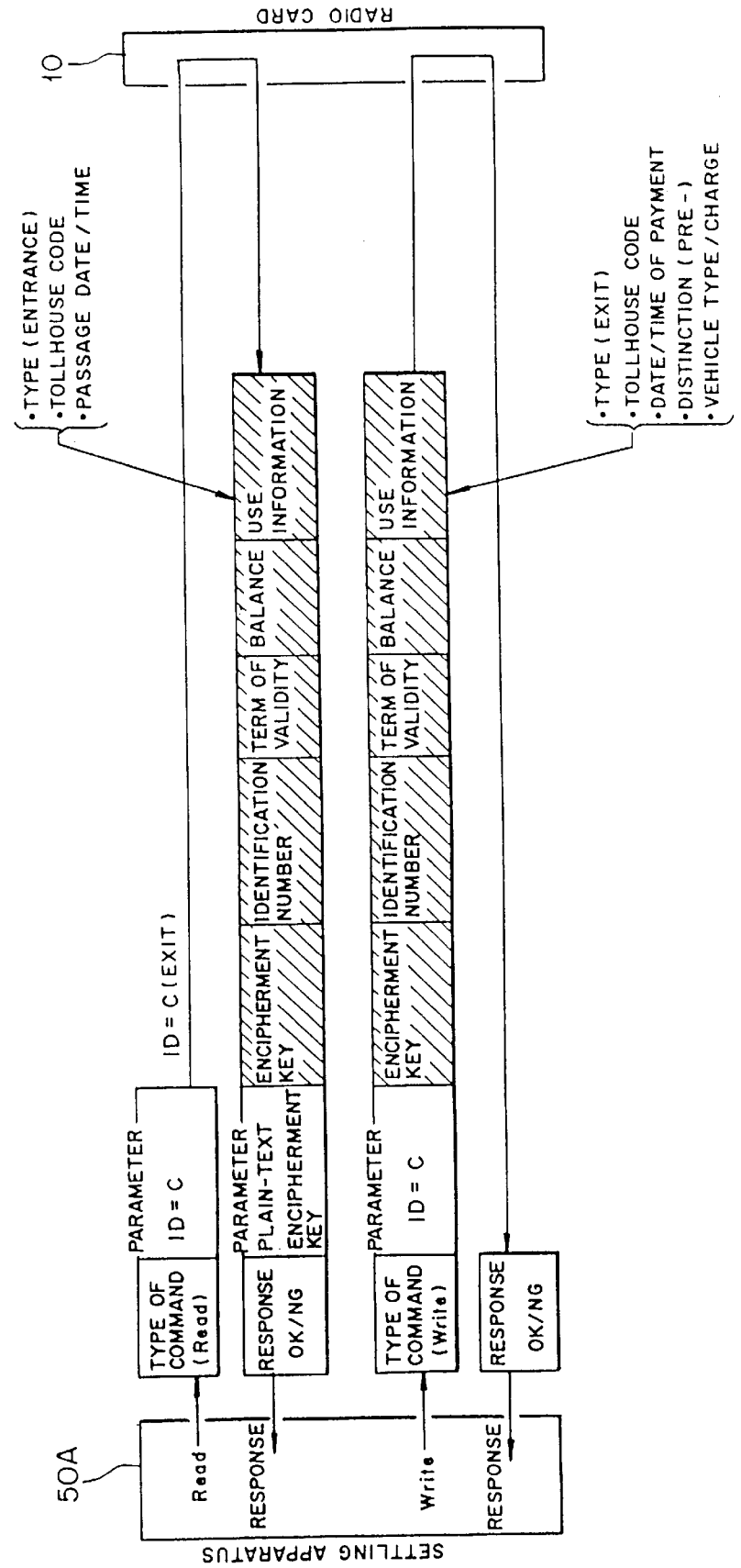
FIG. 24 is an illustration of communication data at the exit toll adjusting gate in the toll pre-payment process according to the embodiment.

On this occasion, a read demand to read the use information and the balance information is issued by the command issuing unit 54 to the radio card 10 (refer to FIG. 24). When the use information and the balance information are read out from the radio card 10 in response to the read demand, the toll calculating unit 57A of the toll adjusting unit 57 calculates a toll charged for the vehicle 30 based on a tollhouse code included in the use information and a type of vehicle 30 input by the attendance through the vehicle type inputting unit 59. The calculated toll is then displayed on the toll display unit 36.

The pre-payment processing unit 57B outputs a result of subtraction, which is obtained by subtracting a charged toll output from the toll calculating unit 57A from a balance included in the balance information, as a new balance. The command issuing unit 54 issues a write demand to write the adjustment result information, including the charged toll and payment distinction (pre-payment), and the balance information including a new balance (refer to FIG. 24), and this information is written in the radio card 10.

If a toll in the toll post-payment system is adjusted at the exit toll adjusting gate 34B on the toll road 31 where a toll according to a trip distance is collected by applying the above-mentioned settling apparatus 50B of this embodiment, the vehicle 30 passes through the exit toll adjusting gate 34B without stopping when the radio card 10 is inserted in the on-vehicle apparatus 20. At this time, data is indirectly exchanged between the radio card 10 and the settling apparatus 50B via the on-vehicle apparatus 20 by radio communication at the second predetermined frequency.

Figure 29:
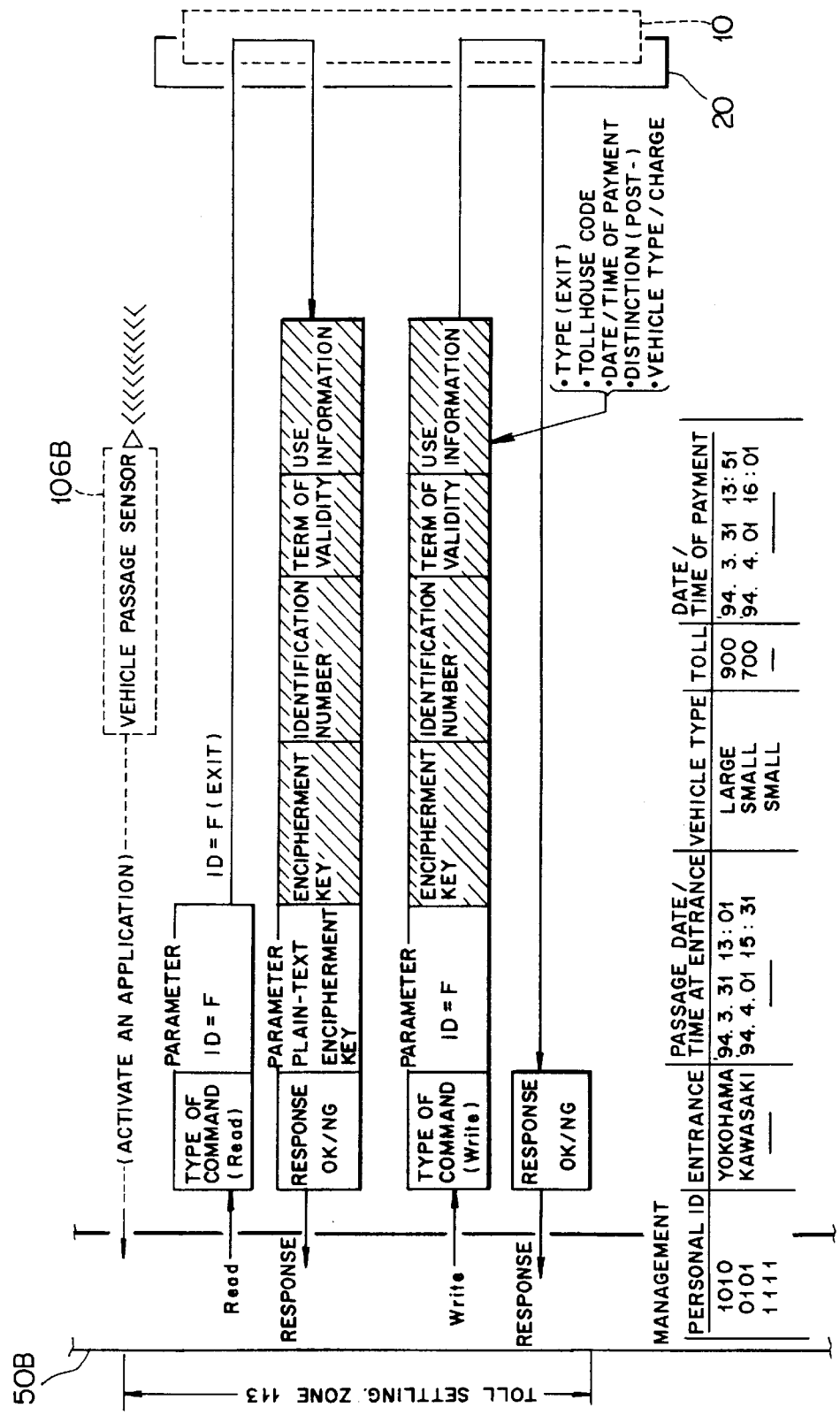
FIG. 29 is an illustration of communication data in a toll settling zone at the exit toll adjusting gate in the toll post-payment process according to the embodiment.
Figure 30:
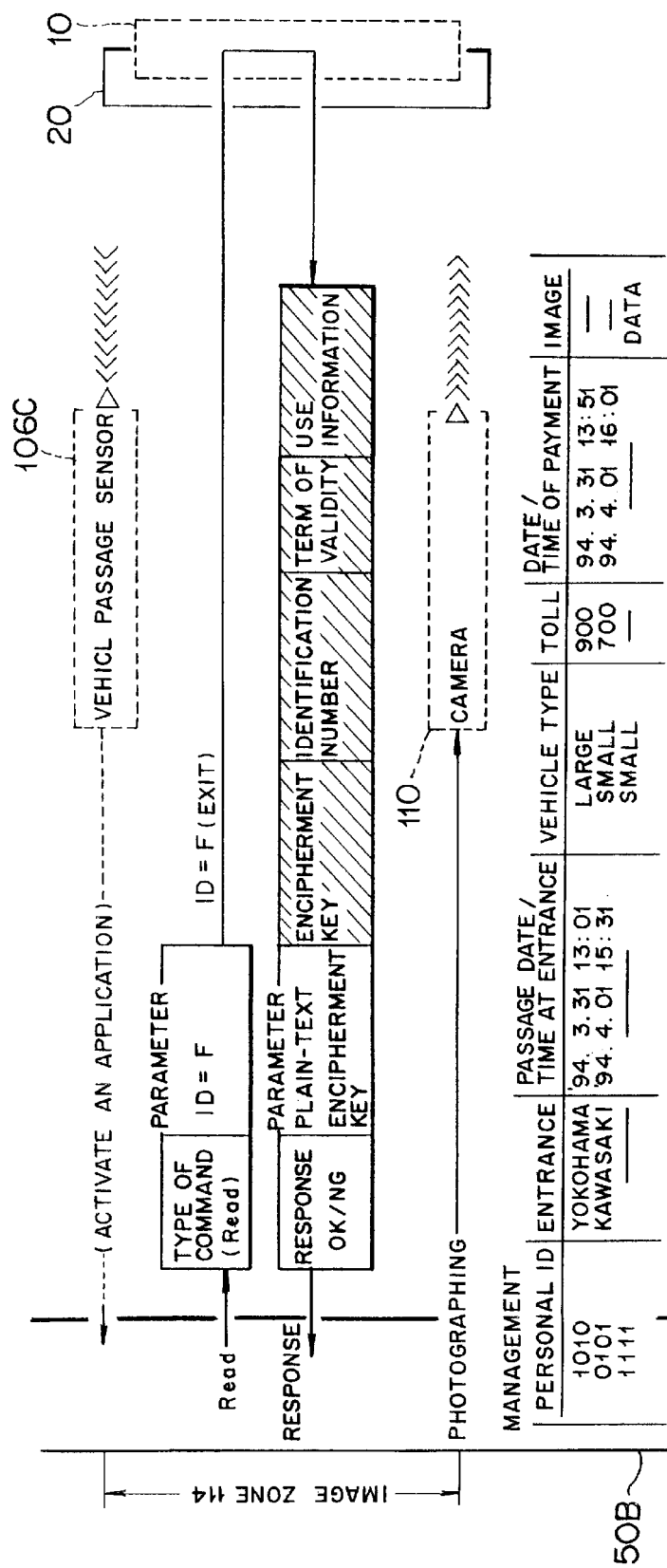
FIG. 30 is an illustration of communication data in an image zone at the exit toll adjusting gate in the toll post-payment process according to the embodiment.

The command issuing apparatus 54 issues a read demand to the radio card 10 to read the use information and the personal information (an identification number, etc.) from the radio card 10 (refer to FIG. 29). When the use information is read out from the radio card 10 in response to the read demand, the toll calculating unit 57C of the toll adjusting unit 57 calculates a toll to be charged for the vehicle 30 based on a tollhouse code included in the use information and a result of the vehicle type recognition of the vehicle 30 obtained by the vehicle type recognizing apparatus 108.

The toll claim processing unit 57D claims payment of a charged toll on the post-payment processing unit 92 of the host computer 90 based on the personal information (an identification number, etc.) After that, the command issuing unit 54 issues a write demand to write the toll adjustment result information, including a charged toll and payment distinction (post-payment) (refer to FIG. 29), and this adjustment result information is written in the radio card 10.

In the settling apparatus 50A and 50B, the card authentication unit 56A performs a check on an encipherment key similar to the writing apparatus 40A and 40B previously described with reference to FIG. 11. If any fraudulent, invalid or improper act such as falsification or the like has been done on the data in the radio card 10, it is possible to verify such data with the writing apparatus 40A and 40B previously described with reference to FIG. 11.

The valid term check unit 56B determines whether the term of validity of the radio card 10 has expired or not, and the negative check unit 56C performs a negative check on the radio card 10. It is possible to confirm correctness of the radio card, and further to prevent a fraudulent, invalid or improper use of the radio card 10.

The data read out from the radio card 10 and written into the settling apparatus 50A or 50B is enciphered. The deciphering unit 55 deciphers this data. The data written in the radio card 10 from the settling apparatus 50A or 50B is enciphered by the enciphering unit 59. Accordingly, it is possible to prevent information from being intercepted when the data is transmitted from the radio card 10 to the settling apparatus 50A or 50B, or from the settling apparatus 50A or 50B to the radio card 10.

The enciphering means 59 enciphers both the data and the encipherment key to be written in the radio card 10 at the same time, and transmits them to the radio card 10 so that it is possible to check the data that is an object of a write demand by the above-mentioned encipherment key check unit 18B.

In the settling apparatus 50A or 50B, the use date/time check unit 56D calculates a time required for the vehicle 30 to reach the exit toll adjusting gate 34A or 34B based on a passage time at the entrance toll adjusting gate 33A or 33B, which is included in the use information, to check whether the required time is reasonable or not. Accordingly, it is possible to verify whether any fraudulent, invalid or improper act has occurred during use of the toll road, and further to avoid a fraudulent, invalid or improper use of the toll road.

(f) Description of Settling Apparatus for Entrance/ Exit Toll Adjusting Gate

Figure 14:
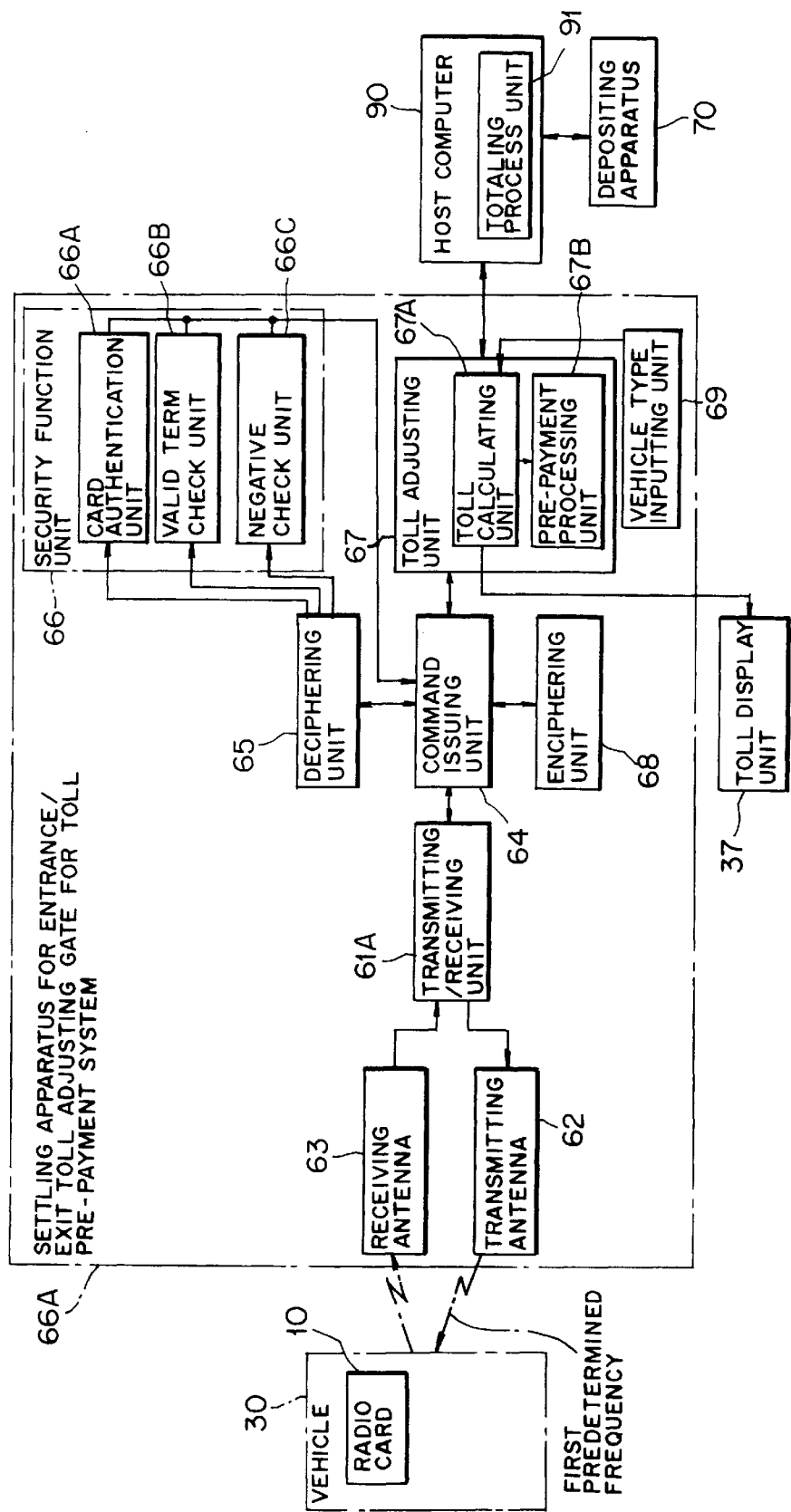
FIG. 14 is a block diagram of a settling apparatus for an entrance/exit toll adjusting gate in the toll pre-payment system according to the embodiment.
Figure 15:
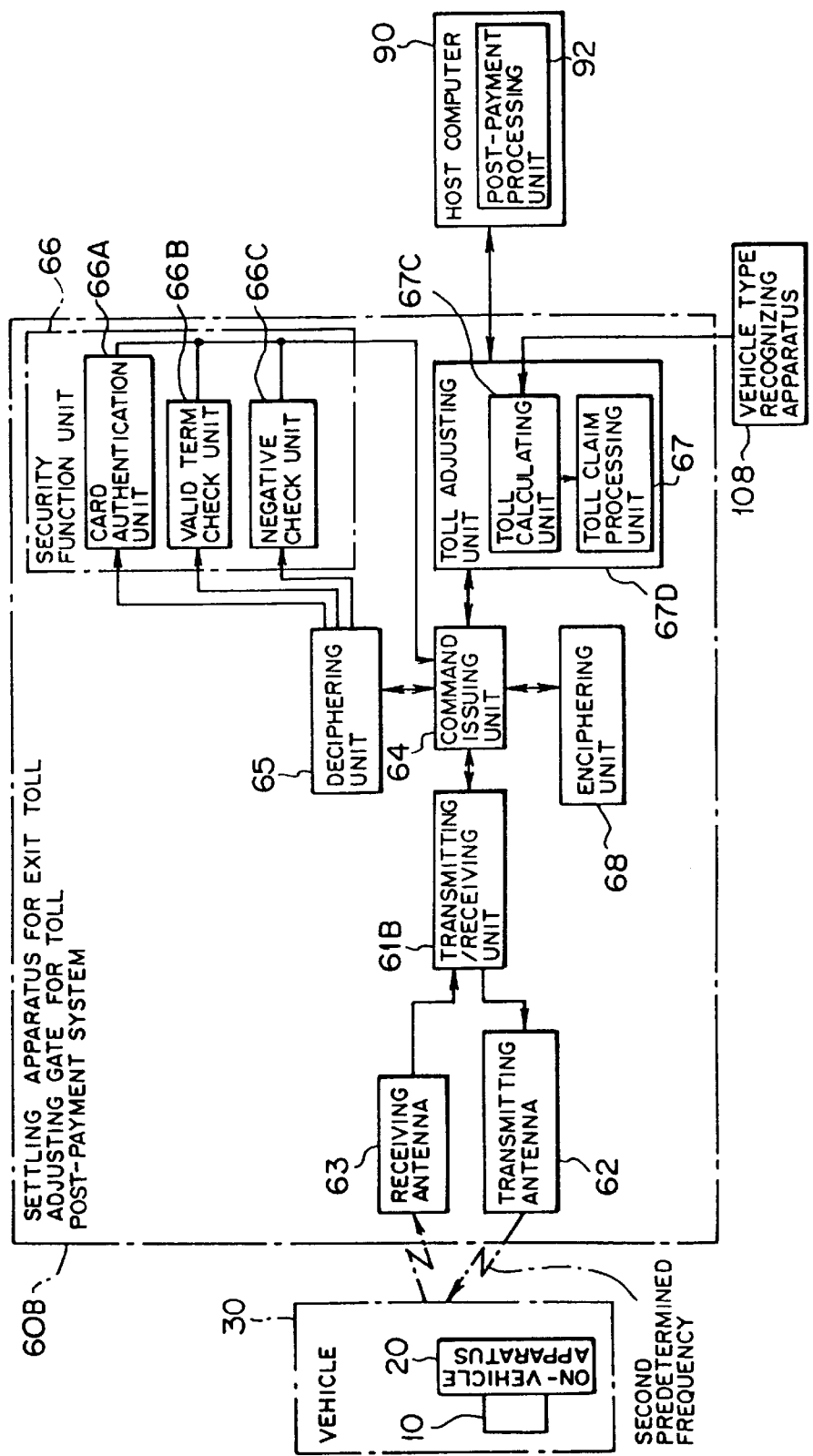
FIG. 15 is a block diagram of a settling apparatus for an entrance/exit toll adjusting gate in the toll post-payment system according to the embodiment.

Referring to FIGS. 14 and 15, a description will be made next for the structures of the settling apparatus 60A for the entrance/exit toll adjusting gate in the toll pre-payment system and the settling apparatus 60B for the entrance/exit toll adjusting gate in the toll post-payment system according to this embodiment.

The settling apparatus 60A and 60B are adapted to acquire the adjustment information from the radio card 10 in order to automatically adjust a toll for the toll road charged to a holder of the radio card 10 based on the adjustment information. The settling apparatus 60A and 60B are installed at the entrance/exit toll adjusting gates 35A and 35B, respectively, on a toll road 32 where a toll is collected irrespectively of a trip distance.

The settling apparatus 60A and 60B have structures not only similar to each other as shown in FIGS. 14 and 15 but also similar to the structures of the settling apparatus 50A and 50B which were described above with reference to FIGS. 12 and 13. More specifically, transmitting/receiving units 61A and 61B, a transmitting antenna 62, a receiving antenna 63, a command issuing unit 64, a deciphering unit 65, a security function unit 66, a toll adjusting unit 67, an enciphering unit 68, a vehicle type inputting unit 69, and a vehicle type recognizing apparatus 108 shown in FIGS. 14 and 15 correspond the transmitting/receiving units 51A and 51B, the transmitting antenna 52, the receiving antenna 53, the command issuing unit 54, the deciphering unit 55, the security function unit 56, the toll adjusting unit 57, the enciphering unit 58, and the vehicle type inputting unit 59, respectively, each of which has substantially the same function.

A difference between the settling apparatus 60A/60B and the settling apparatus 50A/50B is that the settling apparatus 60A and 60B adjust a toll charged for the vehicle 30 on the toll road 32 where a fixed toll irrespective of a trip distance is collected. The settling apparatus 60A and 60B, therefore, do not need to use information such as a tollhouse code, but only use a vehicle type information about the vehicle 30 output from the vehicle type inputting unit 69 or the vehicle type recognizing apparatus 108. In addition, a check based on a passage time at the entrance toll adjusting gate is not performed since no entrance toll adjusting gate is installed.

In consequence, the security function unit 66 does not include any corresponding function for the use date/time check unit 56D shown in FIGS. 12 and 13. The toll calculating units 67A and 67C each calculates a toll to be charged for the vehicle 30 based on the vehicle type information about the vehicle 30 output from the vehicle type inputting unit 69 or the vehicle type recognizing apparatus 108.

Excepting for the above points, the settling apparatus 60A and 60B have similar functions to those of settling apparatus 50A and 50B shown in FIGS. 12 and 13, and therefore no description of these functions is made here.

To apply the above-mentioned settling apparatus 60A of this embodiment, the vehicle 30 stops at the entrance/exit gate 35A if a toll in the toll pre-payment system is adjusted at the entrance/exit toll adjusting gate 35A on the toll road 32 where a toll irrespective of a trip distance is collected. Data is directly exchanged between the radio card 10 and the settling apparatus 60A by radio communication at the first predetermined frequency when the radio card 10 is held against the settling apparatus 60A.

Figure 25:
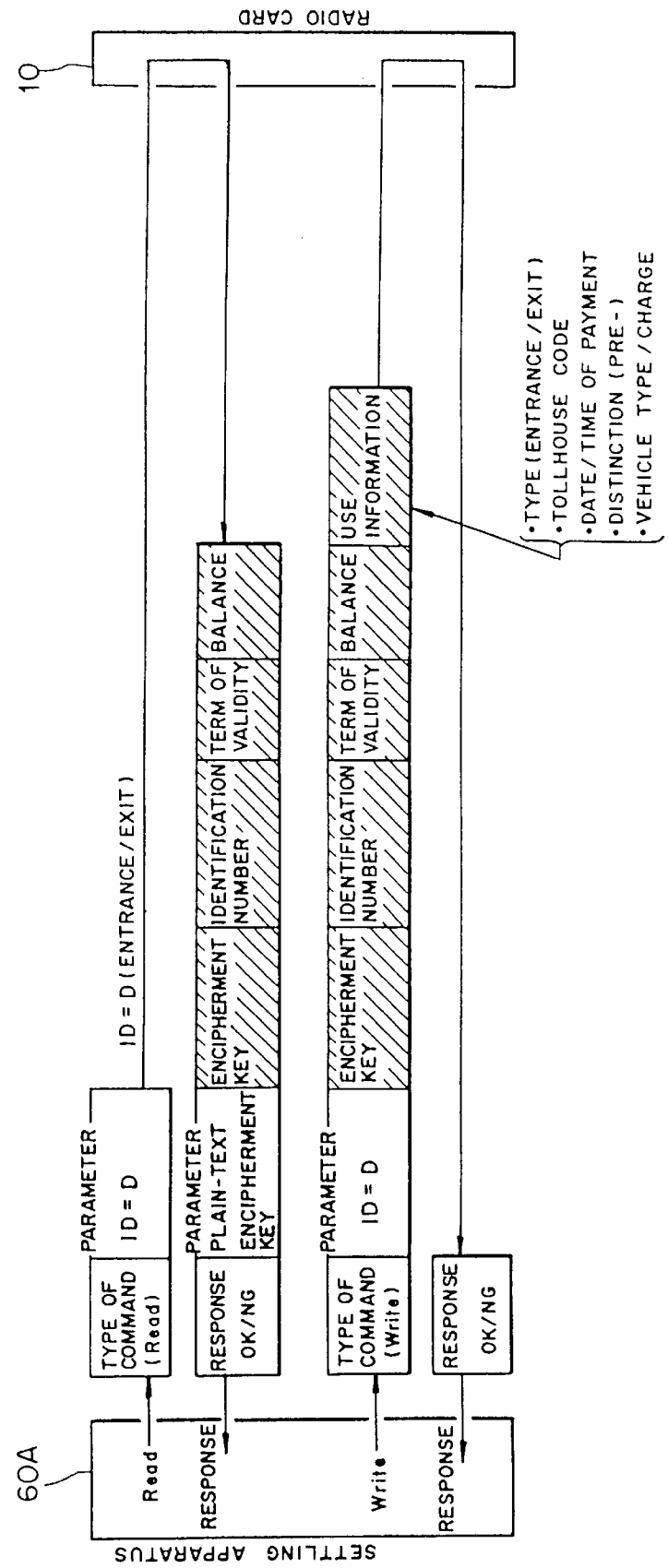
FIG. 25 is an illustration of communication data at the entrance/exit toll adjusting gate in the toll pre-payment process according to the embodiment.

On this occasion, the command issuing unit 64 issues a read demand to the radio card 10 to read the balance information from the radio card 10 (refer to FIG. 25). When the balance information is read out from the radio card 10 in response to the read demand, the toll calculating unit 67A of the toll adjusting unit 67 calculates a toll to be charged for the vehicle 30 based on a type of vehicle 30 input by an attendant through the vehicle type inputting unit 69. The charged toll is then displayed on the toll display unit 36.

The pre-payment processing unit 67B outputs a result of subtraction, which is obtained by subtracting the charged toll output from the toll calculated unit 67A from a balance included in the balance information, as a new balance. The command issuing unit 64 issues a write demand to write the toll adjustment result information, including the charged toll and payment distinction (pre-payment), and the balance information including the new balance (refer to FIG. 25), and this information is written in the radio card 10.

To use the above-mentioned settling apparatus 60B of this embodiment, the vehicle 30 passes through the entrance/exit toll adjusting gate 35A without stopping when the radio card 10 is inserted in the on-vehicle apparatus 20 if a toll in the toll post-payment system is adjusted at the entrance/exit toll adjusting gate 35B on the toll road 32 where a toll irrespective of a trip distance is collected. At that time, data is indirectly exchanged between the radio card 10 and the settling apparatus 60B via the on-vehicle apparatus 20 by radio communication at the second predetermined frequency.

Figure 32:
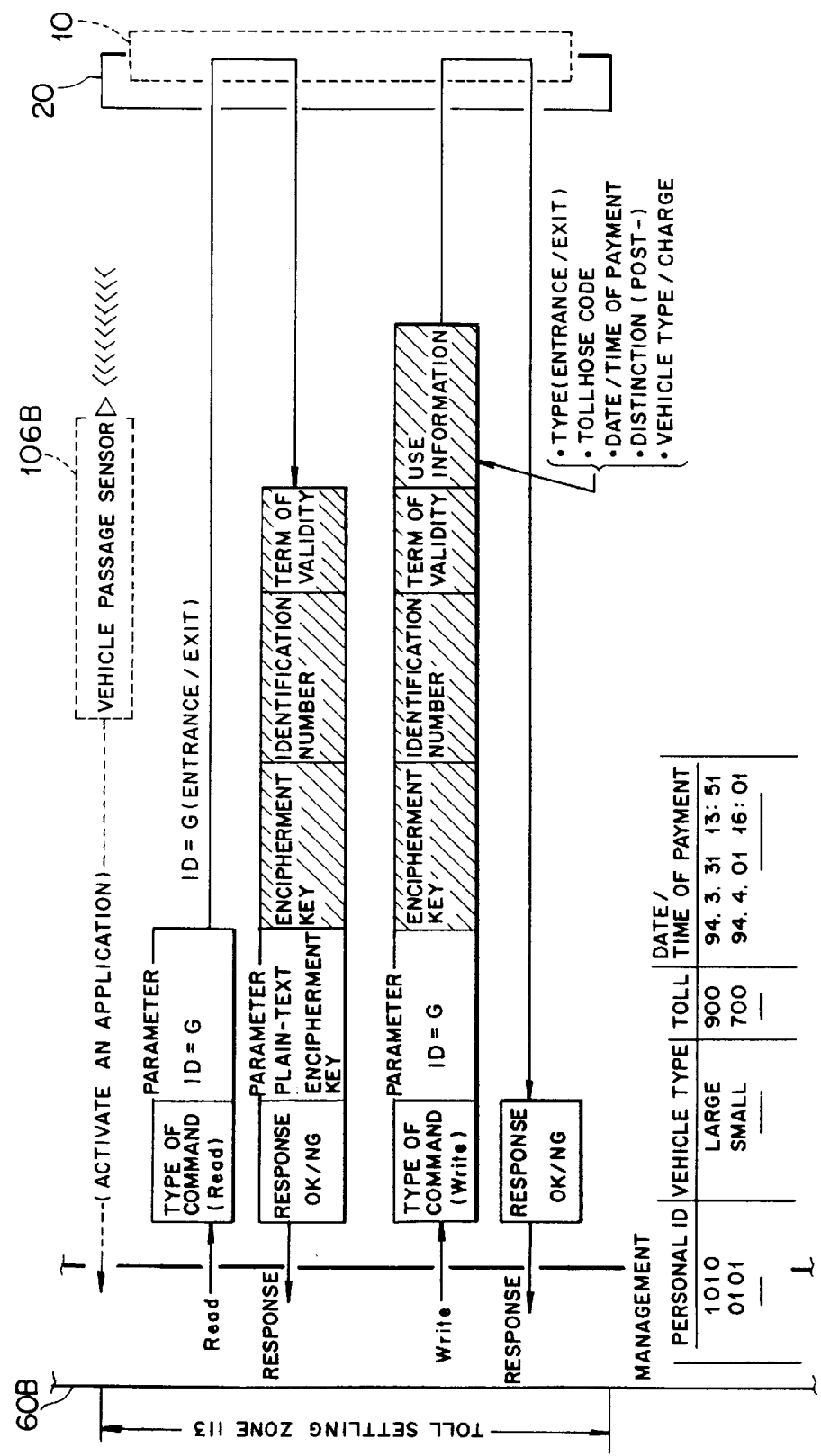
FIG. 32 is an illustration of communication data in an toll settling zone at the entrance/exit toll adjusting gate in the post-payment process according to the embodiment.
Figure 33:
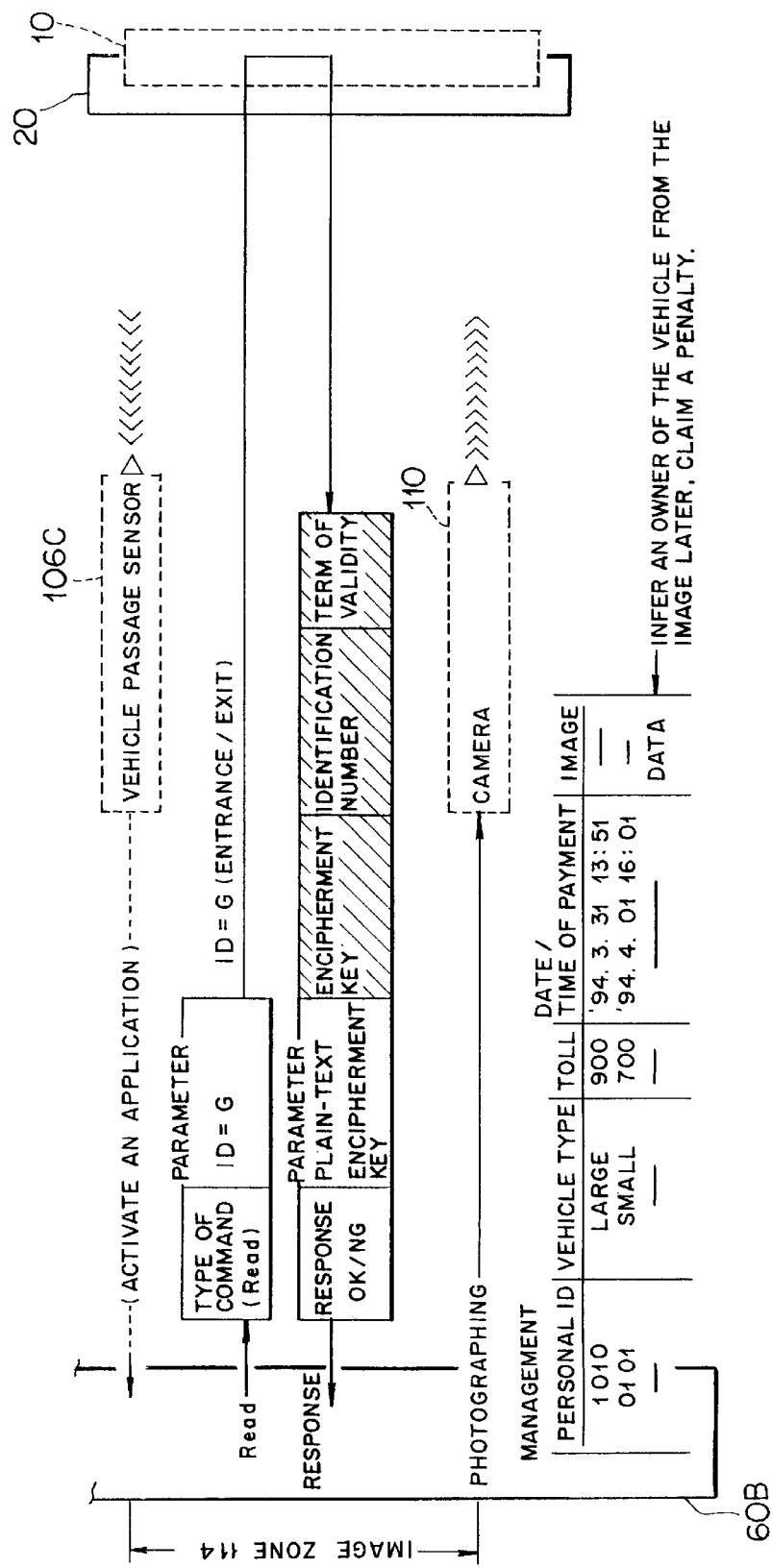
FIG. 33 is an illustration of data communication in an image zone at the entrance/exit toll adjusting gate in the toll post-payment process according to the embodiment.

On this occasion, the command issuing unit 64 issues a read demand to the radio card 10 to read the personal information (an identification number, etc.) from the radio card 10 (refer to FIG. 32), while the toll calculating unit 67C of the toll adjusting unit 67 calculates a toll to be charged for the vehicle 30 based on a result of vehicle type recognition obtained by the vehicle type recognizing apparatus 108.

Then, the toll claim processing unit 67D claims a charged toll by the post-payment processing unit 92 of the host computer 90 based on the personal information (an identification number, etc.). After that, the command issuing unit 64 issues a write demand to write the adjustment result information including the charged toll and the payment distinction (post-payment) (refer to FIG. 32), and this adjustment result information is written in the radio card 10.

In the settling apparatus 60A and 60B, the card authentication unit 66A performs a check with an encipherment key similar to the writing apparatus 40A and 40B previously described with reference to FIG. 11. If any fraudulent or invalid act such as falsification has been done on the data in the radio card 10, it is possible to verify such data.

The valid term check unit 66B determines whether a term of validity of the radio card 10 has expired or not, and in addition the negative check unit 66C performs a negative check on the radio card 10 so that it is possible to confirm correctness of the radio card 10, and to avoid a fraudulent, invalid or improper use of the radio card 10.

Data read into the settling apparatus 60A or 60B from the radio card 10 is in an enciphered state. The deciphering unit 65 decipher that data. Data written in the radio card 10 from the settling apparatus 60A or 60B has been enciphered by the enciphering unit 69. With this, it is possible to prevent information from being intercepted when data is transmitted from the radio card 10 to the settling apparatus 60A or 60B, or from the settling apparatus 60A or 60B to the radio card.

Further, an encipherment key is enciphered by the enciphering unit 69 along with data to be written into the radio card 10 at the same time, and then transmitted to the radio card 10. In consequence, it becomes possible to check data that is an object of a write demand by the above-mentioned encipherment key check unit 18B at the radio card 10.

(i) Description of Depositing Apparatus

Figure 16:
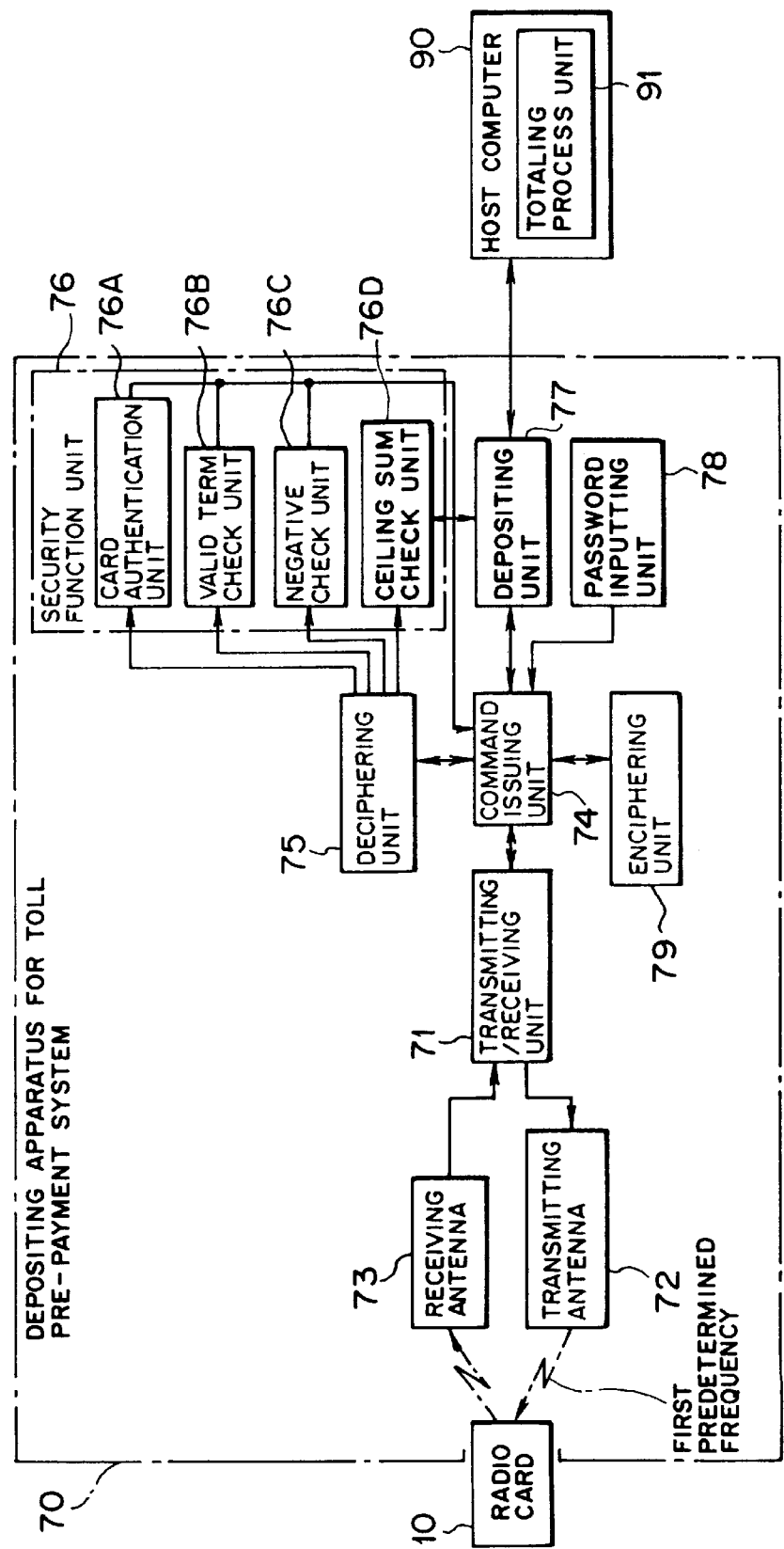
FIG. 16 is a block diagram of a depositing apparatus for the toll pre-payment system according to the embodiment.

Referring to FIG. 16, a structure of the depositing apparatus 70 for the toll pre-payment system of this embodiment will be described next. The depositing apparatus 70 is adapted to perform a depositing process for the toll pre-payment on the radio card 10. The radio card 10 retains the balance information that is an object of a charged toll, for the toll road, when the toll is automatically adjusted at the toll adjusting gate 33A, 34A or 35A in the toll pre-payment system.

In FIG. 16, reference numeral 71 denotes a transmitting/receiving unit (a communication means). The transmitting/receiving unit 61 directly exchanges information with the radio card 10 which is inserted into the depositing apparatus 70 by radio communication at the first predetermined frequency. More specifically, the transmitting/receiving unit 71 modulates transmitted data into a carrier wave at the first predetermined frequency, while supplying electric energy necessary for the transmission to a built-in transmitting antenna 72, and demodulates the carrier wave at the first predetermined frequency which is received through a built-in receiving antenna 73 to output received data (a response to a command) processable in a command issuing unit 74 to be described later.

Reference numeral 74 denotes the command issuing unit (a demand issuing means). The command issuing unit 74 issues an Open command, a Read command, a Write command and a Close command to the radio card 10 through the transmitting/receiving unit 71 similar to the command issuing units 44, 54 and 64 described hereinbefore.

In particular, the command issuing unit 74 in the depositing apparatus 70 of this embodiment issues a read demand to the radio card 10 to read an identification number, a term of validity, depositing information (a maximum amount of deposit money) and balance information (a balance, a maximum balance) retained in the storage 11 from the radio card 10 through the transmitting/receiving unit 71, or issues a write demand to the radio card 10 to write depositing information and new balance information obtained by a depositing process in a depositing unit 77 to be described later a) to read the identification number, the term of validity and the balance information from the radio card 10, or b) to write the received money information and the balance information into the radio card 10.

Reference numeral 75 denotes a deciphering unit (a deciphering means). The deciphering unit 75 deciphers various information (enciphered data) and an encipherment key (enciphered data), attached to this information which is read out from the storage 11 of the radio card 10 in response to the read demand issued from the command issuing unit 74, with a plain-text encipherment key received simultaneously.

Reference numeral 76 denotes a security function unit. The security function unit 76 has a card authentication unit (an encipherment key check means) 76A, a valid term check unit 76B, a negative check unit 76C, a ceiling sum check unit (a depositing money check means) 76D. Among them, the card authentication unit 76A, the valid term check unit 76B and the negative check unit 76C function quite similarly to the card authentication unit 46A, the valid term check unit 46B and the negative check unit 46C previously described with reference to FIG. 11, so no description thereof is made here.

The ceiling sum check unit 76D in the depositing apparatus 70 performs a check on the basis of a maximum sum and a maximum balance read out from the radio card 10 when the depositing unit 77 performs a depositing process to check a maximum sum (a limit of deposit money) depositable at a time by depositing unit 77 and a maximum sum (a limit of a balance) retainable in the radio card 10.

If the card authentication unit 76A, the valid term check unit 76B, the negative check unit 76C or the sum ceiling check unit 76D determines NG (No Good), this determination is, for example, displayed on the depositing apparatus 70 to notify a payer.

Reference numeral 77 denotes the depositing unit (a depositing means). The depositing unit 77 has a function to manage payment in cash or from a bank account in the depositing information file 11E in the storage 11 of the radio card 10 as a history and to update the balance information. The depositing unit 77 adds a sum of money currently deposited to a balance included in the balance information, which is read out from the radio card 10 in response to a read demand from the command issuing unit 74, to calculate a new balance, and outputs it.

The balance information including the new balance and the depositing information including a sum of the depositing money, a place of this deposit, a date and a time of this deposit are written in the radio card 10 in response to a write demand which is issued from the command issuing unit 74 as described hereinbefore. Whenever the depositing process is performed by the depositing unit 77, the ceiling sum check unit 76D checks deposit money. If the ceiling sum check unit 76D determines it to be NG (No Good), the depositing process is prohibited. Further, a balance which is obtained by calculation in the depositing unit 77 is transmitted to the totaling process unit 92 of the host computer, and is used for managing a total sum by the totaling process unit 92 (refer to FIG. 26).

Reference numeral 78 denotes a password inputting unit. The password inputting unit 78 is configured with, for example, a key board, similar to the password inputting unit 26 previously described with reference to FIG. 10. The password inputting unit 78 is used to input a password in order to check a depositor who is depositing money to the radio card 10 when the radio card 10 is inserted into the depositing apparatus 70.

The password input through the password input unit 78 is transmitted by the transmitting/receiving unit 71 to the radio card 10 through an antenna 72 by radio communication at the first predetermined frequency. The password check unit 18A of the radio card 10 checks the user (the person verification) of the radio card 10 (refer to FIG. 9). If the password check unit 18A determines NG (No good), this determination is notified from the radio card 10 to the depositor by, for example, displaying it on the depositing apparatus 70.

Reference numeral 79 denotes an enciphering unit (an enciphering means). The enciphering unit 79 enciphers data, to be written in the storage 11 of the radio card 10 along with an encipherment key in response to a write demand from the command issuing unit 74, with the encipherment key.

Figure 22:
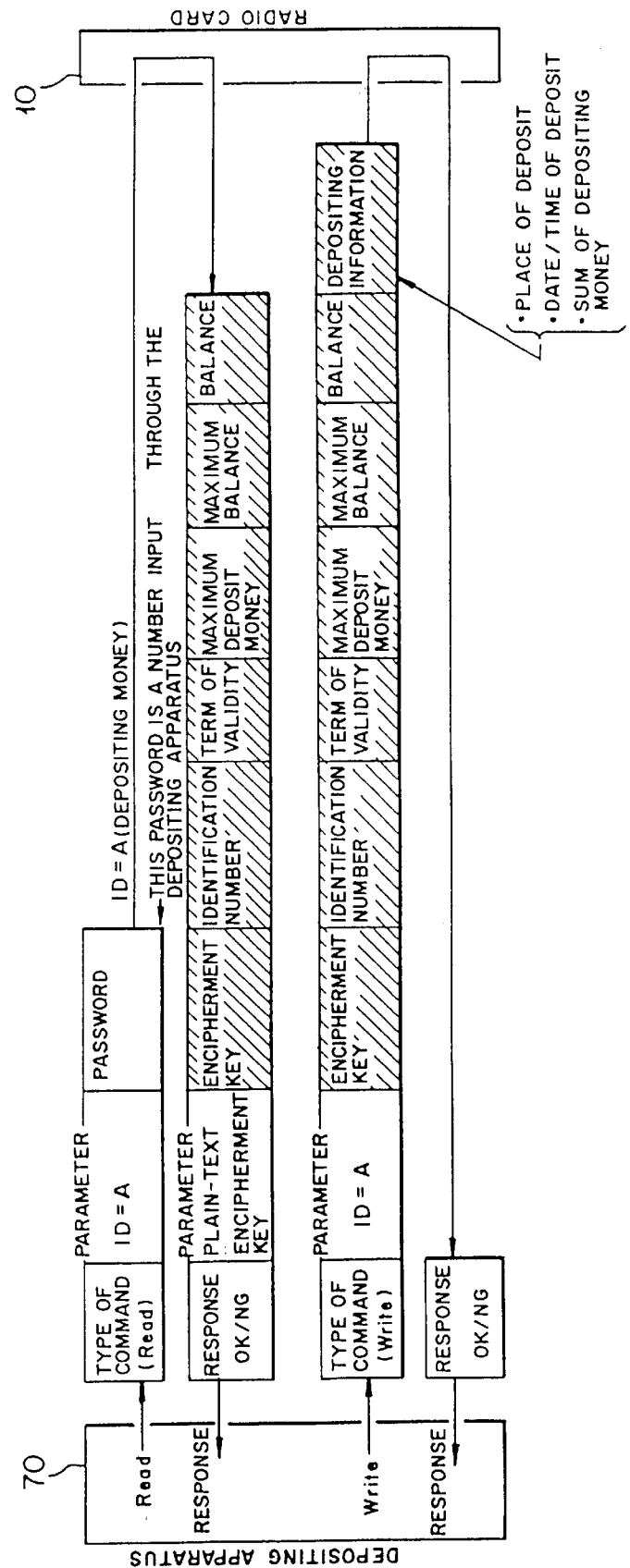
FIG. 22 is an illustration of communication data in a depositing process according to the embodiment.

When the depositing process for the toll pre-payment system is performed on the radio card 10 in the above-mentioned depositing apparatus 70 of this invention, the radio card 10 is inserted into the depositing apparatus 70 and the transmitting/receiving unit 71 directly exchanges information with the radio card 10 by radio communication at the first predetermined frequency. The command issuing unit 74 issues a read demand to read the balance information (a balance, a maximum balance) and the depositing information (a maximum amount of deposit money) from the radio card 10 (refer to FIG. 22).

When the balance information and the depositing information are read out from the radio card 10 in response to the read demand, the depositing unit 77 adds a sum of the money deposited this time to the balance supplied from the radio card 10 in order to calculate a new balance. The command issuing unit 74 then issues a write demand to the radio card 10 to write the balance information including the new balance and the depositing information including a sum of money deposited this time, place of the deposit and a date and a time of the deposit (refer to FIG. 10). This information is written in the storage 11 of the radio card 10. Thus, the depositing process for the radio card 10 is completed.

In the depositing apparatus 70, a password is input through the password inputting unit 78 of the depositing apparatus 70 upon initiating the depositing process for the radio card 10. The password is then transmitted to the radio card 10 by radio communication at the first predetermined frequency (refer to FIG. 22). The password check unit 18A checks on the depositor who is depositing to the radio card 10 (person verification). In the event of actual toll adjustment in the toll pre-payment at the toll adjusting gate 34A or 35A, the verification of the person by inputting the password is skipped so as to accelerate the adjusting process.

In the depositing apparatus 70, a check with the encipherment key by the card authentication unit 76A enables verification of data if any fraudulent act such as falsification has been done to the data in the radio card 10, similar to the above-mentioned writing apparatus 40A and 40B previously described with reference to FIG. 11.

The valid term check unit 76B determines whether the term of validity of the radio card 10 has expired or not, and the negative check unit 76C performs a negative check on the radio card 10, thereby verifying correctness of the radio card 10, and further preventing a fraudulent, invalid or improper use of the radio card.

On this occasion, data read out from the radio card 10 into the depositing apparatus 70 has been enciphered, which is deciphered by the deciphering unit 75. Data written in the radio card 10 from the depositing apparatus 70 has been enciphered by the enciphering unit 79. Accordingly, it is possible to prevent information from being intercepted when the data is transmitted from the radio card 10 to the depositing apparatus 70, or from the depositing apparatus 70 to the radio card 10.

Further, the encipherment key is enciphered by the enciphering unit 79 along with the data to be written into the radio card 10, and is transmitted to the radio card 10 so that it is possible to check the data that is an object of a write demand by the above-described encipherment key check unit 18B at the radio card 10.

Still further, the ceiling sum check unit 76D checks a maximum sum (a maximum amount of deposit money) depositable at a time and a maximum sum (a maximum balance) retainable in the radio card 10 when the depositing apparatus 70 of this embodiment performs the depositing process. Accordingly, it is possible to prevent the balance from exceeding the maximum balance as a result of the depositing process, or to restrict deposit of an excessive sum of money in the depositing process. If any fraudulent, invalid or improper act has been done, it is, therefore, possible to minimize the damage.

(i) Description of Inquiring Apparatus

Figure 17:
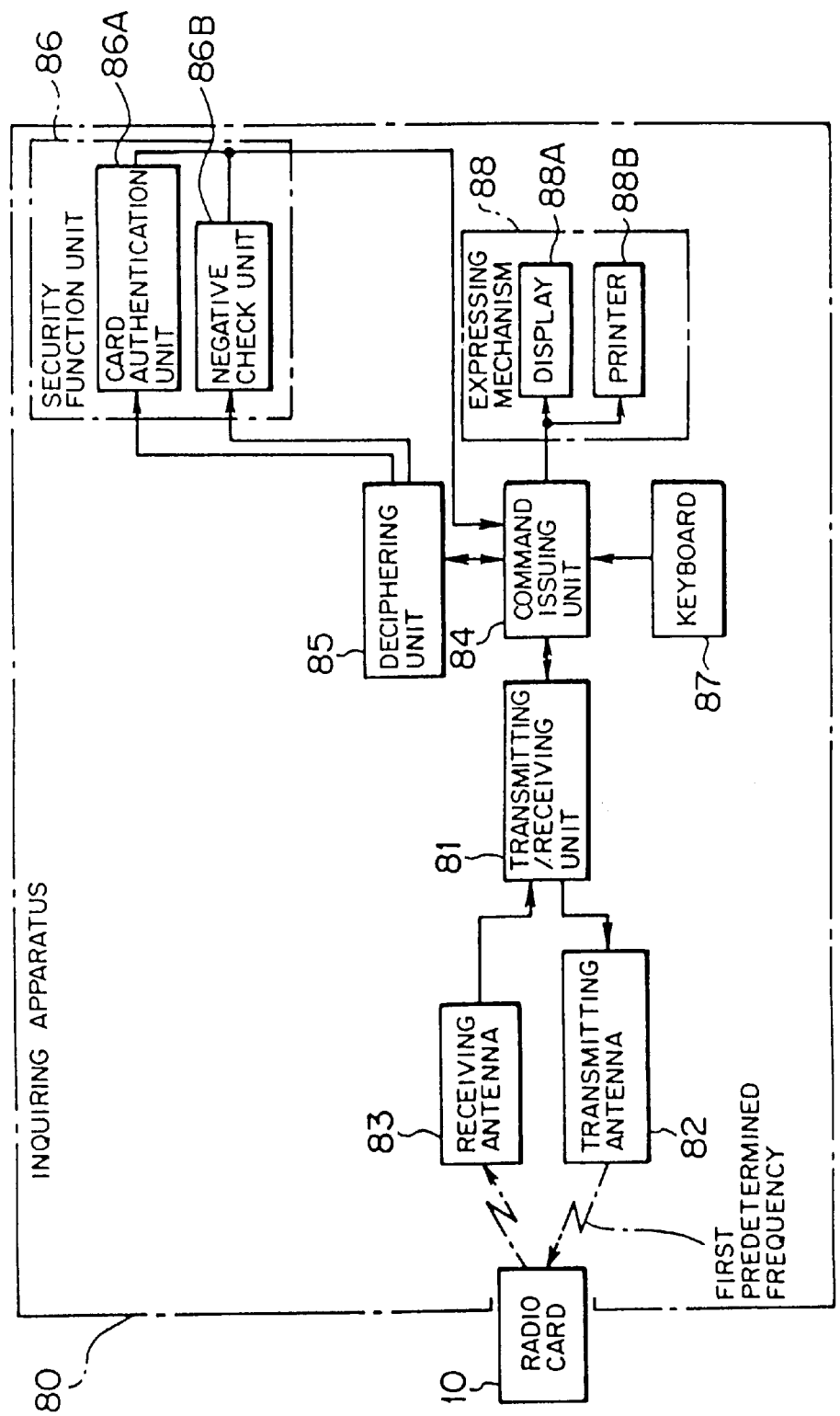
FIG. 17 is a block diagram of an inquiring apparatus according to the embodiment.

Referring now to FIG. 17, a structure of the inquiring apparatus 80 of this embodiment will be described. The inquiring apparatus 80 is adapted to acquire information stored in the radio card 10.

In FIG. 17, reference numeral 81 denotes a transmitting/receiving unit (a communicating means). The transmitting/receiving unit 81 directly exchanges information with the radio card 10, which is inserted in the inquiring apparatus 80, by radio communication at the first predetermined frequency. More specifically, The transmitting/receiving unit 81 modulates data to be transmitted into a carrier wave at the first predetermined frequency, while supplying electric energy necessary for the transmission thereof to a built-in transmitting antenna 82, and in addition demodulates a carrier wave at the first predetermined frequency which is received through a built-in receiving antenna 83 to output received data (a response of a command) processable in a command issuing unit 84 to be described later, similar to the transmitting/receiving unit 71 previously described.

Reference numeral 84 denotes the command issuing unit (a demand issuing means). The command issuing unit 84 issues an Open command, a Read command, a Write command and a Close command to the radio card 10 through the transmitting/receiving unit 81, similar to the command issuing unit 44, 54, 64 or 74 previously described.

Particularly, the command issuing unit 84 in the inquiring apparatus 80 of this embodiment has a function to issue a read command to read information (the balance information, the use information, the depositing money information, etc.) designated by an inquirer through the keyboard 87 provided on the inquiring apparatus 80 and to read an identification number from the radio card 10 via the transmitting/receiving unit 81.

Reference numeral 85 denotes a deciphering unit (a deciphering means). The deciphering unit 85 deciphers the designated information (enciphered data), which is read out from the storage 11 of the radio card 10 in response to the read demand from the command issuing unit 84, and an encipherment key (enciphered data), which is attached to this data, with a plain-text encipherment key received concurrently.

Reference numeral 86 denotes a security function unit. The security function unit 86 has a card authentication unit (an encipherment key check means) 86A, and a negative check unit 86B. The card authentication unit 86A and the negative check unit 86B function in quite the same manner as the card authentication unit 46A and the negative check unit 46C previously described with reference to FIG. 11, so no description thereof is made here.

If the card authentication unit 86A or the negative check unit 86B determines NG (No Good), this determination is notified to the inquirer by, for example, displaying it on the inquiring apparatus 80 (on a display 88A to be described later).

Reference numeral 88 denotes an expressing mechanism (an outputting means). The expressing mechanism 88 is adapted to clearly output the information that is designated through the keyboard 87, which is transmitted from the radio card 10 in response to the read demand from the command issuing unit 81, and received by the transmitting/receiving unit 81. In this embodiment, the expressing mechanism 88 is configured with the display 88A for displaying the designated information thereon and a printer 88B for printing the designated information onto a predetermined paper. Print-out by the printer 88B is selectively instructed through operation of the keyboard 87.

In order to obtain information stored in the radio card 10 using the above-mentioned inquiring apparatus 80 of this embodiment, the inquirer inserts the radio card 10 into the inquiring apparatus 80, and then designates information that the inquirer wants to obtain through the keyboard 87. The transmitting/receiving unit 81 directly exchanges information with the radio card by radio communication at the first predetermined frequency. The command issuing unit 84 issues a read command to the radio card 10 to read the designated information from the radio card 10.

When the designated information (information that is an object of the inquiry) is read out from the radio card 10 in response to the read demand, the designated information is displayed on the display 88A of the expressing mechanism 88. The designated information can be printed out by the printer 88B (by operating the keyboard 87) when desired.

FIGS. 34 through 36 show examples of output of the designated information in the expressing mechanism 88. In FIG. 34, there is shown an example of an output when inquiry of all information is designated where the personal information (a name, an address and a telephone number), histories of the balance and the depositing information and a history of the use information are displayed on the display 88 or printed out by the printer 88B. FIG. 35 shows an example of output when a payment inquiry is designated where the personal information (a name, an address and a telephone number) and histories of the balance and use information are displayed on the display 88A or printed out by the printer 88B. FIG. 36 shows an example of output when a depositing money inquiry is designated where the personal information (a name, an address and a telephone number) and histories of the balance and the depositing information are displayed on the display 88A or printed out by the printer 88B.

Thus, the expressing mechanism 88 can clearly output all of or part of various information and history thereof stored in the storage 11 of the radio card 10. In consequence, it is possible to understand and confirm the information in the storage 11 of the radio card 10 at any time so that the holder can manage usage thereof. This leads to an improvement of service to the holder of the radio card 10.

In the inquiring apparatus 80, the card authentication unit 86A checks with an encipherment key similar to the writing apparatus 40A and 40B previously described with FIG. 11 so that, if any fraudulent, invalid or improper act has occurred to data in the radio card 10, such data can be verified. The negative check unit 86B performs a negative check on the radio card 10 to confirm correctness of the radio card 10. This is effective to avoid fraudulent, invalid or improper use of the radio card 10.

Further, data read by the inquiring apparatus 80 from the radio card 10 has been enciphered, which is deciphered by the deciphering unit 85 so that it is possible to prevent information from being intercepted when data is transmitted from the radio card 10 to the inquiring apparatus 80.

Incidentally, it is alternatively possible that, in the inquiring apparatus 80, a password is input through the keyboard of the inquiring apparatus 80 during an inquiring process to the radio card 10, the password is transmitted to the radio card 10 by radio communication at the first predetermined frequency, then the password check unit 18A of the radio card 10 checks the depositor (the person verification) of the radio card 10.

(k) Description of Toll Adjusting Gate in Toll Post-Payment System

Figure 18:
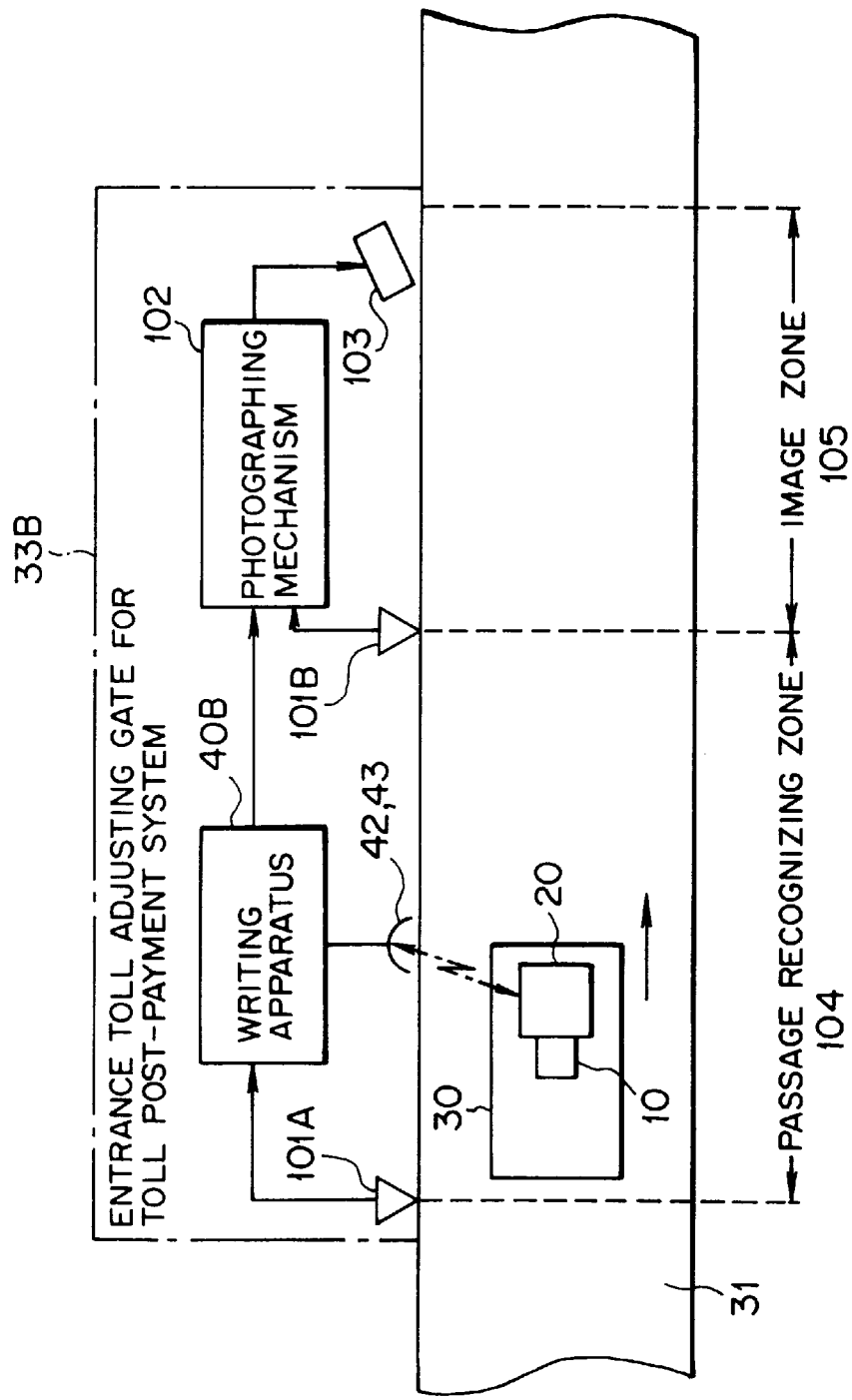
FIG. 18 is a block diagram of an entrance toll adjusting gate in the toll post-payment system according to the embodiment.
Figure 19:
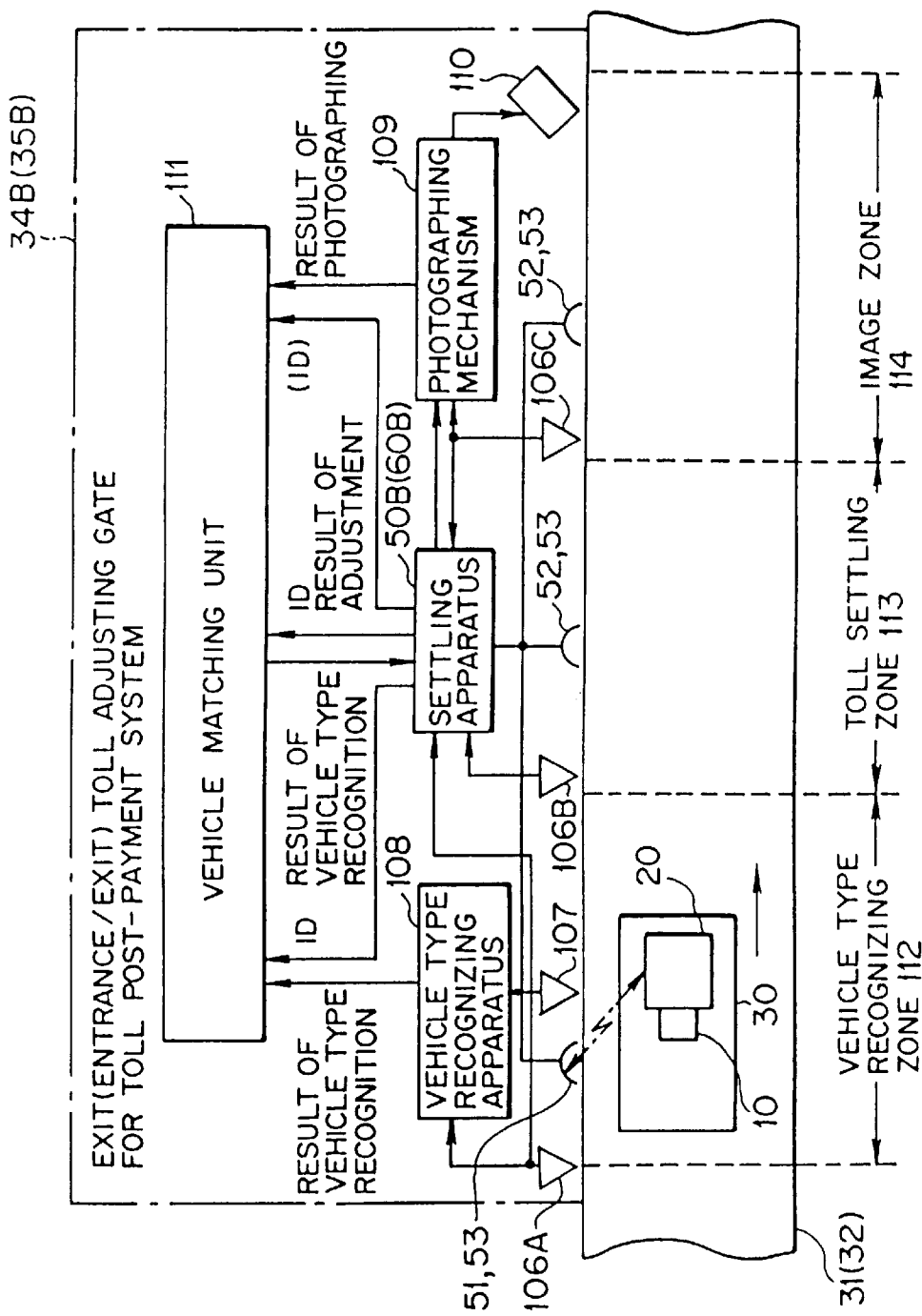
FIG. 19 is a block diagram of an exit toll adjusting gate or an entrance/exit toll adjusting gate in the toll post-payment system according to the embodiment.

Referring now to FIGS. 18 and 19, structures of the toll adjusting gates 33B, 34B and 35B in the toll post-payment system according to this embodiment will be described.

In order to adjust a toll at the toll adjusting gates 33B, 34B and 35B employing the toll post-payment system without requiring the vehicle 30 to stop thereat, it is necessary to automatically recognize a type of vehicle 30 (e.g., the vehicle 30 stops at the toll adjusting gate 34A or 35A and an attendant recognizes a type of the vehicle 30 in the toll pre-payment system), and to automatically perform an adjusting process by the settling apparatus 50B or 60B while a result of the recognition is correlated to a specific vehicle 30. When the toll adjusting gates 33B, 34B and 35B are unmanned and the toll adjusting process is performed without the vehicle 30 stopping thereat, there are no possible measures to prevent a fraudulent, invalid or improper act by a vehicle passing through.

According to this embodiment, the entrance toll adjusting gate 33B in the toll post-payment system has a structure shown in FIG. 18, and the exit toll adjusting gate 34B in the toll post-payment system or the exit toll adjusting gate 35B in the toll post-payment system has a structure shown in FIG. 19.

As shown in FIG. 18, the entrance toll adjusting gate 33B in the toll post-payment system is divided into two zones, that is, a passage recognizing zone 104 and an image zone 105. In the passage recognizing zone 104, the writing apparatus 40B writes the use information including unique information (tollhouse code, etc.) about the entrance toll adjusting gate 33B into the radio card 10 on the vehicle 30 passing through the entrance toll adjusting gate 33B by radio communication at the second predetermined frequency. In the image zone 105, a camera (a photographing apparatus) takes an image of a vehicle acting fraudulently, invalidly or improperly.

In each of the zones 104 and 105, a vehicle passage sensors 101A and 101B, for detecting passage of the vehicle 30, are provided to carry out a process in each of the zones 104 and 105 if the sensors 101A and 101B detect passage of the vehicle 30.

More specifically, when the vehicle passage sensor 101A detects passage of the vehicle 30 in the passage recognizing zone 104, the writing apparatus 40B is activated to perform a writing process on the radio card 10.

If the security function unit 46 determines it to be NG (No Good) in the event of the writing process, or if the writing apparatus 40B and the vehicle 30 could not communicate normally with each other, the vehicle 30 is regarded as an illegal, improper or invalid vehicle. A photographing mechanism 102 is activated to photograph a license plate of the vehicle 30 by the camera 103 when the vehicle passage sensor 101B detects passage of the vehicle 30.

On the other hand, the exit toll adjusting gate 34B in the toll post-payment system or the exit toll adjusting gate 35B in the toll post-payment system is divided into three zones, a vehicle type recognizing zone 112, toll settling zone 113 and an image zone 114. In the vehicle type recognizing zone 112, a vehicle type recognizing apparatus 108 recognizes a type of vehicle 30. In the toll settling zone 113, the settling apparatus 50B or 60B automatically adjusts a toll. In the image zone 114, a camera (a photographing apparatus) 110 takes a photograph of a vehicle which acts fraudulently, invalidly or improperly.

In each of the zones 112, 113 and 114, there is provided a vehicle passage sensor 106A, 106B or 106C for detecting passage of the vehicle 30. If each of the sensors 106A, 106B and 106C detects passage of the vehicle 30, a process is performed in each of the zones 112 through 114.

More specifically, when the vehicle passage sensor 106A detects passage of the vehicle 30 in the vehicle type recognizing zone 112, the personal information (ID) stored in the radio card 10 of the vehicle 30 is received through the on-vehicle apparatus 20 using a communication function of the settling apparatus 50B or 60B by radio communication at the second predetermined frequency. The vehicle type recognizing apparatus 108 is activated concurrently to recognize a type of vehicle 30 on the basis of detected information output from a vehicle type detecting sensor 107.

According to this embodiment, the on-vehicle apparatus 20 does not retain information about a type of vehicle 30. Thus, it is necessary to measure (i.e., a vehicle length measurement, a vehicle weight measurement, a wheel distance measurement, a license number read, etc.) from the outside to determine a type of vehicle 30. The vehicle type detecting sensor 107 detects, for example, a length of the vehicle 30, and sends it to the vehicle type recognizing apparatus 108. The vehicle type recognizing apparatus 108 recognizes a type of vehicle 30 based on the length.

When the vehicle passage sensor 106B detects passage of the vehicle 30 in the toll settling apparatus 113, the settling apparatus 50B or 60B is activated to receive the personal information (ID) and the adjustment information through the on-vehicle apparatus 20 from the radio card 10 on the vehicle 30 by radio communication at the second predetermined frequency. The settling apparatus 50B or 60B automatically adjusts a toll to be charged for the vehicle 30 based on a result of the recognition by the vehicle type recognizing apparatus 108 and the adjustment information which is received from the radio card 10 on the vehicle 30.

If the security function unit 56 or 66 in the settling apparatus 50B or 60B determines it to be NG (No Good), or if the settling apparatus 50B or 60B and the vehicle 30 cannot communicate normally with each other, the vehicle 30 is regarded as an improper or invalid vehicle. Then, the vehicle passage sensor 106C detects passage of the vehicle 30 in the image zone 114, a photographing mechanism 109 is activated to photograph a license plate or the like of the vehicle 30 by a camera 110. In this event, the personal information (ID) is received from the radio card 10 of the vehicle 30 through the on-vehicle apparatus 20 using a communication function of the settling apparatus 50B or 60B by radio communication at the second predetermined frequency.

According to this embodiment, the personal information received by each of the zones 112 through 114 and a result of the process (a result of vehicle type recognition, a result of adjustment and a result of photographing) in each of the zones 112 through 114 are input as a pair into a vehicle matching unit 111. The vehicle matching unit 111 manages a result of the process in each of the zones 112 through 114 correlated to a specific vehicle 30.

When receiving information with an ID, the vehicle matching unit 111 stores various information such as a type of vehicle 30, a name of the tollhouse, a passage time, a toll, an image, etc. based on the information. If calculation of the toll is normal, the vehicle matching unit 111 outputs the ID, the type of vehicle, the name of the tollhouse and the toll to the host computer 90, and deletes information relating to this ID from the settling apparatus 50B or 60B. If calculation of the toll is abnormal (i.e., if a toll cannot be calculated, if a use is fraudulent, invalid or improper, etc.), the vehicle matching unit 111 outputs an ID and an image of the vehicle corresponding to the ID (a result of photographing by the camera 110), or only the image to an image analyzing system (the host computer 90). The image analyzing system analyzes a license of an improper or invalid vehicle from a result of the photograph, and takes measures to, for example, claim a toll from the owner of that vehicle.

At the above-described entrance toll adjusting gate 33B in the toll post-payment system according to this embodiment, the writing apparatus 40B writes the unique information about the entrance toll adjusting gate 33B into the radio card 10 of the vehicle 30 passing through the passage recognizing zone 104 via the on-vehicle apparatus 20 by radio communication at the second predetermined frequency.

On this occasion, if the security function unit 46 of the writing apparatus 40B determines it to be NG (No Good), or if the writing apparatus 40B and the vehicle 30 cannot communicate normally with each other, the camera 103 takes a photograph of a license of the vehicle 30 when the vehicle 30 passes through the image zone 105.

In above-described exit toll adjusting gate 34B in the toll post-payment system or the entrance/exit toll adjusting gate 35B in the toll post-payment system of this embodiment, the vehicle matching unit 111 manages a result of the process obtained in each of the zones 112 through 114 on the basis of an ID, and in addition the vehicle type recognizing apparatus 108 recognizes a type of vehicle 30 passing through the vehicle type recognizing zone 112 on the basis of a result of the detection by the vehicle type detecting sensor 107 in the above condition.

When the vehicle 30 passes through the toll settling zone 113, a toll to be charged for the vehicle 30 is automatically adjusted on the basis of a result of the vehicle type recognition of the corresponding vehicle 30 by the vehicle type recognizing apparatus 108 and the adjustment information received from the radio card 10 on the vehicle 30.

If the security function unit 56 or 66 of the settling apparatus 50B or 60B determines it to be NG (No Good) during the writing process, or if the settling apparatus 50B or 60B and the vehicle 30 cannot communicate normally with each other, the camera 110 takes a photograph of a license plate or the like of the vehicle 30 when the vehicle 30 passes through the image zone 114.

As above, in order to write the unique information (a tollhouse code, etc.) of the entrance toll adjusting gate 33B into the radio card 10, it is sufficient for the vehicle 30 to simply pass through the passage recognizing zone 104 without stopping at the entrance toll adjusting gate 33B. Similarly, in order to automatically adjust a toll in the toll post-payment system, it is sufficient for the vehicle 30 to simply pass through the three zones 112 through 114 without stopping at the exit toll adjusting gate 34B or the entrance/exit toll adjusting gate 35B.

The vehicle 30 doing any fraudulent, improper or invalid act, such as nonpossession of the radio card 10 or the like, is photographed by the photographing apparatus in the image zone during the writing process at the entrance toll adjusting gate 33B or during the adjusting process at the exit toll adjusting gate 34B or the entrance/exit toll adjusting gate 35B. It is, therefore, possible to specify an improper or invalid vehicle from a result of the photographing after that, and to claim a toll or a forfeit to cope with an improper or invalid vehicle doing a fraudulent, invalid or improper act such as nonpayment for the toll which is likely to happen in automatic toll adjustment requiring no stopping of the vehicle 30.

When the vehicle passage sensors 101A, 101B and 106A through 106C detect passage of the vehicle 30, a process in each of the zones 104, 105 and 112 through 114 is automatically performed. In consequence, it is possible to accomplish an unmanned entrance toll adjusting gate 33B, entrance/exit toll adjusting gate 34B and entrance/exit toll adjusting gate 35B, and to realize labor saving in the adjusting process.

In each of the zones 112 through 114 at the exit toll adjusting gate 34B or the entrance/exit toll adjusting gate 35B, an identification number is obtained from the radio card 10 on the vehicle 30 in each of the zones 112 through 114 so that a result of the vehicle type recognition, a result of the adjustment, and a result of the photographing which is obtained in each of the zones 112 through 114 can be correlated to a specific vehicle 30 on the basis of that identification number (ID). If a plurality of vehicles successively pass through the toll adjusting gate 34B or 35B within a short period of time, it is possible to match the results of the processes, each obtained in each of the zones 112 through 114, to manage them with certainty.

A type of vehicle 30 is automatically recognized in the vehicle type recognizing zone 112 at the exit toll adjusting gate 34B or the entrance/exit toll adjusting gate 35B of this embodiment, so there is no need to retain the vehicle type information at the on-vehicle apparatus 20. There has been proposed a system in which the vehicle type information is retained at the on-vehicle apparatus 20. In such a case, falsification of data (for example, the on-vehicle apparatus for a small sized vehicle is mounted on a large sized vehicle) is easy. However, a feature of this embodiment is that the vehicle type recognizing apparatus 108 at the exit toll adjusting gate 34B or the entrance/exit toll adjusting gate 35B recognizes a type of vehicle 30 passing therethrough and is effective to positively avoid a fraudulent, invalid or improper use such as data falsification.

(l) Description of Operation Upon Selecting the Toll Pre-Payment System of This Embodiment Referring now to FIGS. 22 through 25, data to be exchanged in the system or between the apparatuses having the above structures for the toll pre-payment system will be described by way of a practical example.

To use the toll pre-payment system, it is necessary to pay money to the radio card 10 in advance through the depositing apparatus 70. When the money is deposited by inserting the radio card 10 into the depositing apparatus 70, a read demand (a Read command), ID=A showing that this demand is issued from the depositing apparatus 70, and a password input by the depositor through the depositing apparatus 70 are directly transmitted from the depositing apparatus 70 to the radio card 10 by radio communication at the first predetermined frequency.

If the radio card 10 determines that a result of a check on the password is positive (OK), the radio card 10 directly transmits a plain-text encipherment key, an enciphered key, an identification number, a term of validity, a maximum amount of deposit money, a maximum balance and a balance together with a signal of a positive response (or a negative response if the check on the password results is negative) (NG) to the depositing apparatus 70 by radio communication at the first predetermined frequency. Meanwhile, shaded portions in the drawings referred to hereinafter indicate enciphered data.

After the depositing process in the depositing apparatus 70, the depositing apparatus 70 directly transmits a write demand (a Write command) together with ID=A showing that this demand is issued from the depositing apparatus 70, an enciphered encipherment key, an identification number, a term of validity, a maximum amount of deposit money, a maximum balance, a newly updated balance, and the depositing money information amount this deposit time (a place of deposit, a date and a time of the deposit and a sum of the deposit money) to the radio card 10 by radio communication at the first predetermined frequency. After this information has been written in the radio card 10, a response (OK/NG) is transmitted to the depositing apparatus 70.

When a user, carrying the radio card 10 which is subjected to the above depositing process, passes through the entrance toll adjusting gate 33A in the toll pre-payment system on the toll road 31 where a toll according to a trip distance is collected, the user stops the vehicle 30 at the entrance toll adjusting gate 33A, and directly holds the radio card 10 against the writing apparatus 40A at the entrance toll adjusting gate 33A. The writing apparatus 40A, responsive to this action, directly transmits a read demand (a Read command) and ID=B showing that this demand is issued from the writing apparatus 40A to the radio card 10 by radio communication at the first predetermined frequency, as shown in FIG. 23.

The radio card 10, responsive to the read demand, directly transmits a plain-text encipherment key, an enciphered encipherment key, an identification number and a term of validity to the writing apparatus 40A along with the positive (OK) response signal by radio communication at the first predetermined frequency.

If various checks result in positive, the writing apparatus 40A directly transmits ID=B representing that this demand is from the writing apparatus 40A, an enciphered encipherment key, an identification number, a term of validity, the use information (a type (entrance), a tollhouse code, a date and a time of the passage) along with a write demand (a Write command) to the radio card 10 by radio communication at the first predetermined frequency. After this information has been written into the radio card 10, a response (OK/NG) is transmitted to the writing apparatus 40A.

When passing through the exit toll adjusting gate 34A in the toll pre-payment system on the toll road 31 after passage through the entrance toll adjusting gate 34A, the user stops the vehicle 30 at the exit toll adjusting gate 34A, and holds the radio card 10 directly against the settling apparatus 50A at the exit toll adjusting gate 34A. As shown in FIG. 24, the settling apparatus 50A directly transmits a read demand (a Read command) and ID=C showing that the read demand (a Read command) is issued from the settling apparatus 50A to the radio card 10 by radio communication at the first predetermined frequency.

In response to the read demand, the radio card 10 directly transmits a plain-text encipherment key, an enciphered key, an identification number, a term of validity, a balance and the use information, (type (entrance), a tollhouse code and a data and time of the passage) together with a positive response to the settling apparatus 50A by radio communication at the first predetermined frequency.

If the various checks result in positive, the settling apparatus 50A directly transmits a write demand (a Write command), ID=C showing that this demand is issued from the settling apparatus 50A, an enciphered encipherment key, an identification number, a term of validity, a newly updated balance, and the use information (type (exit), a tollhouse code, a date and time of payment, distinction of the payment (pre-payment), a vehicle type/charge) to the radio card 10 by radio communication at the first predetermined frequency. After this information is written in the radio card 10, a response (OK/NG) is transmitted to the settling apparatus 50A.

When the user with the radio card 10, which is subjected to the depositing process, passes through the entrance/exit toll adjusting gate 35A in the toll pre-payment system on the toll road 32 where a toll irrespective of a trip distance is collected, the user stops the vehicle 30 at the entrance/exit toll adjusting gate 35A, and holds the radio card directly toward the settling apparatus 60A at the entrance/exit toll adjusting gate 35A. In response to this action, the settling apparatus 60A, as shown in FIG. 25, directly transmits a read demand (a Read command) and ID=D showing that this demand is issued from the settling apparatus 60A by radio communication at the first predetermined frequency.

In response to the read demand, the radio card 10 directly transmits a plain-text encipherment key, an enciphered encipherment key, an identification number, a term of validity and a balance together with a positive response to the settling apparatus 60A by radio communication at the first predetermined frequency.

If the various checks result in positive, the settling apparatus 60A directly transmits a write demand (a Write command), ID=D showing that this demand is issued from the settling apparatus 60A, an enciphered encipherment key, an identification number, a term of validity, a newly updated balance and the use information (type (entrance/exit), a tollhouse code, a date and time of payment, distinction of the payment (pre-payment) and a vehicle type/charge) to the radio card 10 by radio communication at the first predetermined frequency. After this information has been written in the radio card, a response (OK/NG) is transmitted to the settling apparatus 60A.

(m) Description of Operation Upon Selecting the Toll Post-Payment System according to This Embodiment Referring now to FIGS. 27 through 33, communicated data to be exchanged between the apparatuses when the toll post-payment system is selected, using the system and the apparatuses having the above-described structures, will be described by way of a practical example.

When the user, who selected the toll post-payment system, travels in the vehicle 30 on the toll road 31 where a toll according to a trip distance is collected, the user passes through the entrance toll adjusting gate 33B in the toll post-payment system in a condition that the radio card 10 is inserted in the on-vehicle apparatus 20. On this occasion, the vehicle passage sensor 101A detects passage of the vehicle 30 in the passage recognizing zone 104, as shown in FIG. 27, an application is activated, and the writing apparatus 40B transmits a read demand (a Read command) and ID=E showing that this demand is issued from the writing apparatus 40B to the radio card 10 via the on-vehicle apparatus 20 by radio communication at the second predetermined frequency.

In response to the read command, the radio card 10 transmits a plain-text encipherment key, an enciphered encipherment key, an identification number, a term of validity together with a signal of a positive response to the writing apparatus 40B via the on-vehicle apparatus 20 by radio communication at the second predetermined frequency.

If the various checks result in positive, the writing apparatus 40B transmits a write demand (a Write command), ID=E showing that this demand is issued from the writing apparatus 40B, an enciphered encipherment key, an identification number, a term of validity and the use information (type (entrance), a tollhouse code and a date and time of the passage) to the radio card 10 via the on-vehicle apparatus 20 by radio communication at the second predetermined frequency. After this information has been written in the radio card 10, a response (OK/NG) is transmitted to the writing apparatus 40B, and in addition a personal ID and a date/time of the passage of this vehicle 30 are managed on the side of the settling apparatus 40B.

Figure 28:
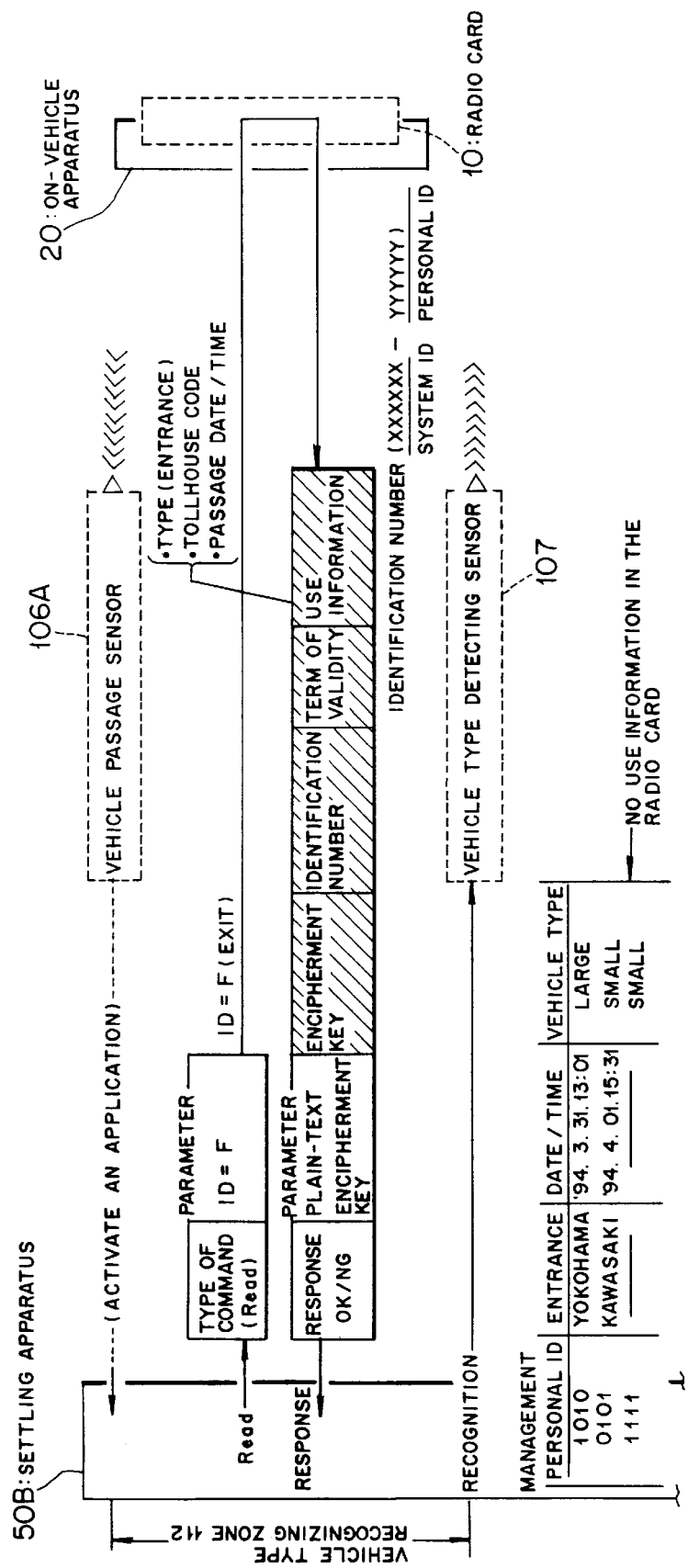
FIG. 28 is an illustration of communication data in a vehicle type recognizing zone at the exit toll adjusting gate in a toll post-payment process according to the embodiment.

When the user passes through the exit toll adjusting gate 34B in the toll pre-payment system on the toll road 31 after passing through the entrance toll adjusting gate 34B, the vehicle passage sensor 106A, as shown in FIG. 28, detects passage of the vehicle 30 in the vehicle type recognizing zone 112, an application is activated, and the settling apparatus 50B transmits a read demand (a Read command) and ID=F showing that this demand is issued from the settling apparatus 50B to the radio card 10 via the on-vehicle 20 by radio communication at the second predetermined frequency.

In response to this read demand, the radio card 10 transmits a plain-text encipherment key, an enciphered encipherment key, an identification number, a term of validity and the use information (a type (entrance), a tollhouse code, a date and time of the passage) together with a signal of a positive response to the settling apparatus 50B via the on-vehicle apparatus 20 by radio communication at the second predetermined frequency. When the vehicle type detecting sensor 107 and the vehicle type recognizing apparatus 108 recognize a type of vehicle 30, the vehicle matching unit 111 manages a result of the recognition and a personal ID from the radio card as a pair. In this vehicle type recognizing zone 112, no write process on the radio card 10 is performed.

When the vehicle passage sensor 106B detects passage of the vehicle 30 in the toll settling zone 113, an application is activated, and the settling apparatus 50B transmits a read demand (a Read command) and ID=F showing that this demand is issued from the settling apparatus 50B to the radio card 10 via the on-vehicle apparatus 20 by radio communication at the second predetermined frequency.

In response to this read demand, the radio card 10 transmits a plain-text encipherment key, an enciphered encipherment key, an identification number, a term of validity, and the use information (a type (entrance), a tollhouse code, a date and time of the passage) together with a positive response signal to the settling apparatus 50B via the on-vehicle apparatus 20 by radio communication at the second predetermined frequency.

If the various checks result in positive, the settling apparatus 50B transmits a write demand (a Write command), ID=F showing that this demand is issued from the settling apparatus 50B an enciphered encipherment key, an identification number, a term of effective and the use information (a type (exit), a tollhouse code, a date and time of the payment, payment distinction (post-payment), a vehicle type/charge) to the radio card 10 via the on-vehicle apparatus 20 by radio communication at the second predetermined frequency. After this information has been written in the radio card 10, a response (OK/NG) is transmitted to the settling apparatus 50B and in addition a result of the adjustment is managed by the vehicle matching unit 111 along with a result of the vehicle type recognition and a personal ID from the radio card.

If any fraudulent, invalid or improper act has been done, an application is activate when the vehicle passage sensor 106B detects passage of the vehicle 30 in the image zone 114, and the settling apparatus 50B transmits a read demand (a Read command) and ID=F showing that this demand is issued from the settling apparatus 50B to the radio card 10 via the on-vehicle apparatus 20 by radio communication at the second predetermined frequency.

In response to this demand, the radio card 10 transmits a plain-text encipherment key, an enciphered encipherment key, an identification number, a term of validity and the use information together with a positive response signal to the settling apparatus 50B via the on-vehicle apparatus 20 by radio communication at the second predetermined frequency, the camera 110 photographs the vehicle 30, and the vehicle matching unit 111 manages a result of the photographing along with the personal ID output from the radio card 10.

Figure 31:
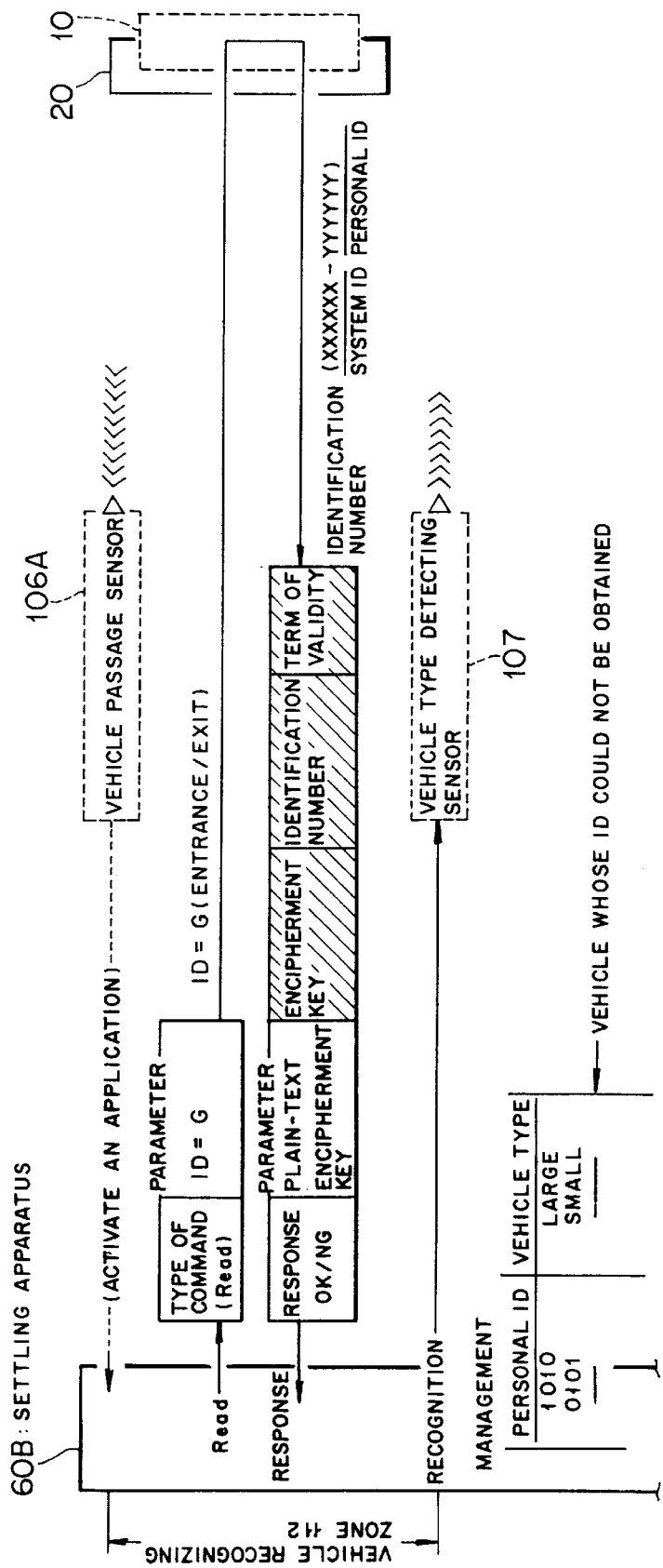
FIG. 31 is an illustration of communication data in a vehicle type recognizing zone at an entrance/exit toll adjusting gate in the toll post-payment process according to the embodiment.

When the user, who selected the toll post-payment, passes through the entrance/exit toll pre-payment adjusting gate 35B in the toll pre-payment system on the toll road 32 where a fixed toll is collected irrespectively of a trip distance, the user passes through the entrance/exit toll adjusting gate 35B when the radio card 10 is inserted in the on-vehicle apparatus 20. As shown in FIG. 31, an application is activated when the vehicle passage sensor 106A detects passage of the vehicle 30 in the vehicle type recognizing zone 112, and the settling apparatus 60B transmits a read demand (a Read command) and ID=G showing that this demand is issued from the settling apparatus 60B to the radio card via the on-vehicle apparatus by radio communication at the second predetermined frequency.

In response to this read demand, the radio card 10 transmits a plain-text encipherment key, an enciphered encipherment key, an identification number, and a term of validity together with a positive response signal to the settling apparatus 60B via the on-vehicle apparatus 20 by radio communication at the second predetermined frequency. When the vehicle type detecting sensor 107 and the vehicle type recognizing apparatus 108 recognize a type of the vehicle 30, the vehicle matching unit 111 manages a result of the recognition and a personal ID output from the radio card 10 as a pair. In the vehicle type recognizing zone 112, no writing process is performed on the radio card 10.

When the vehicle passage sensor 106B detects passage of the vehicle 30 in the toll settling zone 113, an application is activated, and the settling apparatus 60B transmits a read demand (a Read command) and ID=G showing that this demand is issued from the settling apparatus 60B to the radio card 10 via the on-vehicle apparatus 20 by radio communication at the second predetermined frequency.

In response to this read demand, the radio card 10 transmits a plain-text encipherment key, an enciphered encipherment key, an identification number, a term of validity and the use information (a type (entrance), a tollhouse code, a date and time of the passage) together with a positive response signal to the settling apparatus 60B via the on-vehicle apparatus 20 by radio communication at the second predetermined frequency.

If the various checks result in positive, the settling apparatus 60B transmits a write demand (a Write command), ID=G showing that this demand is issued from the settling apparatus 60B, an enciphered encipherment key, an identification number, a term of validity and the use information (a type (entrance/exit), a tollhouse code, a date and time of the payment, distinction of the payment (post-payment) and a vehicle type/charge) to the radio card 10 via the on-vehicle apparatus by radio communication at the second predetermined frequency. After this information has been written in the radio card 10, a response (OK/NG) is transmitted to the settling apparatus 60B, and in addition a result of the adjustment is managed along with a result of the vehicle type recognition and the personal ID output from the radio card 10 by the vehicle matching unit 111.

If any fraudulent, invalid or improper act has been done, an application is activated when the vehicle passage sensor 106B detects passage of the vehicle 30 in the image zone 114, and the settling apparatus 60B transmits a read demand (a Read command) and ID=G showing that this demand is issued from the settling apparatus 60B to the radio card 10 via the on-vehicle apparatus 20 by radio communication at the second predetermined frequency.

In response to this read demand, the radio card 10 transmits a plain-text encipherment key, an enciphered encipherment key, an identification number, and a term of validity together with a positive response signal to the settling apparatus 60B via the on-vehicle apparatus 20 by radio communication at the second predetermined frequency, in addition the camera 110 photographs the vehicle 30 and the vehicle matching unit 111 matches a result of the photographing together with the personal ID output from the radio card 10.

The data exchanged between the apparatus as described with reference to FIGS. 22 through 25 and 27 through 33 are tabulated in Table 2 for easy understanding. In the Table 2, a term "toll gate" has the same meaning as a term "toll adjusting gate".

TABLE 2

| | | | | | | communication data | | | | |
|---|---|---|---|---|---|---|---|---|---|---|
| system | apparatus | ID | encipherment key | identification number | valid term | ceiling of depositing money | ceiling of balance | balance | depositing money information | use information |
| pre-payment | depositing apparatus | Read A | ○ | ○ | ○ | ○ | ○ | ○ | — | — |
| | | Write A | ○ | ○ | ○ | ○ | ○ | ○ | ○ | — |
| | entrance toll gate | Read B | ○ | ○ | ○ | — | — | — | — | — |
| | | Write B | ○ | ○ | ○ | — | — | — | — | ○ |
| | exit toll gate | Read C | ○ | ○ | ○ | — | — | ○ | — | ○ |
| | | Write C | ○ | ○ | ○ | — | — | ○ | — | ○ |
| | entrance/ exit toll gate | Read D | ○ | ○ | ○ | — | — | ○ | — | — |
| | | Write D | ○ | ○ | ○ | — | — | ○ | — | ○ |
| post payment | entrance toll gate | Read E | ○ | ○ | ○ | — | — | — | — | — |
| | | Write E | ○ | ○ | ○ | — | — | — | — | ○ |
| | exit toll gate | Read F | ○ | ○ | ○ | — | — | — | — | ○ |
| | | Write F | ○ | ○ | ○ | — | — | — | — | ○ |
| | entrance/ exit toll gate | Read G | ○ | ○ | ○ | — | — | — | — | — |
| | | Write G | ○ | ○ | ○ | — | — | — | — | ○ |

As shown above, the user can voluntarily select either the toll pre-payment system or the toll post-payment system according to this embodiment so that service to the user of the toll road is largely improved. Further, the user need not open the window of the vehicle 30 for the toll pre-payment system, and need not stop the vehicle 30 for the toll post-payment system.

The structure of the system of this embodiment is expandable one toll gate at a time. For this reason, expansion work would not cause such a situation that the road is closed completely. Further, the security function is largely strengthened so that an early detection of falsified data or a fraudulent use becomes possible. Moreover, the radio card 10 can be recycled, so a pass is unnecessary.

In the toll pre-payment system, the system of this embodiment may be accomplished by adding only a radio communication function to the settling apparatus at a manned tollhouse in current use. In addition to this, it is possible to reduce the work of an attendant at the tollhouse and readily comply with such a situation that the balance is short (for instance, a deficiency may be payed in cash). On the other hand, in the toll post-payment system, it is possible to achieve a completely unmanned tollhouse. In addition, a shortage of the balance does not occur in the payment of the toll.

In the above embodiment, the writing apparatus 40A, 40B, the settling apparatus 50A, 50B and the settling apparatus 60A, 60B have different structures. It is alternatively possible that these writing apparatus and the settling apparatus have the same structure to be usable at any one of the entrance toll adjusting gates 33A, 33B, the exit toll adjusting gates 34A, 34B or the entrance/exit toll adjusting gate 35A, 35B.

In the above embodiment, the toll adjusting gate employing the toll pre-payment system is formed differently from the toll adjusting gate employing the toll post-payment system. It is, however, possible that the same toll adjusting gate handles the adjusting process in either the toll pre-payment system or the toll post-payment system.

In the above embodiment, the toll payment system is switched by inserting the radio card 10 into the on-vehicle apparatus 20. It is alternatively possible to provide a changeover switch to change a frequency output from the on-vehicle apparatus 20 by operating the changeover switch so as to select the toll payment system. The manner of this embodiment in which the user directly holds the radio card 10 for the toll pre-payment system, or the user inserts the radio card 10 in the on-vehicle apparatus 20 for the toll post-payment system is effective to prevent the user from forgetting to switch the frequency.

In the above embodiment, this invention is applied to a system where a toll for a toll road is collected. However, this invention is not limited to this example. It is possible, for instance, that this invention is applied to systems for collecting various types of charges such as a charge for ski lift, a fare for train or bus, an admission fee for art gallery or museum, etc. In this case, this invention may have the same effect as the above described embodiment.

In the embodiment, a changeover of communication between the first predetermined frequency and the second predetermined frequency for the different payment systems is accomplished by inserting the radio card 10 into the on-vehicle apparatus 20 or not (direct radio communication or indirect radio communication). Changeover of the frequency for the different payment systems of this invention is not limited to the above example. For instance, the frequency may be converted within the radio card (a storage medium ) 10, or the frequency may be converted within the on-vehicle apparatus (a frequency converting apparatus or terminal equipment) 20 into which the radio card 10 is inserted. In the former case of a system where the frequency is converted within the radio card 10, the same effect as the above embodiment is available without the on-vehicle apparatus 20. In the latter case of a system where the frequency is converted within the on-vehicle apparatus 20, as long as there is provided a function such as an interface between the storage medium and the on-vehicle apparatus 20, this invention may be accomplished even without a radio communication function in the storage medium itself as in the above embodiment, and the same effect as the above embodiment is available.

What is claimed is:

1. An automatic toll adjusting system for automatically adjusting a toll, said system including a storage medium for storing adjustment information necessary for toll adjustment, said strong medium carried by each user, said automatic toll adjusting system comprising:

a first toll adjusting gate, based upon a first toll payment system, for exchanging information with said storage medium by radio communication at a first predetermined frequency, said first toll adjusting gate automatically adjusting a toll based upon said first toll payment system; and a second toll adjusting gate, based upon a second toll payment system which is different from said first toll payment system, for exchanging information with said storage medium by radio communication at a second predetermined frequency, said second toll adjusting gate automatically adjusting the toll based upon said second toll payment system.

2. The automatic toll adjusting system according to claim 1, wherein said storage medium has a radio communication function for exchanging information with the outside by radio communication at the first predetermined frequency;

said automatic adjusting system further comprises a frequency converting apparatus for converting information output at the first predetermined frequency from said storage medium into the second predetermined frequency and for transmitting converted information to the outside by radio communication, and said frequency converting apparatus for converting information output at the second predetermined frequency from the outside into the first predetermined frequency and for transmitting the converted information to said storage medium when said storage medium is inserted therein;

wherein at the first toll adjusting gate, information is directly exchanged with said storage medium by radio communication at the first predetermined frequency to automatically adjust the toll based upon the first payment system; and wherein at the second toll adjusting gate, said storage medium is inserted in said frequency converting apparatus, information is indirectly exchanged with said storage medium via said frequency converting apparatus by radio communication at the second predetermined frequency to automatically adjust the toll based upon the second toll payment system.

3. The automatic toll adjusting system according to claim 2, wherein said toll adjustment is for a toll road where the toll is collected according to a trip distance, said automatic toll adjusting system further comprises:

a writing apparatus installed at an entrance toll adjusting gate on said toll road, said writing apparatus for transmitting use information including unique information about said entrance toll adjusting gate to said storage medium, which is on a vehicle passing through said entrance toll adjusting gate, directly by radio communication at the first predetermined frequency or indirectly via said frequency converting apparatus by radio communication at the second predetermined frequency wherein said use information is stored in said storage medium as adjustment information; and a settling apparatus installed at an exit toll adjusting gate on said toll road, said settling apparatus for communicating with said storage medium or said frequency converting apparatus by radio communication at the first predetermined frequency or at the second predetermined frequency to obtain said adjustment information directly from said storage medium or indirectly via said frequency converging apparatus, said settling apparatus automatically adjusting the toll for the toll road charged to a holder of said storage medium based on said adjustment information;

wherein if the first toll payment system is used, information is directly exchanged among said writing apparatus, said settling apparatus and said storage medium by radio communication at the first predetermined frequency to automatically adjust the toll according to the first toll payment system by said settling apparatus; and wherein if the second toll payment system is used, said storage medium is inserted in said frequency converting apparatus, information is exchanged indirectly via said frequency converting apparatus among said writing apparatus, said settling apparatus and said storage medium by radio communication at the second predetermined frequency to automatically adjust the toll according to the second toll payment system by said settling apparatus.

4. The automatic toll adjusting system according to claim 3, wherein when said settling apparatus automatically adjusts the toll, said settling apparatus transmits to said storage medium adjustment result information including a charged toll adjusted by said settling apparatus and payment distinction indicating that a toll payment system in said settling apparatus is either the first toll payment system or the second toll payment system, and said settling apparatus writes the adjustment result information and payment distinction as use information in said storage medium.

5. The automatic toll adjusting system according to claim 3, wherein information to be written in said storage medium is enciphered with a predetermined encipherment key to form enciphered data, said predetermined encipherment key is set and stored as plain-text, which is not enciphered, in said storage medium;
when receiving a read demand to read the information stored in said storage medium from said writing apparatus, or said settling apparatus, said storage medium transmits a plain-text encipherment key and the enciphered data, which is the information that is an object of the read demand, to said writing apparatus, or said settling apparatus;
said writing apparatus, or said settling apparatus deciphers the enciphered data, which is the information that is an object of said read demand, with said plain-text predetermined encipherment key transmitted from said storage medium.

6. The automatic toll adjusting system according to claim 5, wherein the enciphered data, which is the information that is an object of said read demand includes an enciphered predetermined encipherment key, which is obtained by enciphering said plain-text encipherment key with said predetermined encipherment key;
when said writing apparatus or said settling apparatus deciphers the enciphered data, which is the information that is the object of said read demand, with said plain-text encipherment key, said plain-text encipherment key, which is received with said enciphered data, is compared with a predetermined encipherment key which is obtained by deciphering said enciphered data, wherein said writing apparatus or said settling apparatus checks the information that is the object of said read demand which is transmitted from said storage medium.

7. The automatic toll adjusting system according to claim 5, wherein when said writing apparatus or said settling apparatus writes information in said storage medium, said writing apparatus, or said settling apparatus enciphers the information which is an object of a write demand with said plain-text predetermined encipherment key which is transmitted from said storage medium to obtain enciphered data, and transmits the enciphered data to said storage medium to write the enciphered data therein.

8. The automatic toll adjusting system according to claim 7, wherein when the enciphered data, which is the information that is the object of the write demand, includes an enciphered predetermined encipherment key which is obtained by enciphering said plain-text predetermined encipherment key with said predetermined encipherment key;
said storage medium compared said plain-text predetermined encipherment key, which is set and stored in said storage medium, with a predetermined encipherment key, which is obtained by deciphering the enciphered data which is the information that is the object of said write demand with said predetermined encipherment key wherein said storage medium checks the information which is the object of said write demand and which is transmitted from said writing apparatus or said settling apparatus.

9. The automatic toll adjusting system according to claim 3, wherein an identification number and a term of validity of said storage medium are set and stored in advance in said storage medium;
when receiving a read demand to read information stored in said storage medium from said writing apparatus, or said settling apparatus, said storage medium transmits said identification number and said term of validity along with the information which is the object of the write demand to said writing apparatus or said settling apparatus;
said writing apparatus or said settling apparatus performs a check on said identification number and said term of validity.

10. The automatic toll adjusting system according to claim 3, wherein said writing apparatus writes a time of passage at said entrance toll adjusting gate in said storage medium which is on the vehicle passing through said entrance toll adjusting gate;
when said settling apparatus automatically adjusts the toll, said settling apparatus obtains said time of passage from said storage medium to determine a required travel time based upon the time of passage and an arrival time at said exit toll adjusting gate.

11. The automatic toll adjusting system according to claim 3, wherein at said exit toll adjusting gate using a toll pre-payment system as the first toll payment system or the second toll payment system, said settling apparatus exchanges information with said storage medium, which is on the vehicle, to acquire said use information including said unique information about an entrance toll adjusting gate through which said vehicle has passed and balance information, obtains a result of recognition of a type of vehicle, calculates a toll to be collected based on said use information and the recognition result, subtracts said toll to be collected from a balance included in said balance information, and said settling apparatus transmits to said storage medium said balance information, including a new balance which is a result of the subtraction, and adjustment result information including said collected toll and payment distinction indicating the pre-payment system to write said balance information and adjustment result information in the storage medium.

12. The automatic toll adjusting system according to claim 3, further comprising a vehicle recognizing apparatus disposed at said exit toll adjusting gate using a toll post-payment system as the first toll payment system or the second toll payment, said vehicle recognizing apparatus for automatically recognizing a type of vehicle passing through said exit toll adjusting gate;
said settling apparatus at said exit toll adjusting gate exchanging information with said storage medium on the vehicle for acquiring personal information included in said adjusting information and said use information including said unique information about an entrance toll adjusting gate through which said vehicle has passed, acquiring a result of recognition of the type of vehicle from said vehicle recognizing apparatus, calculating a toll to be collected based on said use information and said recognition result, and transmitting adjustment result information including said toll to be collected and payment distinction indicating the toll post-payment to said storage medium to write the adjustment result information as the use information therein.

13. The automatic toll adjusting system according to claim 12, said exit toll adjusting gate is divided into three zones which are a) a vehicle recognizing zone for recognizing the type of vehicle by said vehicle recognizing apparatus, b) a toll settling zone for automatically adjusting the toll by said settling apparatus, and c) an image zone for photographing an invalid vehicle by a photographing apparatus.

14. The automatic toll adjusting system according to claim 13, wherein information is exchanged with said storage medium which is on a passing vehicle in each of said zones to acquire the personal information included in said adjustment information, and a result of the vehicle recognition, a result of the adjustment and a result of the photographing obtained in the respective zones are related to a specific vehicle based on the obtained personal information.

15. The automatic toll adjusting system according to claim 14, wherein sensors for defecting passage of the vehicle are provided in the respective zones, when said senors detects passage of the vehicle, said personal information is acquired from said storage medium which is on said vehicle in each of said zones and processing in each of said zones is performed.

16. The automatic toll adjusting system according to claim 3, wherein said entrance toll adjusting gate using a toll post-payment as the first toll payment system or the second toll payment system is divided into two zones which are a) a passage recognizing zone for writing said use information including said unique information about said entrance toll adjusting gate into said storage medium which is on the vehicle passing through said entrance toll adjusting gate by said writing apparatus and b) an image zone for photographing an invalid vehicle by a photographing apparatus.

17. The automatic toll adjusting system according to claim 16, wherein sensors for detecting passage of the vehicle are provided in the respective zones, when said sensors detect passage of the vehicle, processing in each of the zones is performed.

18. The automatic toll adjusting system according to claim 2, wherein said toll adjustment is for a toll road where a fixed toll irrespective of a trip distance is collected, said automatic toll adjusting system further comprises:
a settling apparatus installed at an entrance/exit toll adjusting gate located at either an entrance or an exit of said toll road, said settling apparatus for communicating with said storage medium or said frequency converting apparatus by radio communication at the first predetermined frequency or at the second predetermined frequency to obtain said adjustment information directly from said storage medium or indirectly via said frequency converting apparatus, said settling apparatus automatically adjusting the toll for said toll road charged to a holder of said storage medium based on said adjustment information;
wherein if the first toll payment system is used, information is directly exchanged between said settling apparatus and said storage medium by radio communication at the first predetermined frequency to automatically adjust the toll according to the first toll payment system by said settling apparatus; and
wherein if the second toll payment system is used, said storage medium is inserted in said frequency converting apparatus, information is indirectly exchanged between said settling apparatus and said storage medium via said frequency converting apparatus by radio communication at the second predetermined frequency to automatically adjust the toll according to the second toll payment system by said settling apparatus.

19. The automatic toll adjusting system according to claim 18, wherein when said settling apparatus automatically adjusts a toll, said settling apparatus transmits to said storage medium adjustment result information including a charged toll adjusted by said settling apparatus and payment distinction indicating that a toll payment system in said settling apparatus is either the first toll payment system or the second toll payment system, and said settling apparatus writes the adjustment result information and the payment distinction as use information in said storage medium.

20. The automatic toll adjusting system according to claim 18, wherein information to be written in said storage medium is enciphered with a predetermined encipherment key to form enciphered data, said predetermined encipherment key is set and stored as plain-text, which is not enciphered, in said storage medium;
when receiving a read demand to read the information stored in said storage medium from said writing apparatus, or said settling apparatus, said storage medium transmits a plain-text encipherment key and enciphered data, which is the information that is an object of the read demand, to said writing apparatus, or said settling apparatus;
said writing apparatus, or said settling apparatus deciphers the enciphered data, which is the information that is an object of said read demand, with said plain-text predetermined encipherment key transmitted from said storage medium.

21. The automatic toll adjusting system according to claim 20, wherein the enciphered data, which is the information that is the object of said read demand, includes an enciphered predetermined encipherment key which is obtained by enciphering said plain-text encipherment key with said predetermined encipherment key;
when said writing apparatus or said settling apparatus deciphers the enciphered data, which is the information that is the object of said read demand, with said plain-text encipherment key, said plain-text encipherment key, which is received with said enciphered data, is compared with a predetermined encipherment key which is obtained by deciphering said enciphered data wherein said writing apparatus or said settling apparatus checks the information that is the object of said read demand which is transmitted from said storage medium.

22. The automatic toll adjusting system according to claim 20, wherein when said writing apparatus or said settling apparatus, writes information in said storage medium, said writing apparatus, or said settling apparatus enciphers the information which is an object of a write demand with said plain-text predetermined encipherment key which is transmitted from said storage medium to obtain enciphered data, and transmits the enciphered data to said storage medium to write the enciphered data therein.

23. The automatic toll adjusting system according to claim 22, wherein the enciphered data, which is the information that is the object of the write demand, includes an enciphered predetermined encipherment key which is obtained by enciphering said plain-text predetermined encipherment key with said predetermined encipherment key;
said storage medium compares said plain-text predetermined encipherment key, which is set and stored in said storage medium, with a predetermined encipherment key, which is obtained by deciphering the enciphered data which is the information that is the object of said write demand with said predetermined encipherment key wherein said storage medium checks the information which is the object of said write demand and which is transmitted from said writing apparatus or said settling apparatus.

24. The automatic toll adjusting system according to claim 18, wherein an identification number and a term of validity of said storage medium are set and stored in advance in said storage medium;

when receiving a read demand to read information stored in said storage medium from said writing apparatus or said settling apparatus, said storage medium transmits said identification number and said term of validity along with the information which is the object of the write demand to said writing apparatus or said settling apparatus;

said writing apparatus or said settling apparatus performs a check on said identification number and said term of validity.

25. The automatic toll adjusting system according to claim 18, wherein at said entrance/exit toll adjusting gate using a toll pre-payment system as the first toll payment system or the second toll payment system, said settling apparatus exchanges information with the storage medium, which is on the vehicle, to acquire balance information, said settling apparatus obtains a result of recognition of a type of vehicle, calculates a charged toll based on said recognition result, subtracts said charged toll from a balance included in said balance information, and transmits a) the balance information including a new balance which is a result of the subtraction and b) adjustment result information including said collected toll and payment distinction indicating the toll pre-payment system to said storage medium to write the balance information and adjustment result information therein.

26. The automatic toll adjusting system according to claim 18, further comprising a vehicle recognizing apparatus provided at said entrance/exit toll adjusting gate using a toll post-payment system as the first toll payment system or the second toll payment system, said vehicle recognizing apparatus for automatically recognizing a type of vehicle passing through said entrance/exit toll adjusting gate;

said settling apparatus at said entrance/exit toll adjusting gate exchanging information with said storage medium, which is on the vehicle, for acquiring personal information included in said adjustment information, acquiring a result of recognition of the type of vehicle from said vehicle type recognizing apparatus, calculating a toll to be collected based on said recognition result, and transmitting adjustment result information including said toll to be collected and payment distinction indicating the toll post-payment system to said storage medium to write adjustment result information as use information therein.

27. The automatic toll adjusting system according to claim 26, wherein a host computer managing said settling apparatus withdraws the charged toll calculated by said settling apparatus from a bank account specified in the personal information which is obtained by said settling apparatus.

28. The automatic toll adjusting system according to claim 26, wherein said entrance/exit toll adjusting gate is divided into three zones which are a) a vehicle recognizing zone for recognizing a type of vehicle by said vehicle recognizing apparatus, b) a toll settling zone for automatically adjusting the toll by said settling apparatus and c) an image zone for photographing an invalid vehicle by a photographing apparatus.

29. The automatic toll adjusting system according to claim 28, wherein in each of said zones, information is exchanged with said storage medium which is on the vehicle passing therethrough to acquire personal information included in said adjustment information, and a result of the recognition, a result of the adjustment, and a result of the photographing obtained in the respective zones are corresponded to a specific vehicle based on the acquired personal information.

30. The automatic toll adjusting system according to claim 29, wherein sensors for detecting passage of the vehicle are provided in said respective three zones;

when said sensors detect passage of the vehicle, said personal information is obtained from said storage medium which is on said vehicle in each of said zones, and processing in each of said zones is performed.

31. The automatic toll adjusting system according to claim 2, wherein if the first toll payment system or the second toll payment system is a toll pre-payment system, said automatic toll adjusting system further comprises a depositing apparatus used for toll pre-payment by performing a depositing process for the toll pre-payment on said storage medium;

said storage medium retains depositing information output from said depositing apparatus for toll pre-payment and balance information which is an object of a charged toll when the toll is automatically adjusted at a toll adjusting gate in the toll pre-payment system;

when said storage medium is inserted in said depositing apparatus for toll pre-payment, said depositing apparatus communicates with said storage medium by radio communication at the first predetermined frequency to obtain said balance information, adds a sum of money currently deposited to a balance included in said balance information to obtain a new balance, and transmits the depositing information, including the new balance and the sum of money currently deposited, to said storage medium by radio communication at the first predetermined frequency to write the depositing information therein.

32. The automatic toll adjusting system according to claim 31, wherein a password of said storage medium is set and stored in advance in said storage medium;

when said depositing apparatus performs the depositing process, said depositing apparatus transmits the password input through said depositing apparatus to said storage medium by radio communication at the first predetermined frequency;

said storage medium compares said password set and stored in said storage medium with the password transmitted from said depositing apparatus to check on a payer to said storage medium.

33. An automatic toll adjusting system according to claim 31, wherein information to be written in said storage medium is enciphered with a predetermined encipherment key to form enciphered data and said predetermined encipherment key is set and stored as plain-text, which is not enciphered, in said storage medium;

when said storage medium receives a read demand to read information stored in said storage medium from said depositing apparatus for toll pre-payment, said storage medium transmits a plain-text predetermined encipherment key and the enciphered data, which is the information that is an object of the read demand, to said depositing apparatus by radio communication at the first predetermined frequency;

said depositing apparatus deciphers the enciphered data, which is the information that is the object of said read demand, with said plain-text predetermined encipherment key which is transmitted from said storage medium.

34. The automatic toll adjusting system according to claim 33, wherein the enciphered data, which is the information that is the object of said read demand, includes an enciphered predetermined encipherment key which is obtained by enciphering said plain-text encipherment key with said predetermined encipherment key;

when said depositing apparatus deciphers the enciphered data, which is the information that is the object of said read demand, with said predetermined encipherment key, said depositing apparatus compares said plain-text predetermined encipherment key, which is received along with said enciphered data, with a predetermined encipherment key which is obtained by deciphering said enciphered data wherein said depositing apparatus checks the information that is the object of said read demand.

35. The automatic toll adjusting system according to claim 33, wherein when information is written in said storage medium from said depositing apparatus, said depositing apparatus enciphers the information which is an object of a write demand with said plain-text predetermined encipherment key, which transmitted from said storage medium, to obtain enciphered data, and said depositing apparatus transmits the enciphered data to said storage medium by radio communication at the first predetermined frequency to write the enciphered data therein.

36. The automatic toll adjusting system according to claim 35, wherein the enciphered data, which is the information that is the object of said write demand, includes an enciphered predetermined encipherment key which is obtained by enciphering said plain-text predetermined encipherment key with said predetermined encipherment key;

said storage medium compares said plain-text predetermined encipherment key, which is set and stored in said storage medium, with a predetermined encipherment key which is obtained by deciphering the enciphered data which is the information that is the object of said write demand with said predetermined encipherment key wherein said storage medium checks the information that is the object of said write demand which is transmitted from said depositing apparatus.

37. The automatic toll adjusting system according to claim 31, wherein an identification number and a term of validity of said storage medium are set and stored in advance in said storage medium;

when said storage medium receives a read demand to read information stored in said storage medium from said depositing apparatus, said storage medium transmits said identification number and said term of validity along with the information which is an object of said read demand to said depositing apparatus by radio communication at the first predetermined frequency;

said depositing apparatus performs a check on said identification number and said term of validity.

38. The automatic toll adjusting system according to claim 31, wherein a maximum amount of deposit money and a maximum balance of the storage medium are set and stored in advanced in said storage medium;

said depositing apparatus obtains said maximum amount of deposit money and said maximum balance along with said balance information from said storage medium during the depositing process by said depositing apparatus wherein said depositing apparatus checks said maximum amount of deposit money and said maximum balance.

39. The automatic toll adjusting system according to claim 31, further comprising a totaling apparatus for totaling accumulation of sums of deposit money written in said storage medium from said depositing apparatus and for totaling accumulation of collected tolls transmitted from toll adjusting gates to said storage medium for each storage medium to maintain a total sum that is a balance of these accumulations.

40. The automatic toll adjusting system according to claim 2, further comprising an inquiring apparatus for inquiring about information stored in said storage medium;

when said storage medium is inserted in said inquiring apparatus, said inquiring apparatus communicates with said storage medium by radio communication at the first predetermined frequency to acquire information stored in said storage medium and to output the acquired information.

41. The automatic toll adjusting system according to claim 40, wherein said inquiring apparatus acquires only designated information from said storage medium, and outputs the designated information.

42. The automatic toll adjusting system according to claim 40, wherein said inquiring apparatus acquires a history of the designated information from said storage medium, and outputs the history of the designated information.

43. The automatic toll adjusting system according to claim 40, wherein an identification number of said storage medium is set and stored in advance in said storage medium;

when said storage medium receives a read demand to read information stored in said storage medium from said inquiring apparatus, said storage medium transmits said identification number along with the information which is an object of the read demand to said inquiring apparatus by radio communication at the first predetermined frequency;

said inquiring apparatus performs a check on said identification number.

44. The automatic toll adjusting system according to claim 40, wherein information to be written in said storage medium is enciphered with a predetermined encipherment key and said predetermined encipherment key is set and stored as plain-text, which is not enciphered, in said storage medium;

when said storage medium receives a read demand to read information stored in said storage medium from said inquiring apparatus, said storage medium transmits a plain-text predetermined encipherment key and enciphered data, which is the information that is an object of the read demand, to said inquiring apparatus by radio communication at the first predetermined frequency;

said inquiring apparatus deciphers the enciphered data, which is the information that is the object of said read demand, with said plain-text predetermined encipherment key which is transmitted from said storage medium.

45. The automatic toll adjusting system according to claim 2, wherein a password of said storage medium is set and stored in advanced in said storage medium;

when said storage medium is inserted in said frequency converting apparatus, said frequency converting apparatus transmits the password, input through said frequency converting apparatus, to said storage medium by radio communication at the first predetermined frequency;

said storage medium compares said password set and stored in said storage medium with a password transmitted from said frequency converting apparatus wherein said storage medium checks on a user of said storage medium.

46. The automatic toll adjusting system according to claim 45, wherein a host computer managing said settling apparatus for the exit toll adjusting gate withdraws the charged toll, calculated by said settling apparatus, from a bank account specified in the personal information which is acquired by said settling apparatus.

47. The automatic toll adjusting system according to claim 1, wherein said storage medium has a radio communicating means for exchanging information with the outside by radio communication; and said radio communicating means has a frequency switching means for performing switching between said first predetermined frequency and said second predetermined frequency during radio communication.

48. The automatic toll adjusting system according to claim 1, further comprising:

a terminal apparatus mounting said storage medium thereon and intervening between said storage medium and the outside, said terminal apparatus for exchanging information by radio communication;

said terminal apparatus has a frequency switching means for performing switching between said first predetermined frequency and said second predetermined frequency during radio communication.

49. A storage medium, with a radio communication function, for an automatic toll adjusting system, said storage medium carried by each user, said storage medium comprising:

a storing means for storing adjustment information necessary for toll adjustment therein;

a receiving means for receiving information from the outside by radio communication at a first predetermined frequency;

a processing means for reading information stored in said storage medium and for writing information into said storage medium based on the information received by said receiving means; and a transmitting means for transmitting responsive information including the information from said storing means to the outside by the radio communication at the first predetermined frequency;

wherein at a first toll adjusting gate based upon a first toll payment system, information being directly exchanged between said storage medium and said first toll adjusting gate by radio communication at the first predetermined frequency; and wherein at a second toll adjusting gate based upon a second toll payment system which is different from said first toll payment system, said storage medium indirectly exchanging information via a frequency converting apparatus, through said receiving means and said transmitting means, with said second toll adjusting gate by radio communication at a second predetermined frequency, said storage medium being inserted in said frequency converting apparatus, said frequency converting apparatus converting information at the first predetermined frequency into the second predetermined frequency, and converting information at the second predetermined frequency into the first predetermined frequency.

50. The storage medium, with a radio communication function, for an automatic toll adjusting system according to claim 49, wherein said storing means retains information as enciphered data which is obtained by enciphering said information from the outside with a predetermined encipherment key, wherein said predetermined encipherment key being plain-text which is not enciphered;

when said processing means receives a read demand from the outside through said receiving means, said processing means reads enciphered data, which is information that is an object of the read demand, and a plain-text predetermined encipherment key from said storing means and transmits the enciphered data and the plain-text predetermined encipherment key through said transmitting means.

51. The storage medium, with a radio communication function, for an automatic toll adjusting system according to claim 49, further comprising:

a deciphering means for deciphering an encipherment key included in enciphered data, which is an object of a write demand and said encipherment key used to encipher the enciphered data with a plain-text predetermined encipherment key, which is stored in said storing means, when said storage medium receives the write demand corresponding to transmission of information that is an object of said read demand from the outside through said receiving means; and an encipherment key check means for comparing an encipherment key, which is deciphered by said deciphering means, with said plain-text predetermined encipherment key stored in said storing means wherein said encipherment key check means checks the information that is the object of the write demand.

52. The storage medium, with a radio communication function, for an automatic toll adjusting system according to claim 49, wherein a password is set and stored in advance in said storing means;

said storage medium further comprises a password check means for comparing a password, accompanying a read demand, with said password stored in said storing means when said storage medium receives the read demand, accompanied by the password, through said receiving means during a depositing process for toll pre-payment wherein said storage medium checks on a depositor.

53. The storage medium, with a radio communication function, for an automatic toll adjusting system according to claim 49, wherein a password is set and stored in advance in said storing means;

said storage medium further comprises a password check means for comparing a received password with said password in said storing means to check a user if said storage medium receives a password, input from said frequency converting apparatus, through said receiving means when said storage medium is inserted into said frequency converting apparatus.

54. A frequency converting apparatus for an automatic toll adjusting system, said frequency converting apparatus provided in a vehicle and into which a storage medium is inserted, said storage medium having a radio communication function and storing adjustment information necessary for toll adjustment, said storage medium carried by each user and exchanging information with the outside by radio communication at a first predetermined frequency, said frequency converting apparatus comprising:

a first communicating means for exchanging information with said storage medium by radio communication at the first predetermined frequency when said storage medium in inserted in said frequency converting apparatus; and a second communication means for exchanging information with the outside by radio communication at a second predetermined frequency;

wherein when said storage medium is inserted in said frequency converting apparatus, said first communicating means transmitting information, which is received from the outside through said second communication means, to said storage medium by radio communication at the first predetermined frequency, said second communication means transmitting information, which is received from said storage medium through said first communicating means, to the outside by radio communication at the second predetermined frequency; and wherein at a toll adjusting gate, when said storage medium is inserted in said frequency converting apparatus, information being exchanged between said toll adjusting gate and said storage medium via said first communicating means and said second communicating means.

55. The frequency converting apparatus for an automatic toll adjusting system according to claim 54, wherein if a password of said storage medium is set and stored in advance in said storage medium, said frequency converting apparatus further comprises an inputting means for inputting a password which is used to check a user of the storage medium when said storage medium is inserted in said frequency converting apparatus;

said password input through input through said inputting means being transmitted by said first communicating means to said storage medium by radio communication at the first predetermined frequency.

56. A writing apparatus for an automatic toll adjusting system, said writing apparatus for writing use information, necessary for toll adjustment, as adjustment information into a storage medium having a radio communication function, said storage medium carried by each user, said storage medium storing said adjustment information therein and exchanging information with the outside by radio communication at a first predetermined frequency, said writing apparatus comprising:

a communicating means for exchanging information with said storage medium by radio communication at the first predetermined frequency at an entrance toll adjusting gate using a first toll payment system, and for exchanging information with said storage medium by radio communication at a second predetermined frequency at an entrance toll adjusting gate using a second toll payment system which is different from said first toll payment system; and a demand issuing means for issuing a write demand to said storage medium through said communicating means to write the use information about the entrance toll adjusting gate on said storage medium;

wherein, when a user carrying said storage medium passes through the entrance toll adjusting gate, said demand issuing means issuing a write demand to write the use information, including unique information about said entrance toll adjusting gate, on said storage medium.

57. The writing apparatus for an automatic toll adjusting system according to claim 56, wherein said use information includes a time of passage of a vehicle through said entrance toll adjusting gate.

58. The writing apparatus for an automatic toll adjusting system according to claim 57, wherein if an identification number and a term of validity of said storage medium are set and stored in advance in said storage medium, when a user carrying said storage medium passes through the entrance toll adjusting gate, said demand issuing means issues a read demand to the storage medium to read said identification number and the term of validity through said communicating means prior to issuing a write demand to write said use information;

said writing apparatus further comprises a check means for performing a check on said identification number and said term of validity when said writing apparatus receives said identification number and said term of validity transmitted from said storage medium through said communicating means in response to said read demand.

59. The writing apparatus for an automatic toll adjusting system according to claim 58, wherein if information in said storage medium is enciphered with a predetermined encipherment key to form enciphered data and said storage medium retains said predetermined encipherment key as plain-text which is not enciphered, said writing apparatus receives enciphered data for said identification number and said term of validity and a plain-text predetermined encipherment key from said storage medium through said communicating means in response to said read demand from said demand issuing means, said writing apparatus further comprises a deciphering means for deciphering the enciphered data for said identification number and said term of validity with said plain-text predetermined encipherment key.

60. The writing apparatus for an automatic toll adjusting system according to claim 59, wherein if the enciphered data for said identification number and said term of validity includes an enciphered encipherment key, which is obtained by enciphering said plain-text predetermined encipherment key with said predetermined encipherment key, said writing apparatus further comprises an encipherment key check means for comparing said plain-text predetermined encipherment key, which is received along with said enciphered data, with a predetermined encipherment key, which is obtained by deciphering said enciphered data by said deciphering means, wherein said encipherment key check means checks the information that is an object of the read demand.

61. The writing apparatus for an automatic toll adjusting system according to claim 59, further comprising an enciphering means for enciphering said use information that is an object of a write demand issued from said demand issuing means to write said use information in said storage medium, said use information enciphered based on said plain-text predetermined encipherment key which is received along with said enciphered data.

62. The writing apparatus for an automatic toll adjusting system according to claim 61, wherein said enciphering means enciphers said plain-text predetermined encipherment key, which is used for enciphering, with said predetermined encipherment key, said enciphered predetermined encipherment key is included in the enciphered data, which is the information that is an object of the write demand, to write the information in said storage medium.

63. The writing apparatus for an automatic toll adjusting system according to claim 56, wherein if an identification number and a term of validity of said storage medium are set and stored in advance in said storage medium, when a user carrying said storage medium passes through the entrance toll adjusting gate, said demand issuing means issues a read demand to the storage medium to read said identification number and the term of validity through said communicating means prior to issuing a write demand to write said use information;

said writing apparatus further comprises a check means for performing a check on said identification number and said term of validity when said writing apparatus receives said identification number and said term of validity which are transmitted from said storage medium through said communicating means in response to said read demand.

64. The writing apparatus for an automatic toll adjusting system according to claim 63, wherein if information in said storage medium is enciphered with a predetermined encipherment key to form enciphered data and said storage medium retains said predetermined encipherment key as a plain-text which is not enciphered, said writing apparatus receives enciphered data for said identification number and said term of validity and a plain-text predetermined encipherment key from said storage medium through said communicating means in response to said read demand from said demand issuing means, said writing apparatus further comprises a deciphering means for deciphering the enciphered data for said identification number and said term of validity with said plain-text predetermined encipherment key.

65. The writing apparatus for an automatic toll adjusting system according to claim 64, wherein if the enciphered data for said identification number and said term of validity includes an enciphered encipherment key, which is obtained by enciphering said plain-text predetermined encipherment key with said predetermined encipherment key, said writing apparatus further comprises an encipherment key check means for comparing said plain-text predetermined encipherment key, which is received along with said enciphered data, with a predetermined encipherment key, which is obtained by deciphering said enciphered data by said deciphering means, wherein said encipherment key check means checks the information that is an object of the read demand.

66. The writing apparatus for an automatic toll adjusting system according to claim 64, further comprising an enciphering means for enciphering said use information that is an object of a write demand, issued from said demand issue means to write said use information in said storage medium, said use information enciphered based on of said plain-text predetermined encipherment key which is received along with said enciphered data.

67. The writing apparatus for an automatic toll adjusting system according to claim 66, wherein said enciphering means enciphers said plain-text predetermined encipherment key, which is used for enciphering, with said predetermined encipherment key, said enciphered predetermined encipherment key is included in the enciphered data, which is the information that is an object of the write demand, to write the information in said storage medium.

68. A settling apparatus for an automatic toll adjusting system, said settling apparatus for acquiring adjustment information, from a storage medium having a radio communication function, to automatically adjust a toll charged to a holder of said storage medium based on said adjustment information, said storage medium being carried by each user, said storage medium for storing said adjustment information, which is necessary for toll adjustment, therein and exchanging information with the outside by radio communication at a first predetermined frequency, said settling apparatus comprising:

a communicating means for exchanging information with said storage medium by radio communication at the first predetermined frequency at a toll adjusting gate which uses a first toll payment system, and for exchanging information with said storage medium by radio communication at a second predetermined frequency at a toll adjusting gate which uses a second toll payment system which is different from said first toll payment system;

a demand issuing means for issuing a read demand to said storage medium through said communicating means to read said adjustment information from said storage medium and for issuing a write demand to said storage medium through said communicating means to write adjustment result information to said storage medium; and a toll adjusting means for automatically adjusting the toll charged to the holder of said storage medium based on said adjustment information received from said storage medium through said communicating means in response to said read demand from said demand issuing means;

when the user carrying said storage medium passes through the toll adjusting gate, said demand issuing means issuing a read demand to said storage medium through said communicating means to read said adjustment information;

when said settling apparatus receives said adjustment information from said storage medium through said communicating means in response to said read demand, said toll adjusting means automatically adjusting the toll charged the holder of said storage medium based on said received adjustment information;

said demand issuing means issuing a write demand to write adjustment result information including a charged toll adjusted by said toll adjusting means and payment distinction indicating whether a toll payment system is a first toll payment system or a second toll payment system to said storage medium through said communicating means.

69. The settling apparatus for an automatic toll adjusting system according to claim 68, wherein if an identification number and a term of validity of said storage medium are set and stored in advance in said storage medium, said demand issuing means issues a read demand to said storage medium through said communicating means to read said identification number and said term of validity when a settling process is initiated;

said settling apparatus further comprises a check means for performing a check on said identification number and said term of validity when said settling apparatus receives said identification number and said term of validity from said storage medium through said communicating means in response to said read demand.

70. The settling apparatus for an automatic toll adjusting system according to claim 69, wherein if the information in said storage medium is enciphered with a predetermined encipherment key to form enciphered data and said storage medium retains said predetermined encipherment key as plain-text which is not enciphered, said settling apparatus receives enciphered data, which is information that is an object of a read demand, and a plain-text predetermined encipherment key from said storage medium through said communicating means in response to said read demand from said demand issuing means;

said settling apparatus further comprises a deciphering means for deciphering enciphered data for said identification number and said term of validity with said plain-text predetermined encipherment key.

71. The settling apparatus for an automatic toll adjusting system according to claim 70, wherein if the enciphered data, which is the information that is an object of said read demand, includes an enciphered predetermined encipherment key which is obtained by enciphering said plain-text predetermined encipherment key with said predetermined encipherment key, said settling apparatus further comprises an encipherment key check unit for comparing said plain-text predetermined encipherment key, which is received along with said enciphered data, with a predetermined encipherment key which is obtained by deciphering said enciphered data by said deciphering means, wherein said encipherment key check unit checks the information that is the object of said read demand.

72. The settling apparatus for an automatic toll adjusting system according to claim 70, further comprising an enciphering means for enciphering said adjustment result information, which is an object of the write demand, from said demand issuing means to write the adjustment result information in said storage medium with said plain-text predetermined encipherment key which is received along with said enciphered data.

73. The settling apparatus for an automatic toll adjusting system according to claim 72, wherein said enciphering means enciphers said plain-text predetermined encipherment key, which is used for enciphering, with said predetermined encipherment key;

said enciphered predetermined encipherment key is included in enciphered data, which is the information that is an object of a write demand, to write the information in said storage medium.

74. An automatic toll adjustment system for automatically adjusting a toll, said automatic toll adjustment system including a storage medium for storing adjustment information necessary for toll adjustment, said storage medium carried by each user, said automatic toll adjustment system comprising:

a toll adjustment gate for exchanging information with said storage medium by radio communication at one of a first predetermined frequency and a second predetermined frequency, said toll adjustment gate exchanging information at said first predetermined frequency when a toll is automatically adjusted based upon a first toll payment system and said toll adjustment gate exchanging information at said second predetermined frequency when a toll is automatically adjusted based upon a second toll payment system which is different from said first toll payment system.

75. A storage medium, with a radio communication function, for an automatic toll adjusting system, said storage medium carried by each user, said storage medium comprising:

a storing means for storing adjustment information necessary for toll adjustment therein;

a receiving means for receiving information from the outside by radio communication at a first predetermined frequency;

a processing means for reading information stored in the storage medium and for writing information into said storage medium based on information received by said receiving means; and transmitting means for transmitting responsive information, including the information from said storage means, to the outside by radio communication at the first predetermined frequency, wherein said storage medium directly communicating with a toll adjusting gate by radio communication at a first predetermined frequency when said toll adjustment gate adjusts a toll based upon a first toll payment system and said storage medium indirectly communicating with said toll adjustment gate at a second predetermined frequency through a frequency converting apparatus when said toll adjusting gate adjusts the toll based upon a second toll payment system which is different from the first toll payment system.

76. A frequency converting apparatus for an automatic toll adjusting system, a storage medium is inserted into said frequency converting apparatus, said storage medium having a radio communication function and storing adjustment information necessary for toll adjustment, said storage medium carried by each user and exchanging information with the outside by radio communication at a first predetermined frequency, said frequency converting apparatus comprising:

a first communicating means for exchanging information with the storage medium by radio communication at the first predetermined frequency when said storage medium is inserted in said frequency converting apparatus; and second communicating means for exchanging information with a toll adjusting gate by radio communication at a second predetermined frequency;

wherein, when said storage medium is inserted in said frequency converting apparatus, said first communicating means transmitting information, which is received from the toll adjusting gate, through said second communicating means to said storage medium by radio communication at the first predetermined frequency, said second communicating means transmitting information, which is received from the storage medium, through said first communicating means to the toll adjusting gate by radio communication at the second predetermined frequency.

77. A writing apparatus for an automatic toll adjusting system, said writing apparatus for writing use information, necessary for toll adjustment, as adjustment information into a storage medium having a radio communication function, said storage medium carried by each user, said storage medium storing said adjustment information therein and exchanging information with the outside by radio communication at a first predetermined frequency, said writing apparatus comprising:

a communicating means for exchanging information with said storage medium by radio communication at a toll adjusting gate at one of a first predetermined frequency and a second predetermined frequency, said communicating means exchanging information at the first predetermined frequency when said toll adjusting gate adjusts a toll using a first toll payment system and said communicating means exchanges information with the storage means using the second predetermined frequency when the toll adjusting gate adjusts tolls using a second toll payment system which is different from the first toll payment system; and a demand issuing means for issuing a write demand to said storage medium to write the use information about the toll adjusting gate on said storage medium through said communicating means.

78. A settling apparatus for an automatic toll adjusting system, said settling apparatus for acquiring adjustment information from a storage medium having a radio communication function, said settling apparatus automatically adjusting a toll charged to a holder of said storage medium based on said adjustment information, said storage medium being carried by each user and storing said adjustment information which is necessary for toll adjustment therein, said storage medium exchanging information with the outside by radio communication at a first predetermined frequency, said settling apparatus comprising:

a communicating means for exchanging information with said storage medium by radio communication at a toll adjusting gate at one of a first predetermined frequency and a second predetermined frequency, said communicating means exchanging information at the first predetermined frequency when said toll adjusting gate adjusts the toll using a first toll payment system and exchanging information at the second predetermined frequency when the toll adjusting gate adjusts the toll using a second toll payment system which is different from the first toll payment system;

a demand issuing means for issuing a read demand to read said adjustment information from said storage medium through said communicating means and for issuing a write demand to write adjustment result information to said storage medium through said communicating means; and a toll adjusting means for automatically adjusting the toll charged to the holder of said storage medium based on said adjustment information received from said storage medium through said communicating means in response to said read demand from said demand issuing means.

* * * * *